Oct. 10, 1950 G. DEAKIN 2,524,774

TELEPHONE SYSTEM

Filed Feb. 4, 1946 51 Sheets-Sheet 1

JUNCTION KEY SHEET

INVENTOR.
GERALD DEAKIN

BY Robert Harding Jr.

ATTORNEY

TELEPHONE SYSTEM

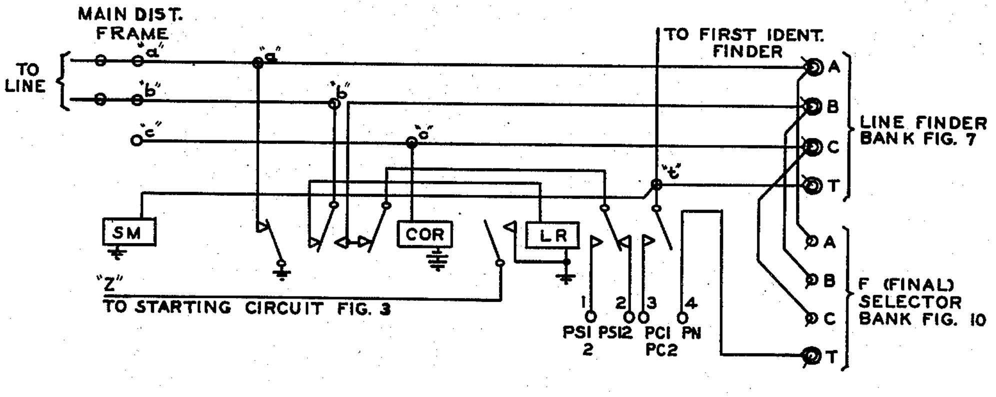

NOTES:
CONNECT TER. I TO
PSI FOR LINES WITH KEYSET
2 FOR LINES WITH DIAL
CONNECT TER. 2 TO
PSI2 FOR LINES IN SERVICE
—— FOR LINES OUT OF SERVICE
FOR PN PC & PS POTENTIALS SEE FIG. 6x
PCI UNRESTRICTED LINES
PC2 RESTRICTED LINES

FIG. 2

*SUBSCRIBER LINE CIRCUIT MAIN LINES*

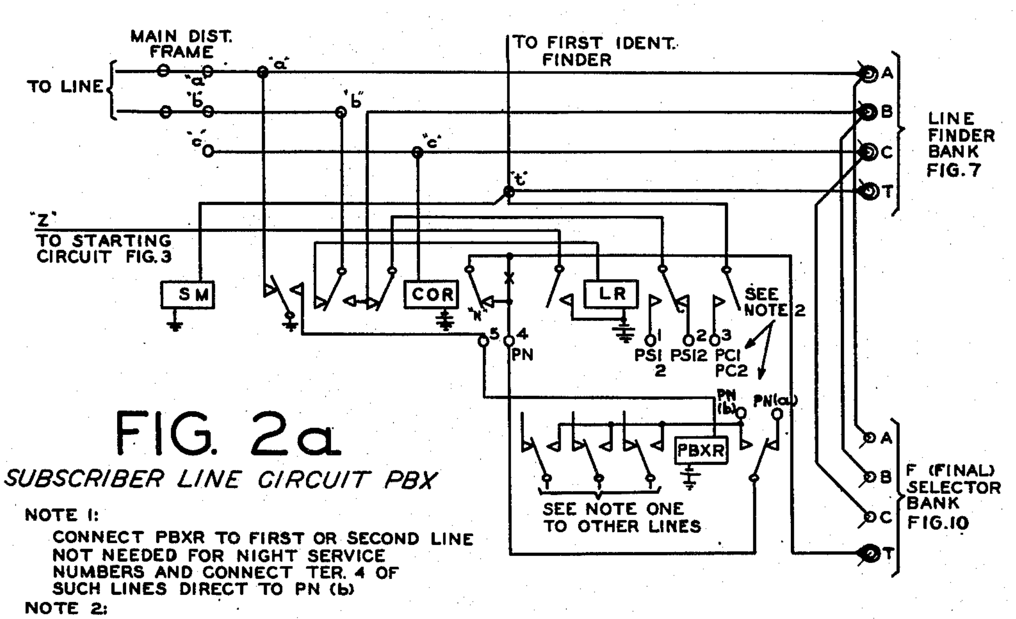

FIG. 2a

*SUBSCRIBER LINE CIRCUIT PBX*

NOTE I:
CONNECT PBXR TO FIRST OR SECOND LINE NOT NEEDED FOR NIGHT SERVICE NUMBERS AND CONNECT TER. 4 OF SUCH LINES DIRECT TO PN (b)

NOTE 2:
PCI UNRESTRICTED LINES
PC2 RESTRICTED LINES
CONNECT TER. I TO
PSI FOR LINES WITH KEYSET
2 FOR LINES WITH DIAL
CONNECT TER. 2 TO
PSI2 FOR LINES IN SERVICE
—— FOR LINES OUT OF SERVICE
(a) OPEN STRAP AT X EXCEPT ON LAST TRUNK OF GROUP
(b) FOR PN PC & PS POTENTIALS SEE FIG. 6x
(c) PN (a) NIGHT LINE NUMBER
(d) PN (b) PBX NUMBER

INVENTOR.
GERALD DEAKIN
BY Robert Harding, Jr.
ATTORNEY

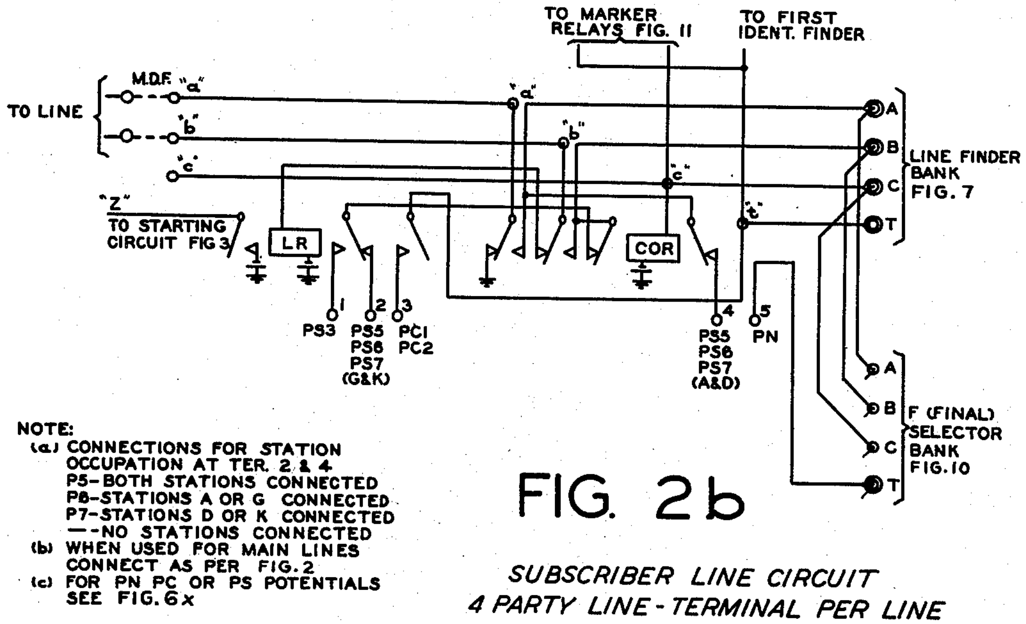

FIG. 2b

NOTE:
(a) CONNECTIONS FOR STATION OCCUPATION AT TER. 2 & 4
P5-BOTH STATIONS CONNECTED
P6-STATIONS A OR G CONNECTED
P7-STATIONS D OR K CONNECTED
—-NO STATIONS CONNECTED
(b) WHEN USED FOR MAIN LINES CONNECT AS PER FIG. 2
(c) FOR PN PC OR PS POTENTIALS SEE FIG. 6x

*SUBSCRIBER LINE CIRCUIT*
*4 PARTY LINE-TERMINAL PER LINE*

FIG. 2d

*SUBSCRIBER SET CIRCUIT RECTIFIER*
*PULSING FINGER PULL KEY*

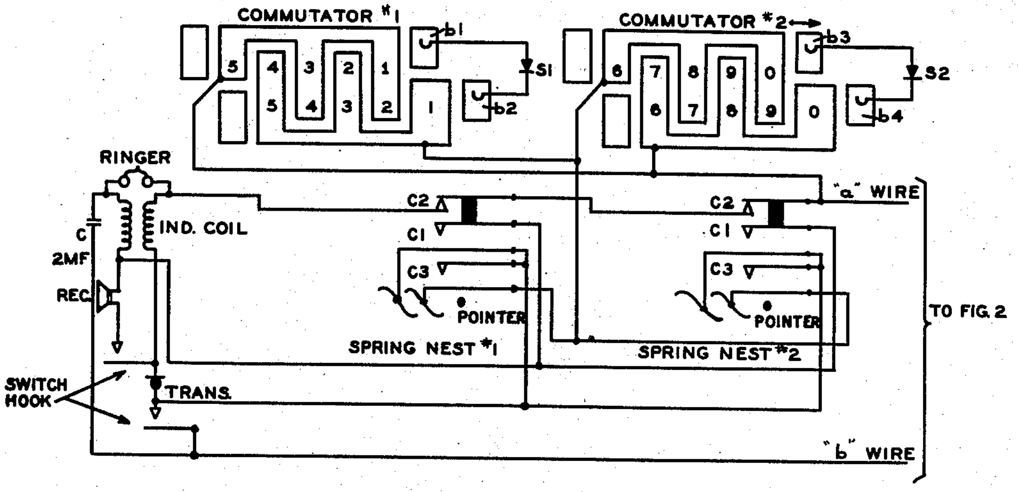

PULSING SCHEME

| DIGIT | | | |
|---|---|---|---|
| 1 | + | 6 | − + − + − |
| 2 | − + | 7 | + − + − |
| 3 | + − + | 8 | − + − |
| 4 | − + − + | 9 | + − |
| 5 | + − + − + | 0 | − |

OPERATION OF KEY SET ON RELEASE
1. C1 MAKES FIRST
2. C2 OPENS NEXT
3. C3 CLOSES LAST

INVENTOR.
GERALD DEAKIN
BY *Robert Harding, Jr.*
ATTORNEY

Oct. 10, 1950 G. DEAKIN 2,524,774

TELEPHONE SYSTEM

Filed Feb. 4, 1946 51 Sheets-Sheet 4

4 PARTY LINE CIRCUIT TERMINAL PER STATION

LINE FINDER CIRCUIT

INVENTOR.
GERALD DEAKIN

BY Robert Harding, Jr.

ATTORNEY

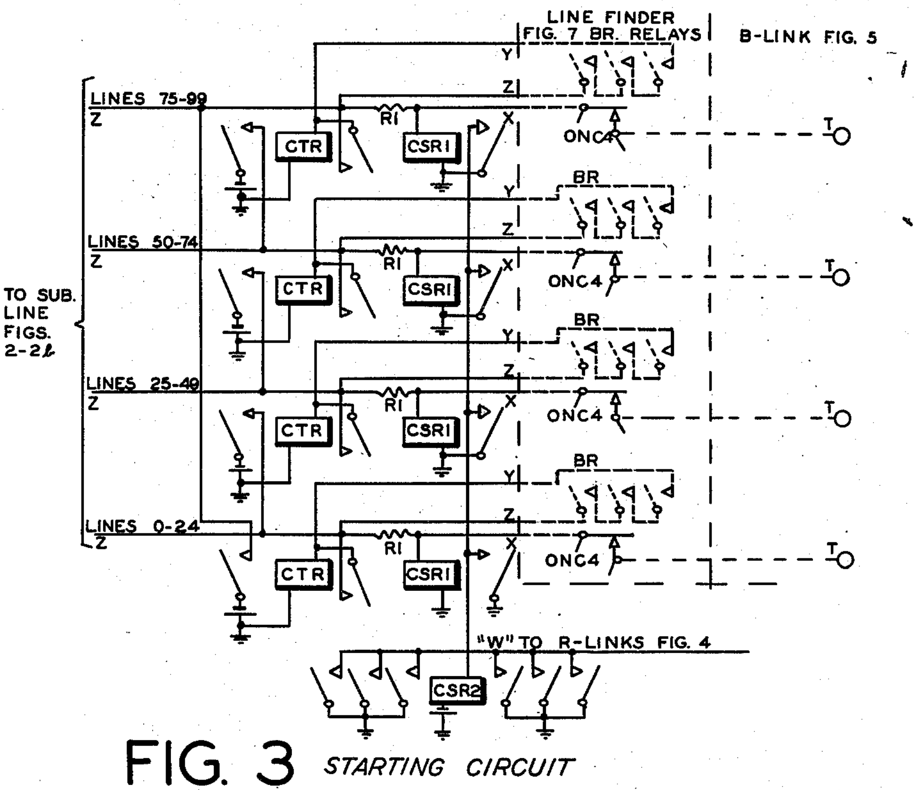
FIG. 3 STARTING CIRCUIT
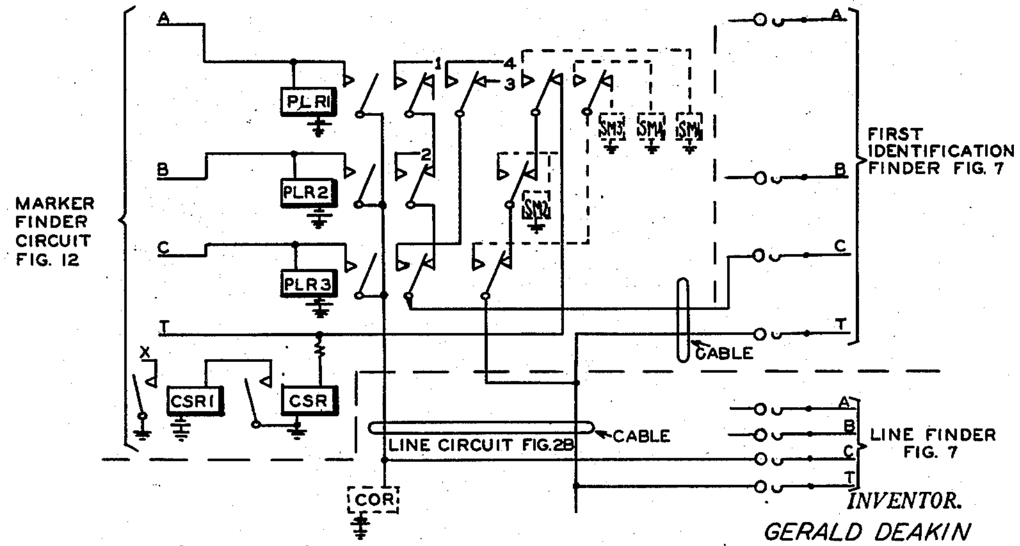
FIG. 11
STATION MARKING CIRCUIT
- 4 PARTY -
INVENTOR.
GERALD DEAKIN
BY Robert Harding Jr.
ATTORNEY

R-LINK CIRCUIT
4 PARTY LINE RINGING

NOTES:
※ MAKES BEFORE "a" BREAKS
RESISTANCES APPROXIMATE
(M) MARGINAL

INVENTOR.
GERALD DEAKIN
BY Robert Harding, Jr.
ATTORNEY

NOTE
·※· MAKES BEFORE "a" BREAKS

INVENTOR.
GERALD DEAKIN
BY Robert Harding, Jr.
ATTORNEY

Oct. 10, 1950

G. DEAKIN 2,524,774

TELEPHONE SYSTEM

Filed Feb. 4, 1946

51 Sheets-Sheet 8

INVENTOR.
GERALD DEAKIN
BY Robert Harding, Jr.
ATTORNEY

Oct. 10, 1950 G. DEAKIN 2,524,774

TELEPHONE SYSTEM

Filed Feb. 4, 1946 51 Sheets-Sheet 9

INVENTOR.
GERALD DEAKIN
BY Robert Harding, Jr.
ATTORNEY

Oct. 10, 1950 G. DEAKIN 2,524,774

TELEPHONE SYSTEM

Filed Feb. 4, 1946 51 Sheets-Sheet 10

INVENTOR.
GERALD DEAKIN
BY Robert Harding, Jr.
ATTORNEY

INVENTOR.
GERALD DEAKIN
BY Robert Harding, Jr
ATTORNEY

Oct. 10, 1950 G. DEAKIN 2,524,774

TELEPHONE SYSTEM

Filed Feb. 4, 1946 51 Sheets-Sheet 12

INVENTOR.
GERALD DEAKIN
BY Robert Harding, Jr.
ATTORNEY

INVENTOR.
GERALD DEAKIN
BY Robert Harding, Jr.
ATTORNEY

INVENTOR.
GERALD DEAKIN
BY Robert Harding, Jr.
ATTORNEY

Oct. 10, 1950 G. DEAKIN 2,524,774

TELEPHONE SYSTEM

Filed Feb. 4, 1946 51 Sheets-Sheet 15

INVENTOR.
GERALD DEAKIN
BY Robert Harding Jr.
ATTORNEY

Oct. 10, 1950 G. DEAKIN 2,524,774

TELEPHONE SYSTEM

Filed Feb. 4, 1946 51 Sheets-Sheet 16

INVENTOR.
GERALD DEAKIN
BY Robert Harding, Jr.
ATTORNEY

Oct. 10, 1950 G. DEAKIN 2,524,774

TELEPHONE SYSTEM

Filed Feb. 4, 1946 51 Sheets-Sheet 17

INVENTOR.
GERALD DEAKIN
BY Robert Harding, Jr.
ATTORNEY

Oct. 10, 1950 G. DEAKIN 2,524,774

TELEPHONE SYSTEM

Filed Feb. 4, 1946 51 Sheets-Sheet 18

INVENTOR.
GERALD DEAKIN
BY Robert Harding, Jr.
ATTORNEY

INVENTOR.
GERALD DEAKIN
BY Robert Harding, Jr.
ATTORNEY

Oct. 10, 1950 G. DEAKIN 2,524,774

TELEPHONE SYSTEM

Filed Feb. 4, 1946 51 Sheets-Sheet 20

INVENTOR.
GERALD DEAKIN
BY Robert Harding, Jr.
ATTORNEY

Oct. 10, 1950 G. DEAKIN 2,524,774

TELEPHONE SYSTEM

Filed Feb. 4, 1946 51 Sheets-Sheet 21

INVENTOR.
GERALD DEAKIN
BY Robert Harding, Jr.
ATTORNEY

Oct. 10, 1950 G. DEAKIN 2,524,774

TELEPHONE SYSTEM

Filed Feb. 4, 1946 51 Sheets-Sheet 22

INVENTOR.
GERALD DEAKIN
BY Robert Harding, Jr.
ATTORNEY

INVENTOR.
GERALD DEAKIN
BY Robert Harding, Jr.
ATTORNEY

Oct. 10, 1950 G. DEAKIN 2,524,774

TELEPHONE SYSTEM

Filed Feb. 4, 1946 51 Sheets-Sheet 24

INVENTOR.
GERALD DEAKIN
BY Robert Harding, Jr.
ATTORNEY

Oct. 10, 1950 G. DEAKIN 2,524,774

TELEPHONE SYSTEM

Filed Feb. 4, 1946 51 Sheets-Sheet 25

INVENTOR.
GERALD DEAKIN
BY Robert Harding, Jr.
ATTORNEY

Oct. 10, 1950 G. DEAKIN 2,524,774

TELEPHONE SYSTEM

Filed Feb. 4, 1946 51 Sheets-Sheet 26

INVENTOR.
GERALD DEAKIN

BY Robert Harding, Jr.

ATTORNEY

Oct. 10, 1950 G. DEAKIN 2,524,774

TELEPHONE SYSTEM

Filed Feb. 4, 1946 51 Sheets-Sheet 27

INVENTOR.
GERALD DEAKIN
BY Robert Harding, Jr.
ATTORNEY

Oct. 10, 1950 G. DEAKIN 2,524,774

TELEPHONE SYSTEM

Filed Feb. 4, 1946 51 Sheets-Sheet 28

INVENTOR.
GERALD DEAKIN
BY Robert Harding, Jr.
ATTORNEY

Oct. 10, 1950 G. DEAKIN 2,524,774

TELEPHONE SYSTEM

Filed Feb. 4, 1946 51 Sheets-Sheet 29

INVENTOR.
GERALD DEAKIN
BY Robert Harding, Jr
ATTORNEY

ASSIGNMENT OF TEST POTENTIALS
FOR REGISTER CIRCUIT

| VOLTS | PN OR PS NO. | LINE FINDER | | GROUP SELECTORS | | F- (FINAL) SELECTOR "TENS" | | F- (FINAL) SELECTOR (UNITS) | |
|---|---|---|---|---|---|---|---|---|---|
| | | T (PN) | B (PS) | T (PN) | B (PS) | T (PN) | B (PS) | T (PN) | B (PS) |
| - 4 | 20 | | | DIGIT Y | DIGIT Y | | | | |
| - 6 | 1 | PC1 | ML-K | DIGIT 1 | DIGIT 1 | | | DIGIT 1 | |
| - 8 | 2 | PC2 | ML-D | DIGIT 2 | DIGIT 2 | | | DIGIT 2 | |
| - 10 | 3 | | PL-K | DIGIT 3 | DIGIT 3 | | | DIGIT 3 | |
| - 12 | 4 | | | DIGIT 4 | DIGIT 4 | | | DIGIT 4 | |
| - 14 | 5 | | | DIGIT 5 | DIGIT 5 | | | DIGIT 5 | AD OR GK CONN. |
| - 16 | 6 | | | DIGIT 6 | DIGIT 6 | | | DIGIT 6 | PL A OR G CONN. |
| - 18 | 7 | | | DIGIT 7 | DIGIT 7 | | | DIGIT 7 | PL D OR K CONN. |
| - 20 | 8 | | | DIGIT 8 | DIGIT 8 | | | DIGIT 8 | |
| - 22 | 9 | | | DIGIT 9 | DIGIT 9 | | | DIGIT 9 | |
| - 24 | 10 | PL-A | | DIGIT 0 | DIGIT 0 | | | DIGIT 0 | |
| - 26 | 11 | PL-D | | DIGIT X | DIGIT X | DIGITS 1/0 | | | |
| - 28 | 12 | PL-G | | MM 2 | OT-U | DIGITS 2/9 | | | ML-FREE |
| - 30 | 13 | PL-K | | MM 3 | OT-S | DIGITS 3/8 | | | ML PL-BUSY |
| - 32 | 14 | I-1 | | I-1 | | DIGITS 4/7 | | | |
| - 34 | 15 | I-2 | | I-2 | | DIGITS 5/6 | | | |
| - 36 | 16 | I-3 | | I-3 | | | | N.E. NO. | |
| - 38 | 17 | I-4 | | I-4 | | N.E. NO. | | | |
| - 40 | 18 | I-5 | | I-5 | | | | | |
| - 42 | 19 | I-6 | | I-6 | | | | | |
| | | | | | | | | | |

PC - CALLING POTENTIAL
ML - MAIN LINE OR PBX
PL - 4 PARTY LINE
K - KEY SET
D - DIAL

PL — A, D, G OR J STATION IDENTIFICATION
I — CALLING LINE NUMBER IDENTIFICATION
OT — OUTTRUNK TO UNIVERSAL
OS — OUTTRUNK TO STROWGER
MM2 — MULTIPLE METERING TWICE
MM3 — MULTIPLE METERING THRICE
PC1 — UNRESTRICTED SERVICE
PC2 — RESTRICTED SERVICE
N.E. — NON-EXISTING

FIG. 6x

INVENTOR.
GERALD DEAKIN
BY Robert Harding, Jr.
ATTORNEY

MODIFICATION OF REGISTER CIRCUIT TO CHECK TUBES

MODIFICATION OF REGISTER CIRCUIT-AN ALTERNATIVE ARRANGEMENT OF DIGIT STORING RELAYS

INVENTOR.
GERALD DEAKIN
BY Robert Harding, Jr.
ATTORNEY

Oct. 10, 1950 G. DEAKIN 2,524,774

TELEPHONE SYSTEM

Filed Feb. 4, 1946 51 Sheets-Sheet 32

*REGISTER CIRCUIT*
*ALTERNATE KEYING CIRCUIT*

NOTE:
RESISTANCES APPROXIMATE
"N" VOLTAGE AND FREQUENCY APPROXIMATE

*MODIFICATION OF REGISTER CIRCUIT FOR ELECTRONIC BUSY ON SECOND TEST*

INVENTOR.
GERALD DEAKIN
BY Robert Harding Jr.
ATTORNEY

PULSE SENDER CIRCUIT
TO UNIVERSAL & STROWGER

NOTE:
※ MAKES BEFORE "a" BREAKS

INVENTOR.
GERALD DEAKIN
BY Robert Harding, Jr.
ATTORNEY

*REGISTER CIRCUIT MODIFIED FOR SINGLE TUBE TESTING OF CALLING LINE*

*MODIFICATION OF REGISTER CIRCUIT FOR 4 PARTY RINGING TERMINAL PER STATION*

INVENTOR.
GERALD DEAKIN
BY Robert Harding, Jr.
ATTORNEY

Oct. 10, 1950 G. DEAKIN 2,524,774

TELEPHONE SYSTEM

Filed Feb. 4, 1946 51 Sheets-Sheet 35

*BANK CHART*

INVENTOR.
GERALD DEAKIN
BY Robert Harding, Jr.
ATTORNEY

Oct. 10, 1950 G. DEAKIN 2,524,774
TELEPHONE SYSTEM
Filed Feb. 4, 1946 51 Sheets-Sheet 36
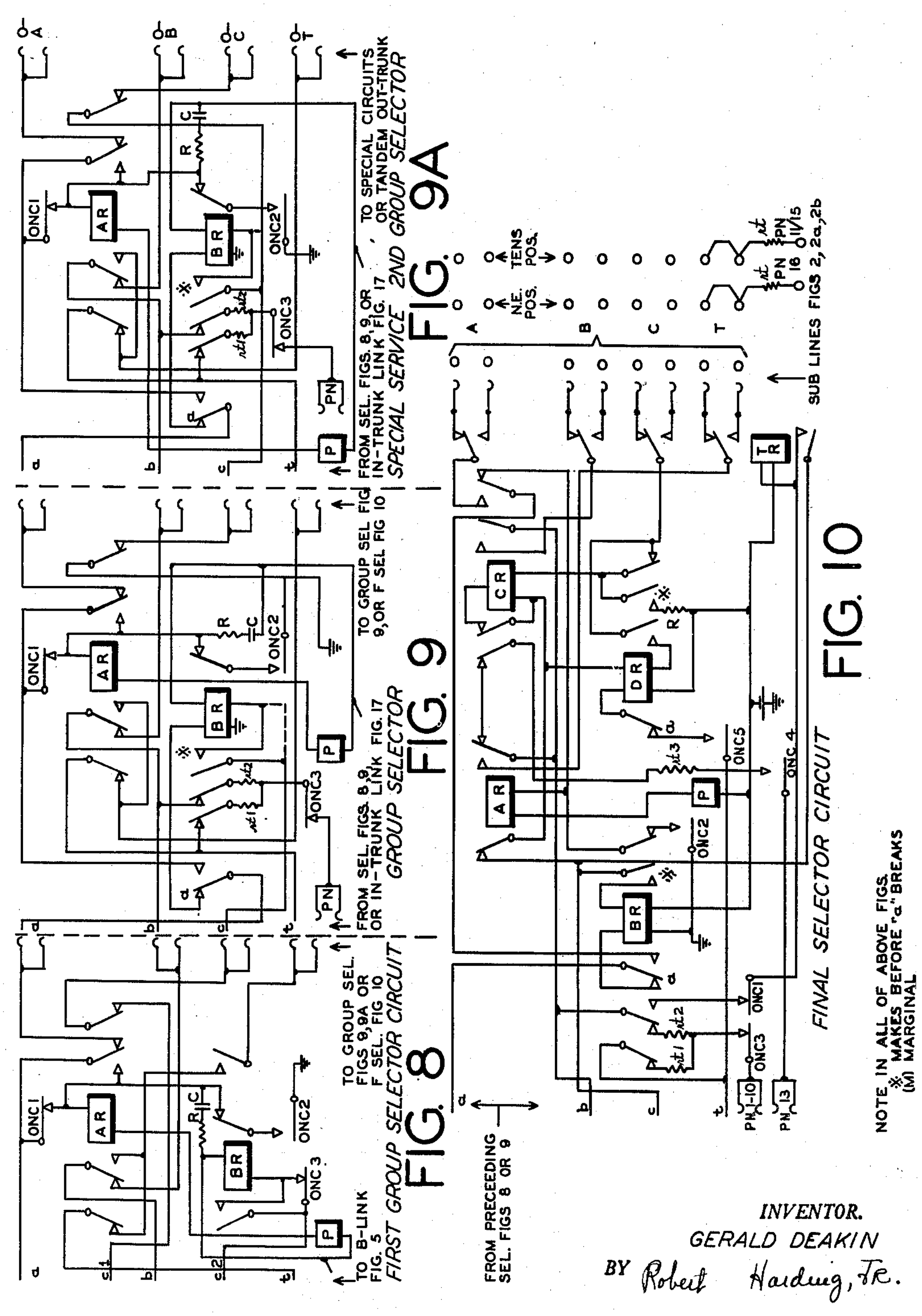
FIG. 8 FIRST GROUP SELECTOR CIRCUIT, FIG. 9 GROUP SELECTOR, FIG. 9A SPECIAL SERVICE 2ND GROUP SELECTOR, FIG. 10 FINAL SELECTOR CIRCUIT
NOTE IN ALL OF ABOVE FIGS. ※ MAKES BEFORE "a" BREAKS (M) MARGINAL
INVENTOR.
GERALD DEAKIN
BY Robert Harding, Jr.
ATTORNEY

BANK CHART

INVENTOR.
GERALD DEAKIN
BY Robert Harding, Jr.
ATTORNEY

TELEPHONE SYSTEM
Filed Feb. 4, 1946 51 Sheets-Sheet 38
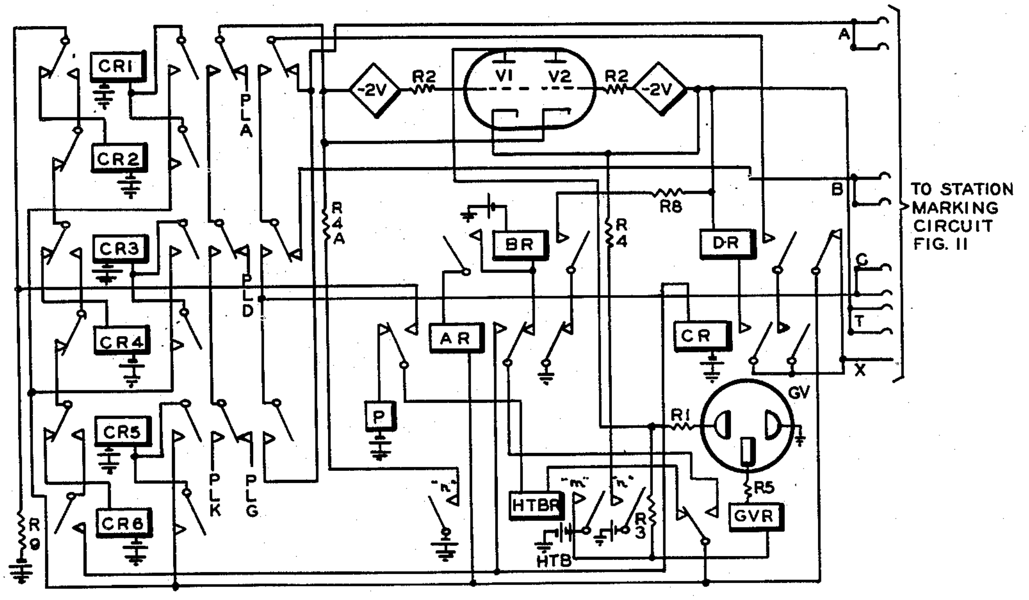
FIG. 12 *MARKER FINDER CIRCUIT FOR OUT TRUNKS*
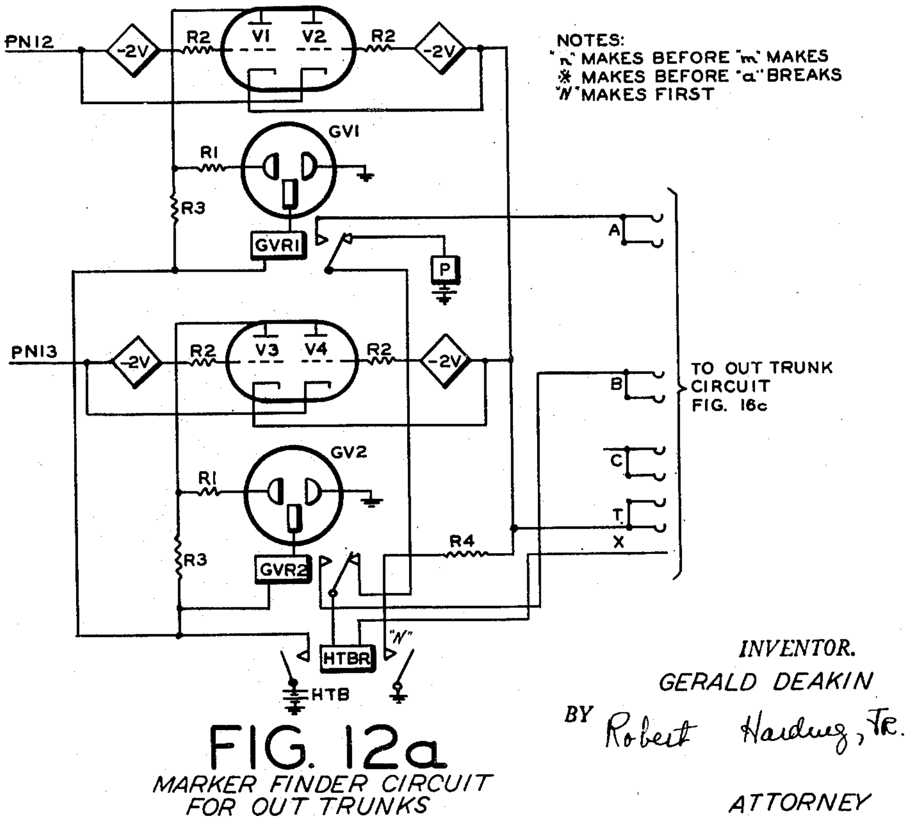
FIG. 12a *MARKER FINDER CIRCUIT FOR OUT TRUNKS*
*INVENTOR.*
*GERALD DEAKIN*
*BY* Robert Harding, Jr.
*ATTORNEY*

TRANSLATOR LINK

INVENTOR.
GERALD DEAKIN
BY Robert Harding, Jr.
ATTORNEY

Oct. 10, 1950 G. DEAKIN 2,524,774

TELEPHONE SYSTEM

Filed Feb. 4, 1946 51 Sheets-Sheet 40

*TRANSLATOR LINK, CON'T.*

NOTES:
※ MAKES BEFORE "a" BREAKS
"l" MAKES BEFORE "f" MAKES
(M) MARGINAL

INVENTOR.
GERALD DEAKIN
BY Robert Hardweg, Jr.
ATTORNEY

Oct. 10, 1950  G. DEAKIN  2,524,774

TELEPHONE SYSTEM

Filed Feb. 4, 1946  51 Sheets-Sheet 41

FINDER C
TRANSLATOR BANK CHART

INVENTOR.
GERALD DEAKIN
BY Robert Haidug, Jr.
ATTORNEY

Oct. 10, 1950 G. DEAKIN 2,524,774

TELEPHONE SYSTEM

Filed Feb. 4, 1946 51 Sheets-Sheet 42

FIG. 13d

FINDER D
TRANSLATOR BANK CHART

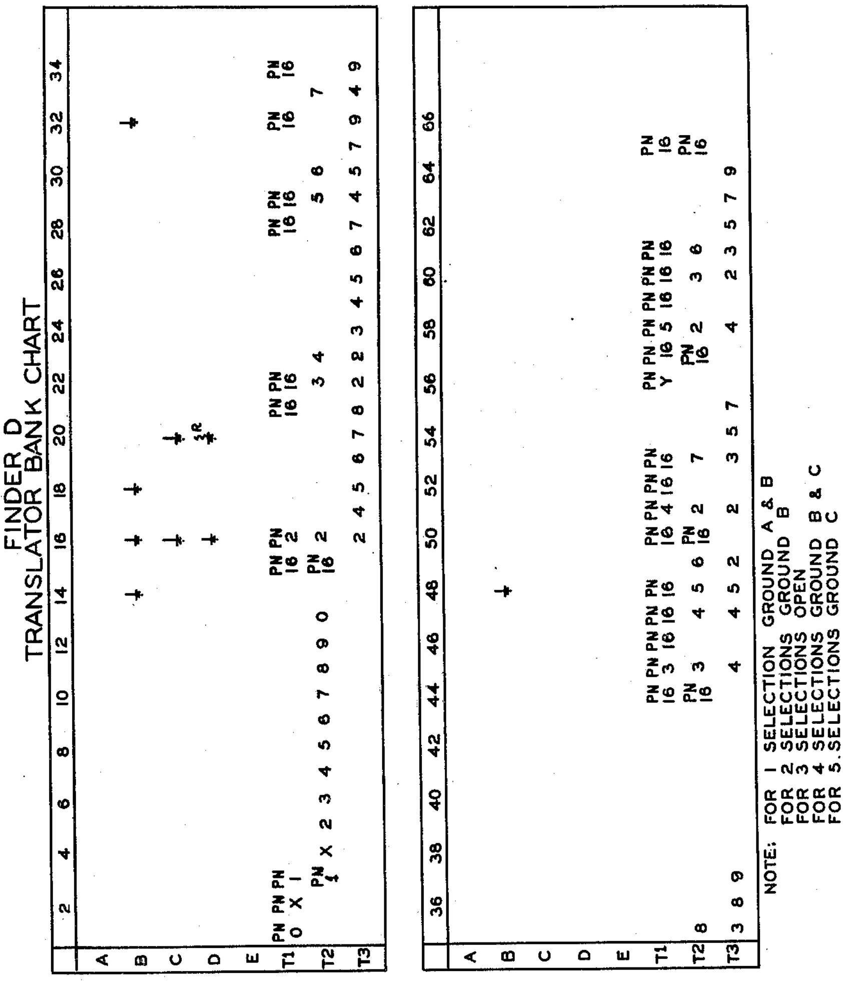

NOTE: FOR 1 SELECTION GROUND A & B
FOR 2 SELECTIONS GROUND B
FOR 3 SELECTIONS OPEN
FOR 4 SELECTIONS GROUND B & C
FOR 5 SELECTIONS GROUND C

FOR SINGLE METERING LEAVE TER. D OPEN
FOR 2 METERING GROUND TER. D
FOR 3 METERING GROUND TER D THROUGH RES. R

INVENTOR.
GERALD DEAKIN
BY Robert Harding, Jr.
ATTORNEY

Oct. 10, 1950 G. DEAKIN 2,524,774

TELEPHONE SYSTEM

Filed Feb. 4, 1946 51 Sheets-Sheet 43

OUT-TRUNK CIRCUIT

INVENTOR.
GERALD DEAKIN
BY Robert Harding, Jr.
ATTORNEY

NOTE IN ABOVE FIGS.
RESISTANCES APPROXIMATE
※ MAKES BEFORE "a" BREAKS

*TANDEM OUT-TRUNK CIRCUIT FROM FIRST OFFICE WITHOUT MULTIPLE METERING*

*TANDEM OUT-TRUNK CIRCUIT FROM FIRST OFFICE WITH FIXED MULTIPLE METERING*

*OUT-TRUNK CIRCUIT FROM TANDEM OFFICE*

*INVENTOR.*
*GERALD DEAKIN*
*BY* Robert Harding, Jr.
*ATTORNEY*

*TANDEM OUT-TRUNK CIRCUIT FROM FIRST OFFICE WITH CONTROLLED MULTIPLE METERING.*

*T-LINK FROM UNIVERSAL*

NOTE
※ MAKES BEFORE "a" BREAKS

INVENTOR.
GERALD DEAKIN
BY Robert Harding, Jr.
ATTORNEY

T-LINK
TANDEM TRUNKING
FROM UNIVERSAL

NOTE:
※ MAKES BEFORE "a" BREAKS
(M) MARGINAL

TR-LINK
UNIVERSAL TO UNIVERSAL

INVENTOR.
GERALD DEAKIN
BY Robert Harding, Jr.
ATTORNEY

TRUNK DIAGRAM
UNIVERSAL TO UNIVERSAL

NOTE:
NOT OPERATED
OPERATED
OR PULSING OR SEQUENCE

INVENTOR.
GERALD DEAKIN
BY Robert Harding, Jr.
ATTORNEY

*TRUNK DIAGRAM*
*UNIVERSAL TO UNIVERSAL*

NOTE:
NOT OPERATED
OPERATED
OR PULSING OR SEQUENCE

INVENTOR.
GERALD DEAKIN
BY Robert Harding, Jr.
ATTORNEY

TRUNK PULSE REPEATER
UNIVERSAL TO UNIVERSAL

INVENTOR.
GERALD DEAKIN
BY Robert Harding, Jr.
ATTORNEY

Oct. 10, 1950 G. DEAKIN 2,524,774

TELEPHONE SYSTEM

Filed Feb. 4, 1946 51 Sheets-Sheet 50

*TRUNK PULSE REPEATER*
*UNIVERSAL TO UNIVERSAL, CON'T.*

*INVENTOR.*
*GERALD DEAKIN*
*BY Robert Harding Jr.*
*ATTORNEY*

TRUNK PULSE REPEATER
UNIVERSAL TO UNIVERSAL, CON'T.

NOTE:
FOR FIVE DIGIT RECEPTION ADD COUNTING RELAYS CR1 a & CR2b AT POINTS ✕.

NOTE: 2
✕ MAKES BEFORE "a" BREAKS

INVENTOR.
GERALD DEAKIN
BY Robert Harding, Jr.
ATTORNEY

Patented Oct. 10, 1950

2,524,774

UNITED STATES PATENT OFFICE 2,524,774

TELEPHONE SYSTEM

Gerald Deakin, New York, N. Y., assignor to International Standard Electric Corporation, New York, N. Y., a corporation of Delaware Application February 4, 1946, Serial No. 645,408

35 Claims. (Cl. 179—27)

This invention relates to new and useful improvements in telephone systems and particularly in telephone systems of the multi-potential type.

The object of the present invention is to improve the flexibility of a telephone system by providing therein one or more of the following features:

Party lines may be selected and signaled either by providing a single set of terminals per line in the final selector, or a set of terminals per station. When a terminal per line is used, the last digit dialed by the calling subscriber determines the character of the ringing current, whereas when the terminal per station arrangement is used then the potential found on the line terminals in the final bank controls the selection of the proper ringing current. In neither case is it necessary to set aside certain groups of final selectors for controlling the ringing of the various and party line stations.

Simply by changing the potentials applied to its terminals any line may be afforded restricted or unrestricted service. The line may be equipped either with one or with another type of calling device, e. g. with a dial impulse sender or with a rectifier key set.

The characteristic potential designating the line is not removed when it is selected by a final selector, whereby the wire chief or toll operator may at any time establish a connection with the line to listen in or break down the existing connection.

In selecting a trunk or line, the selector makes a first test over a test wiper and, if the line is idle, the selector is stopped. Thereupon a second test is made over one or both talking wipers to signal the register or other circuit concerning the character of the selected line or trunk and the manner in which the call should be routed.

Local calls to busy lines are automatically broken down to the first group selector, and a busy tone is sent from the register. However, on toll calls the final selector remains on the subscriber's line and the toll operator receives the busy tone.

Calls to disconnected lines or to non-existing party line stations or to non-existing numbers are automatically routed to an intercepting operator. In the case of main lines or party lines having a set of terminals per station, this is accomplished by removing the characteristic potential which controls the numerical selection of the line or station. No jumper wires need be provided to intercept trunks.

The register circuit includes one or more pulsing equipments, depending on the number of different kinds of offices which it is desired to reach. These pulsing equipments are picked up by the register when the called number indicates that they are needed. No special arrangement or cross connections need be made in the register or the translator circuits to determine when to trunk, what kind of pulses to send, and other operations normally required in the establishment of an inter-office connection. The switching in the originating office is always on the multi-potential basis until a trunk is selected leading to a different kind of office. Then the potential found during the second test of the outgoing trunk will indicate to the register the kind of office to which the call is being routed. If the called office is a universal office controled on the multi-potential basis, then high speed rectifier pulses will be sent from the register at the calling office, and a pulse repeater at the called office will translate these pulses to the required potentials without storing them. If the call is to a step-by-step office, then the pulse sender at the calling office sends out dial pulses at the proper speed, whereby no change need be made in the wiring of the step-by-step office. If the call is to a revertive impulse type of system, then the register at the calling office is suitably readjusted to receive revertive pulses from the distant office.

Calls may be tandem trunked through a universal or multi-potential office, or through any other type of office without repetition at the tandem office. This is accomplished by controlling the release at the tandem office through the operation of a gas tube, one electrode of which is connected to one wire of the trunk and the other to ground. The tube has very high impedance, except when it is ionized and thus does not affect speech transmission. The positive voltage needed to fire the tube is applied to one side of the trunk through a high resistance while the other side is open.

The incoming trunk at a tandem office is so arranged that when an out-trunk to another office is tested the incoming trunk automatically releases the trunk through which a pulse repeater is attached, and the next series of pulses will be sent direct from the originating to the terminating office, or to the next tandem office. Tandem trunking through two, three or more intermediate offices can readily be accomplished.

Means are provided for simultaneously identifying six or more calling lines by the use of different identification potentials.

These and other features of the invention will more clearly appear from the following detailed description and the appended claims.

In the drawings:

Fig. 1 is the junction key sheet showing the manner in which the various figures should be assembled to establish intra- and inter-office connections;

Figs. 2, 2*a*, 2*b*, 2*c* and 2*d* illustrate the line and cut-off relay arrangement for the various types of lines which occur in the exchange;

Fig. 3 illustrates the starting circuit for the line and link finders;

Figure 6:
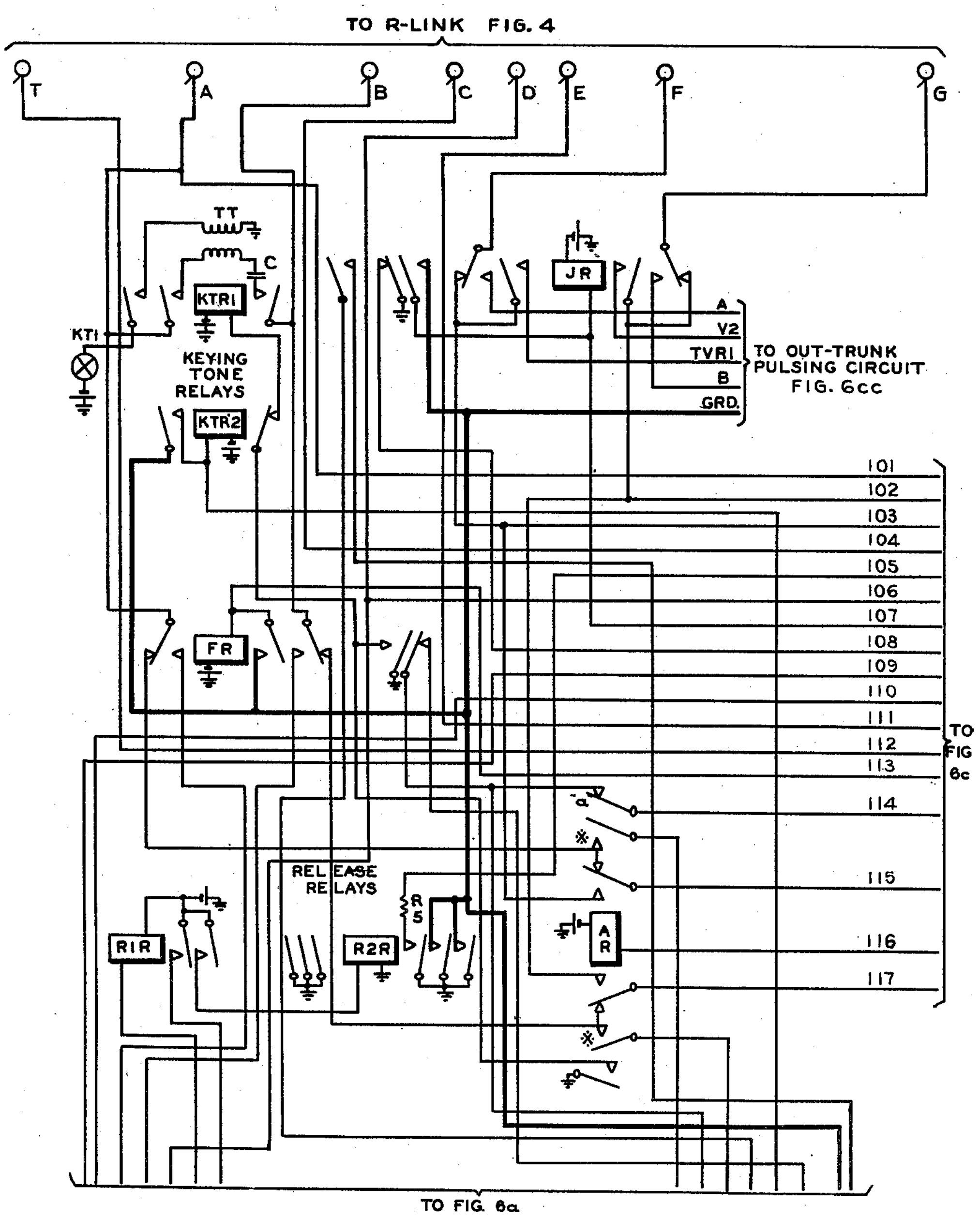
Figure 6A:
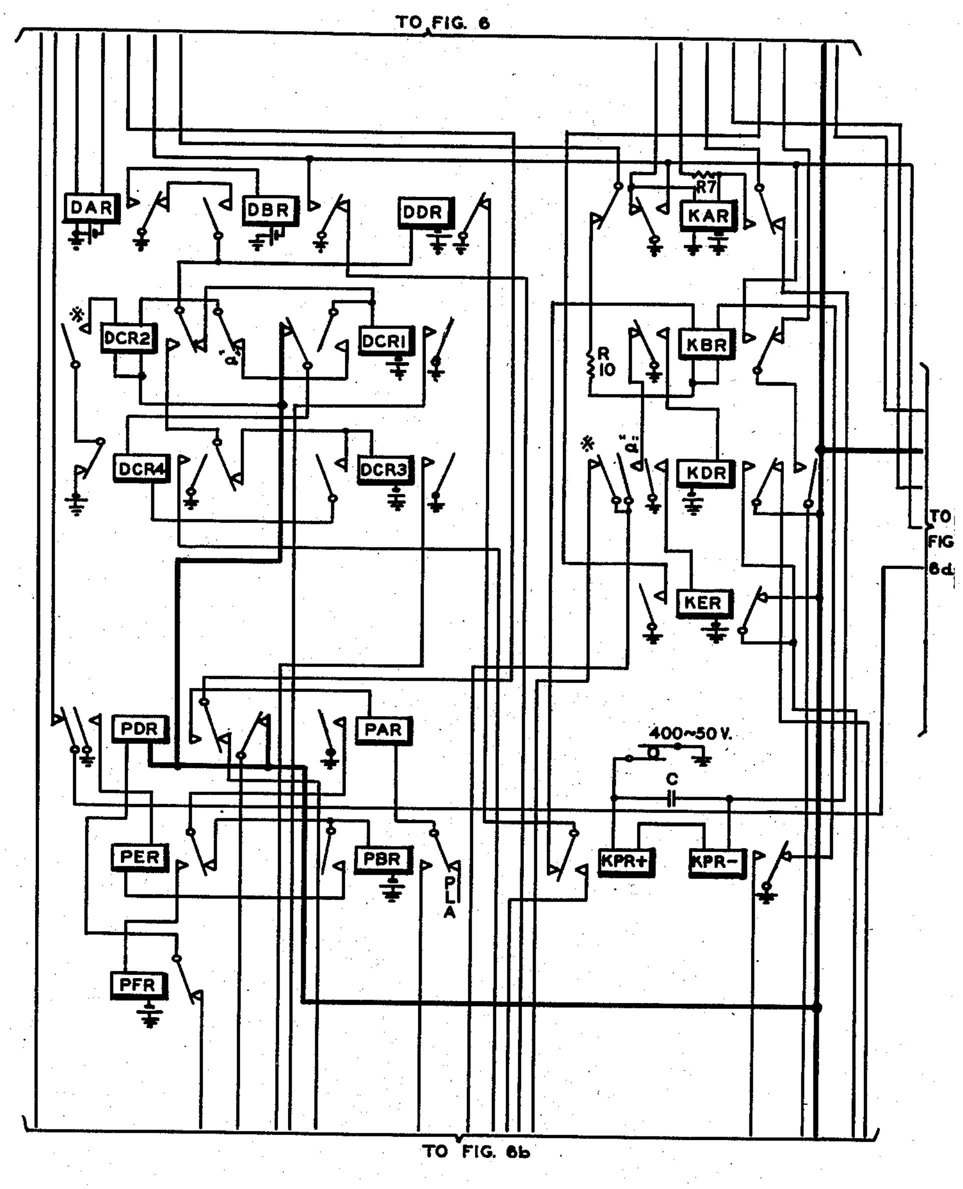
Figure 6B:
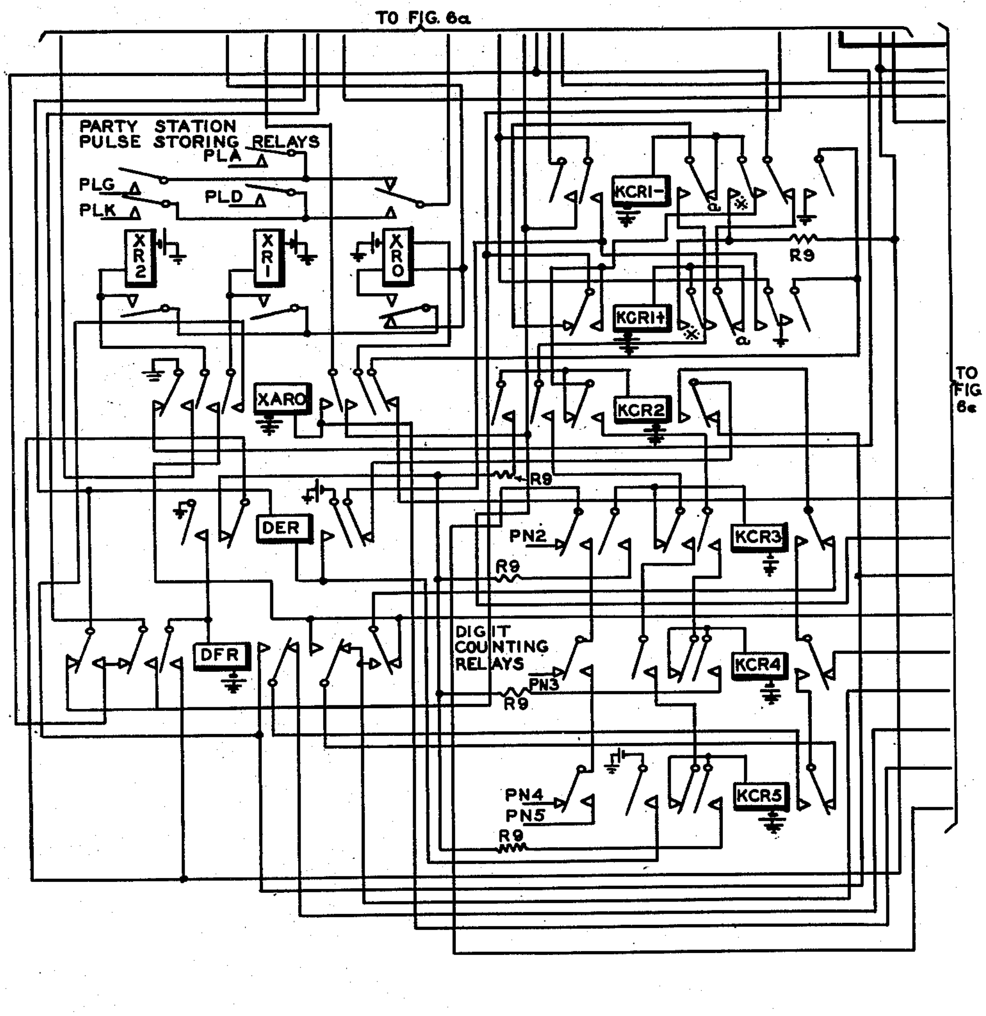
Figure 6C:
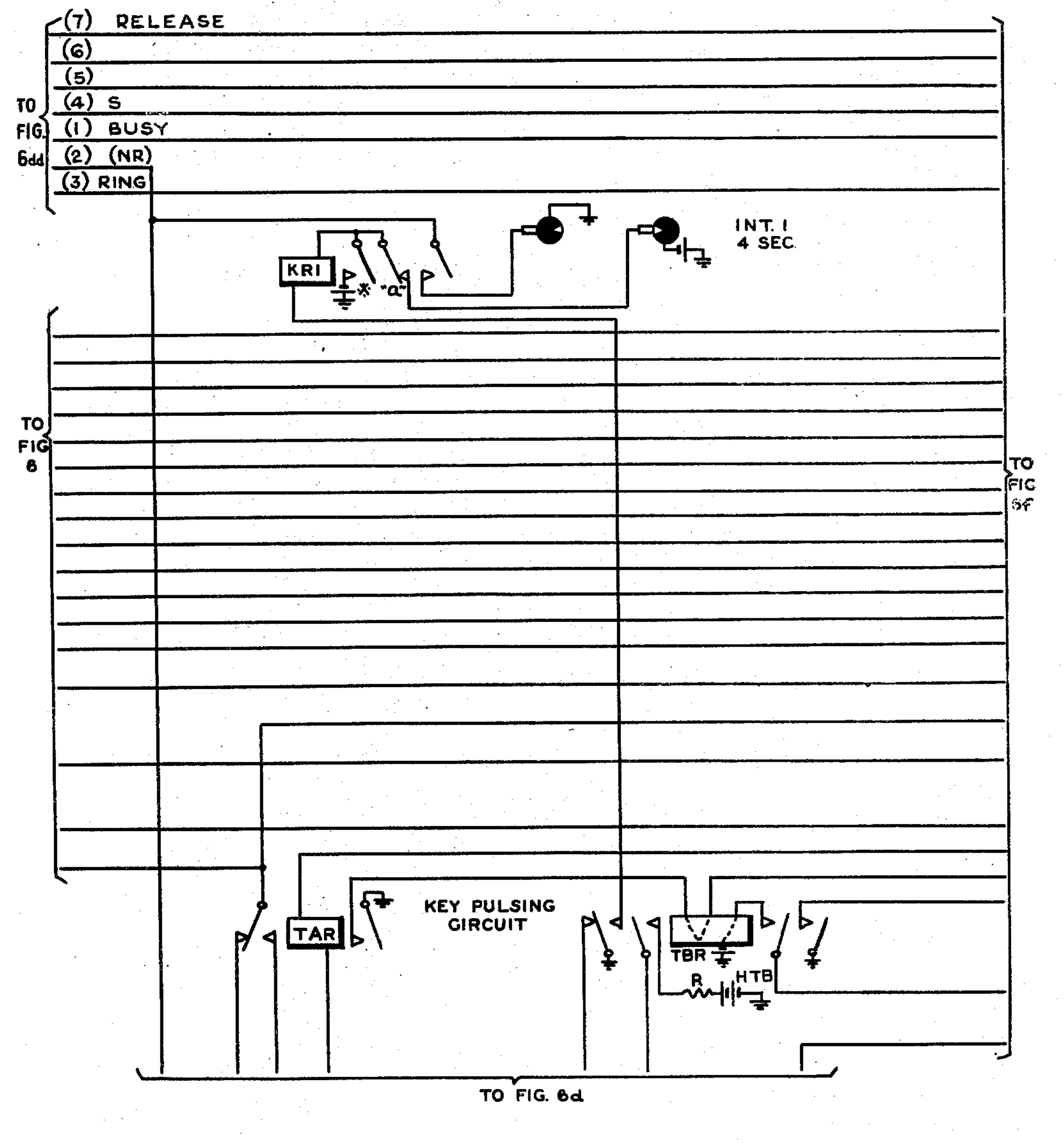
Figure 6D:
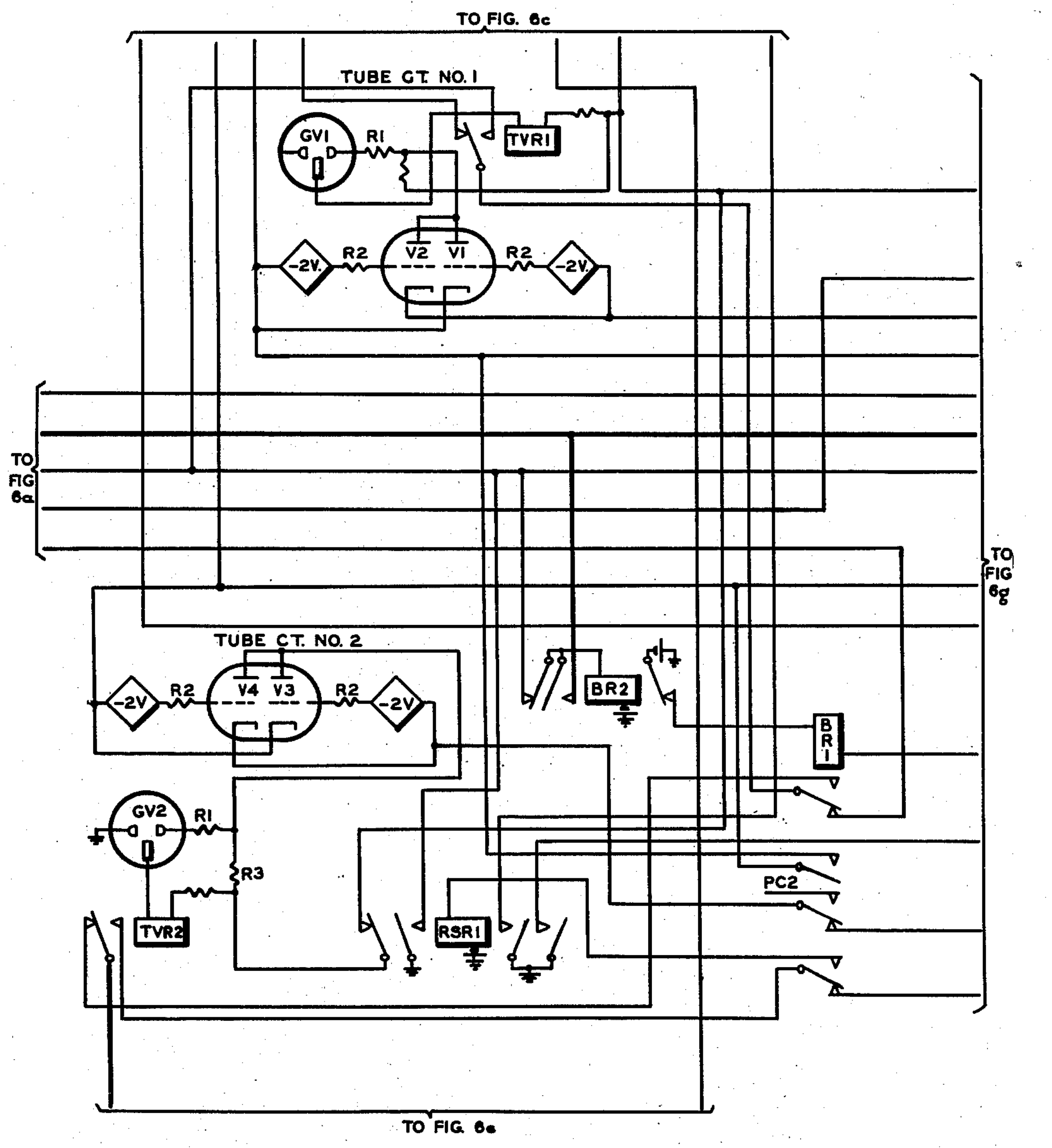
Figure 6E:
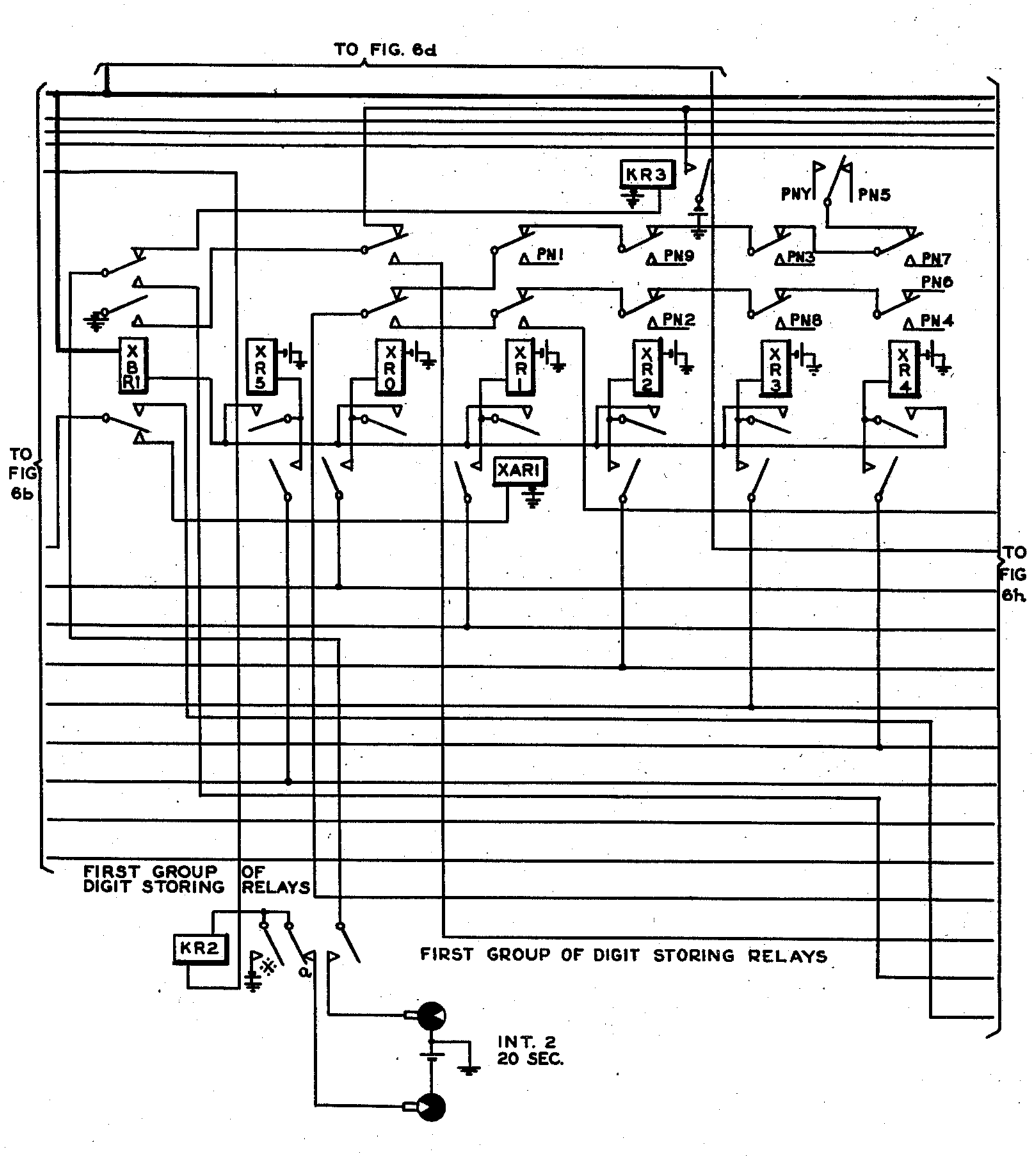
Figure 6F:
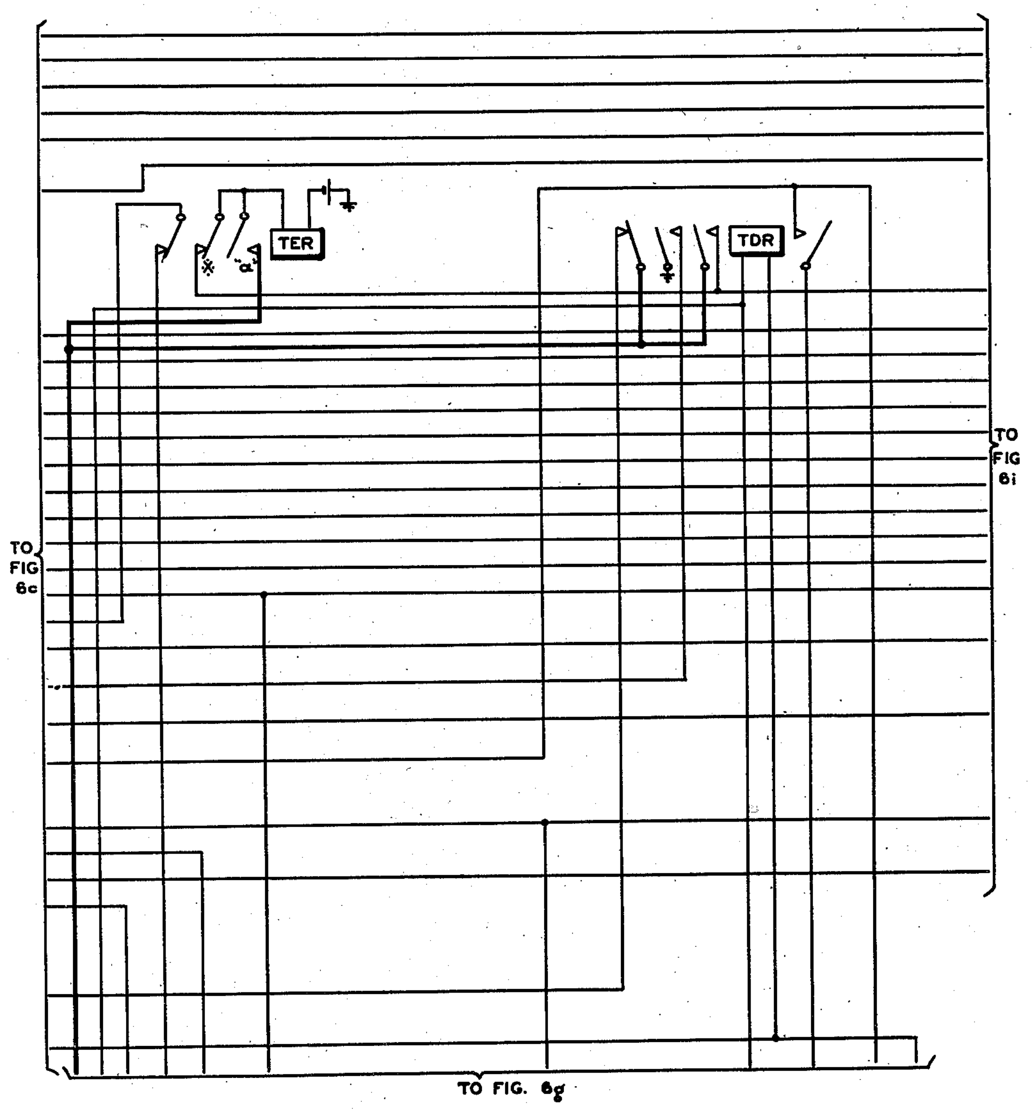
Figure 6G:
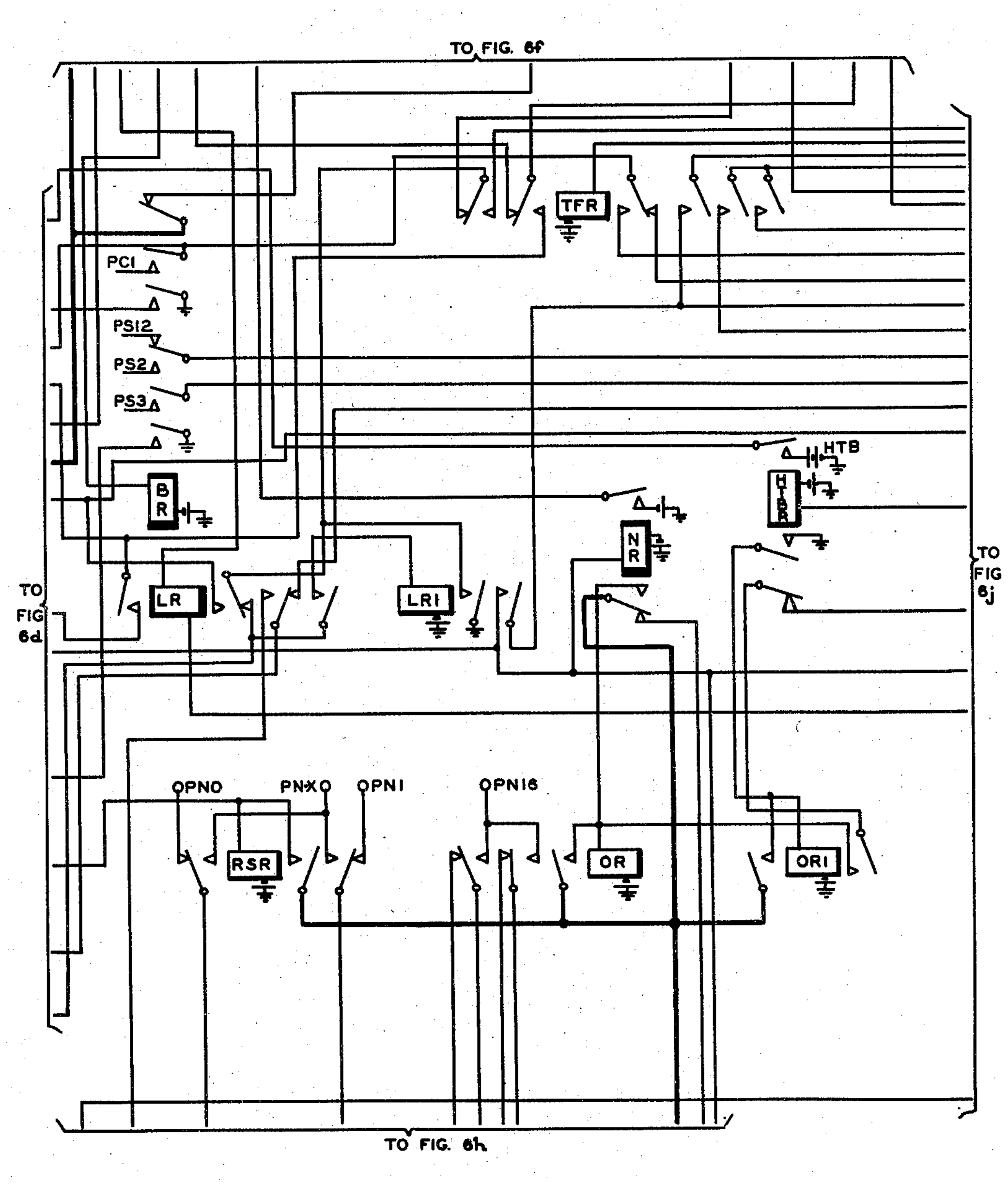
Figure 6H:
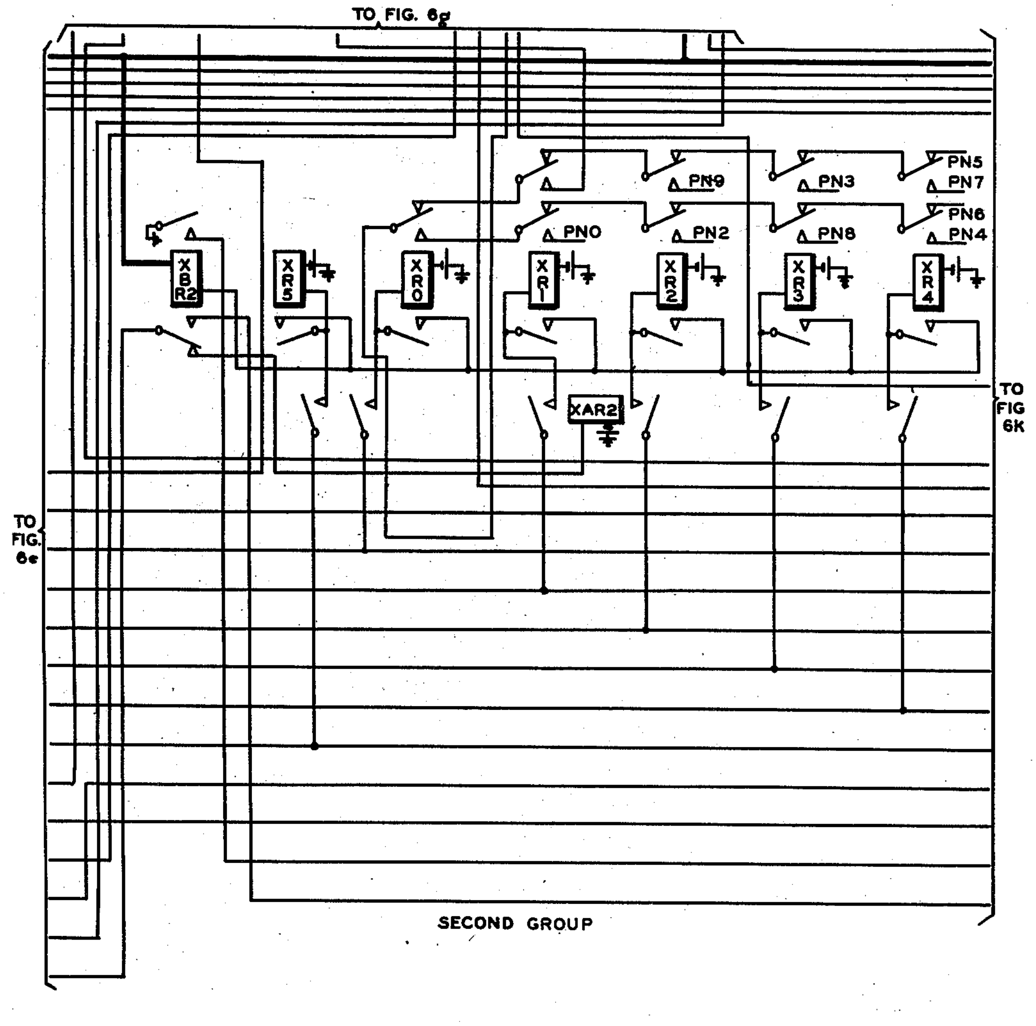
Figure 6I:
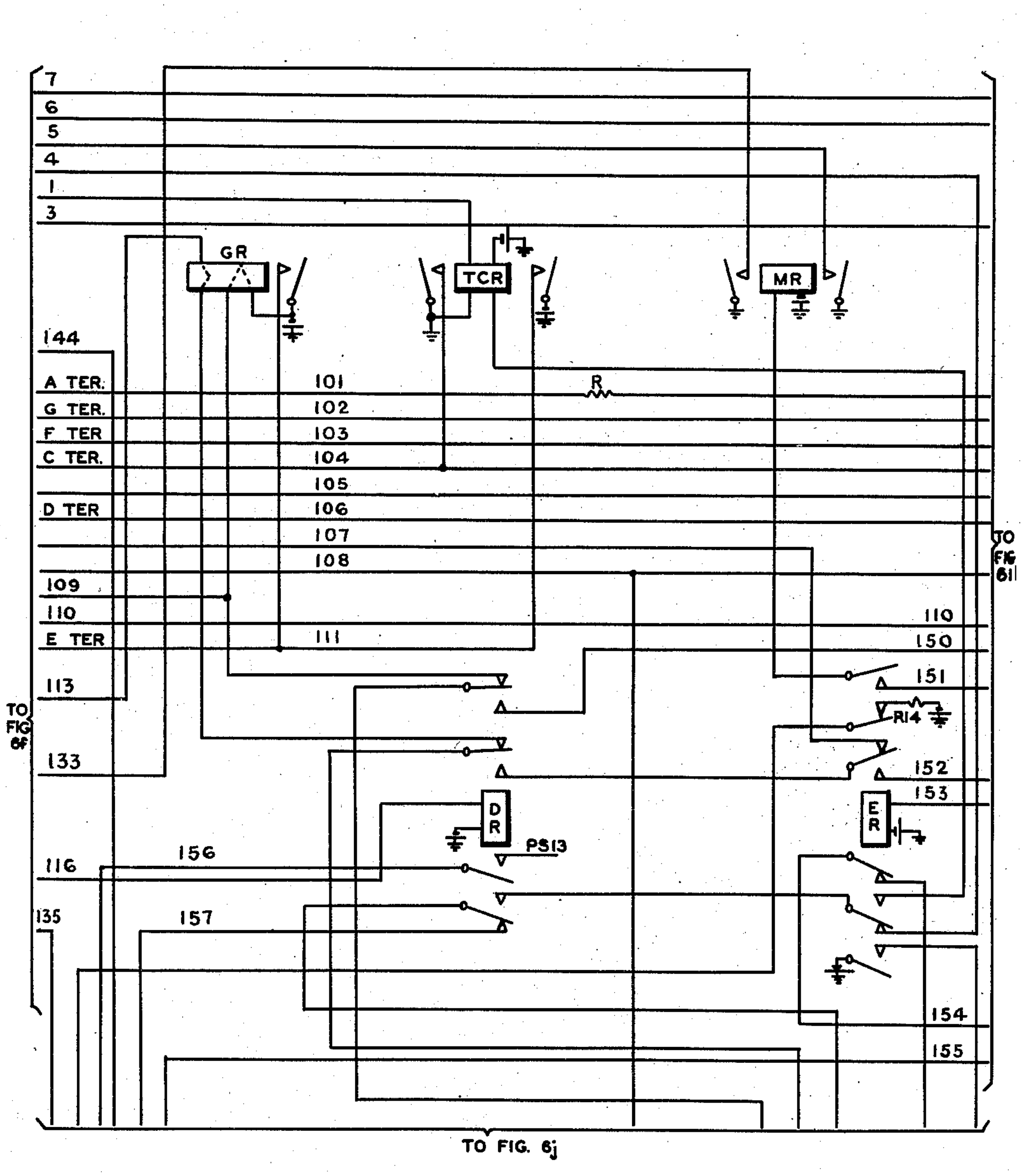
Figure 6J:
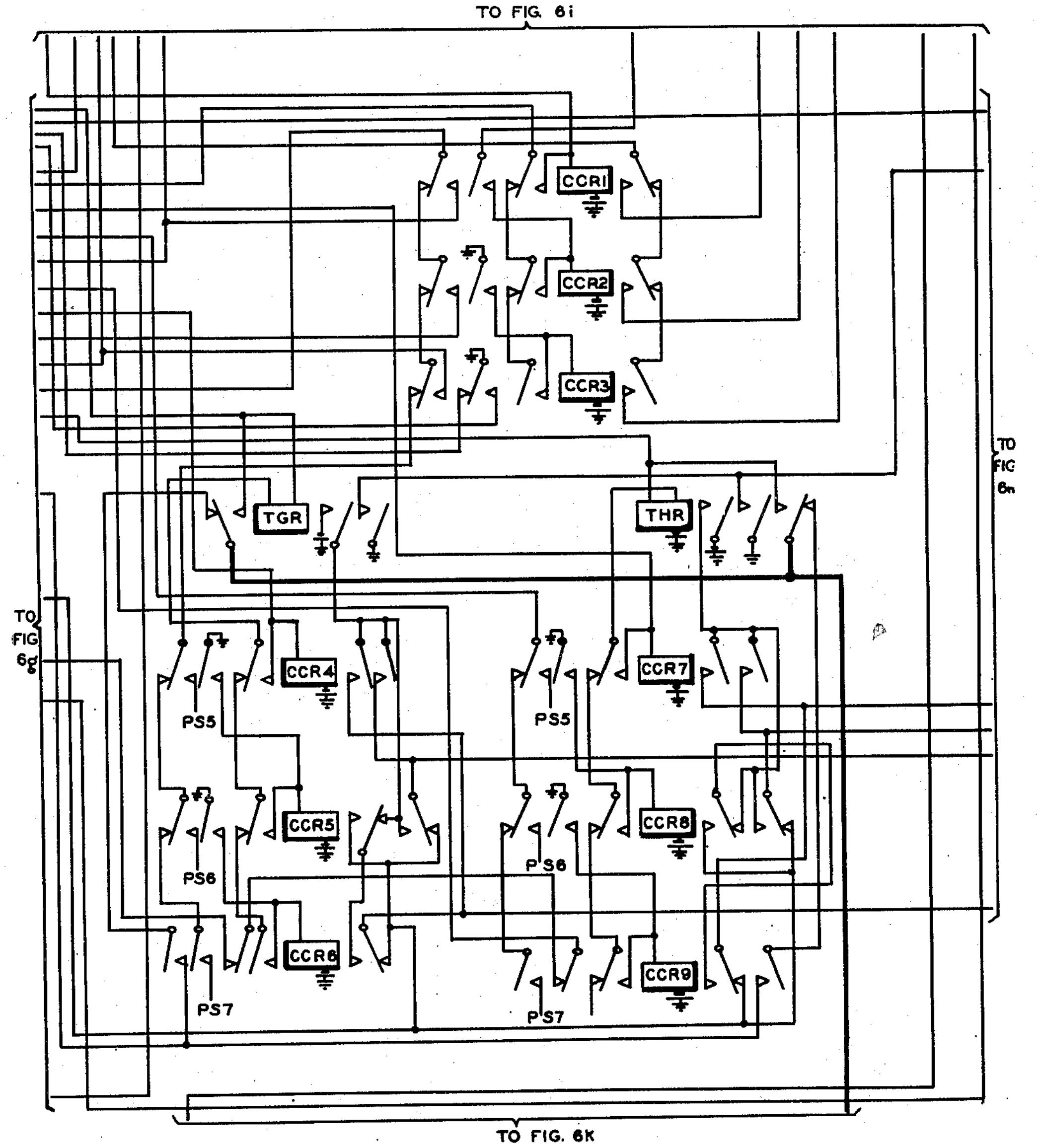
Figure 6K:
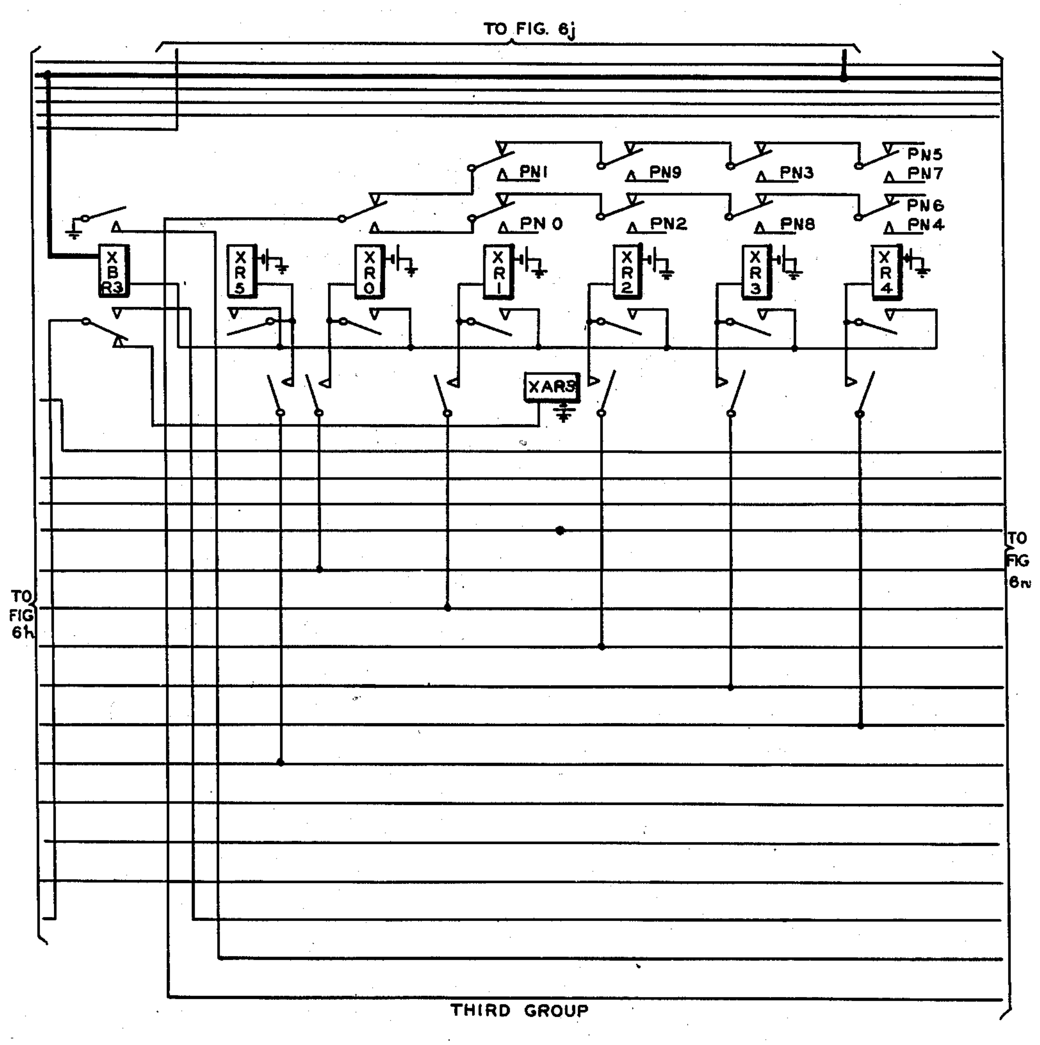
Figure 61:
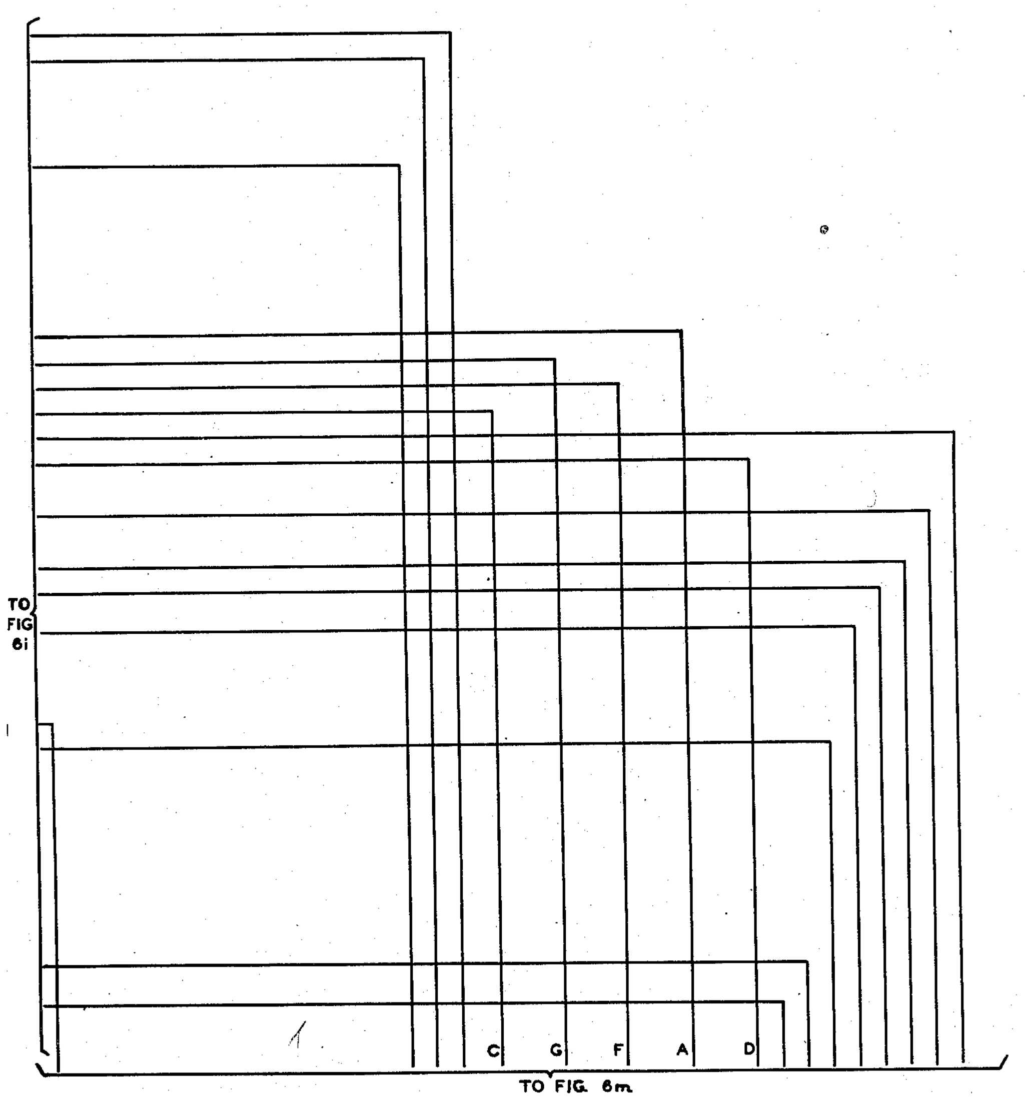
Figure 6M:
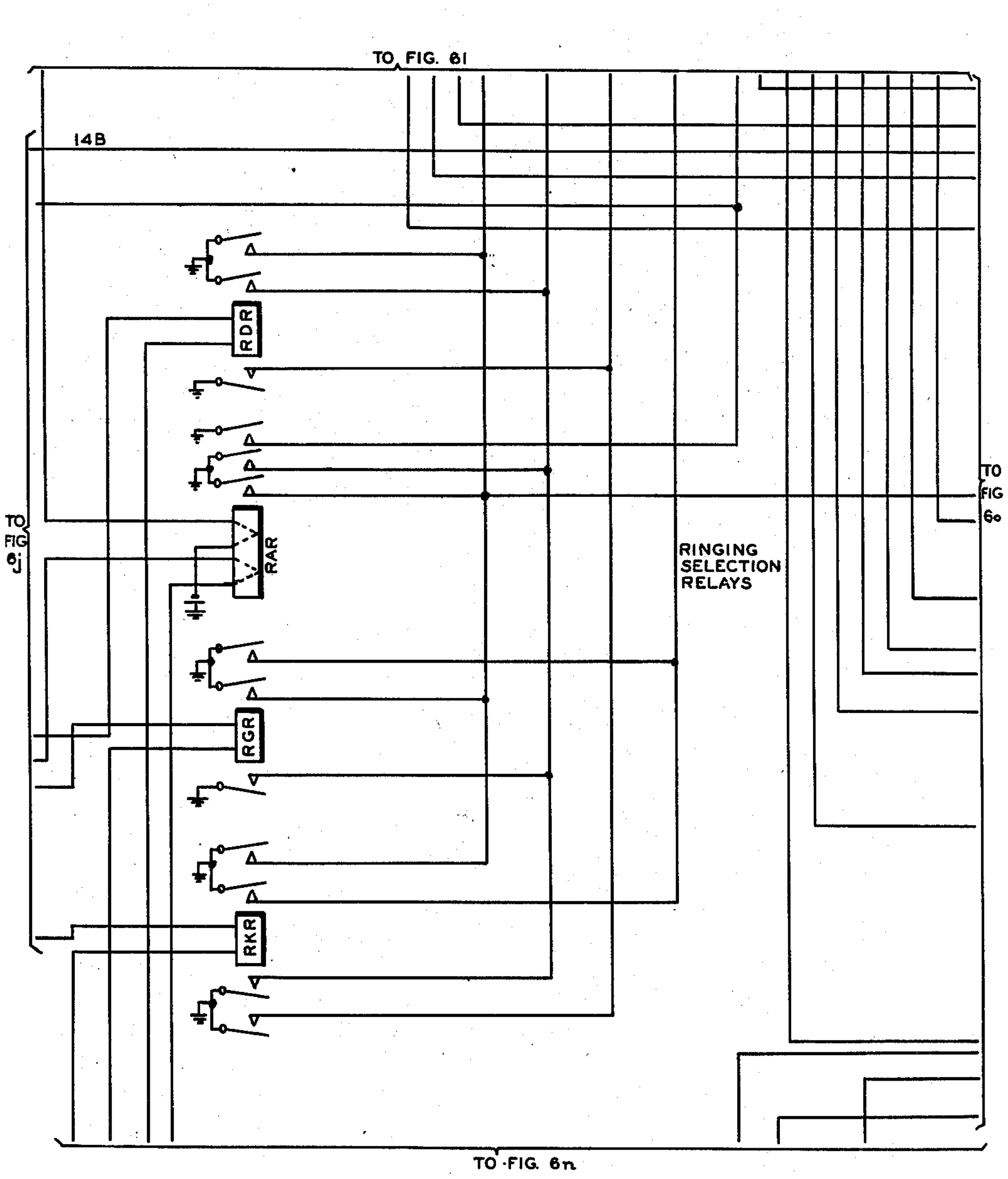
Figure 6N:
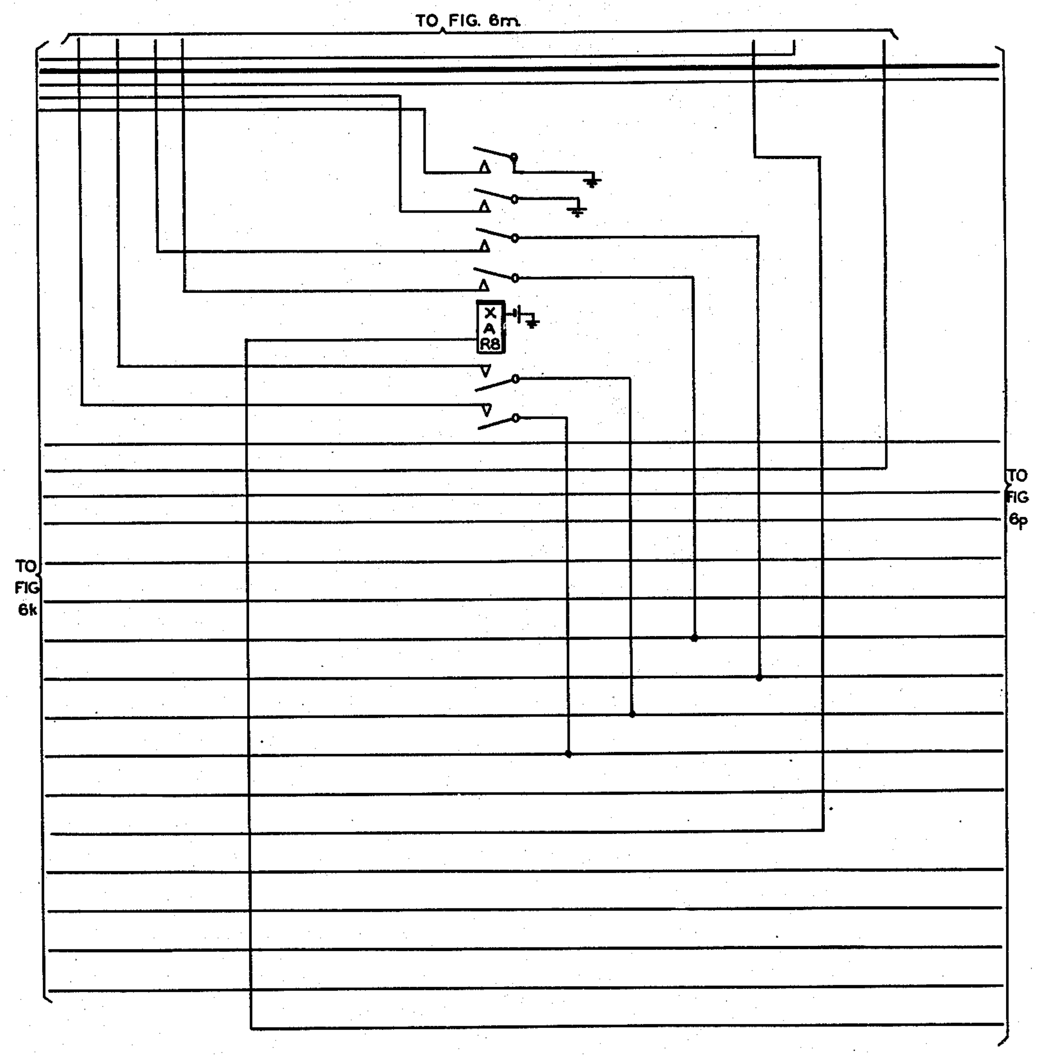
Figure 6O:
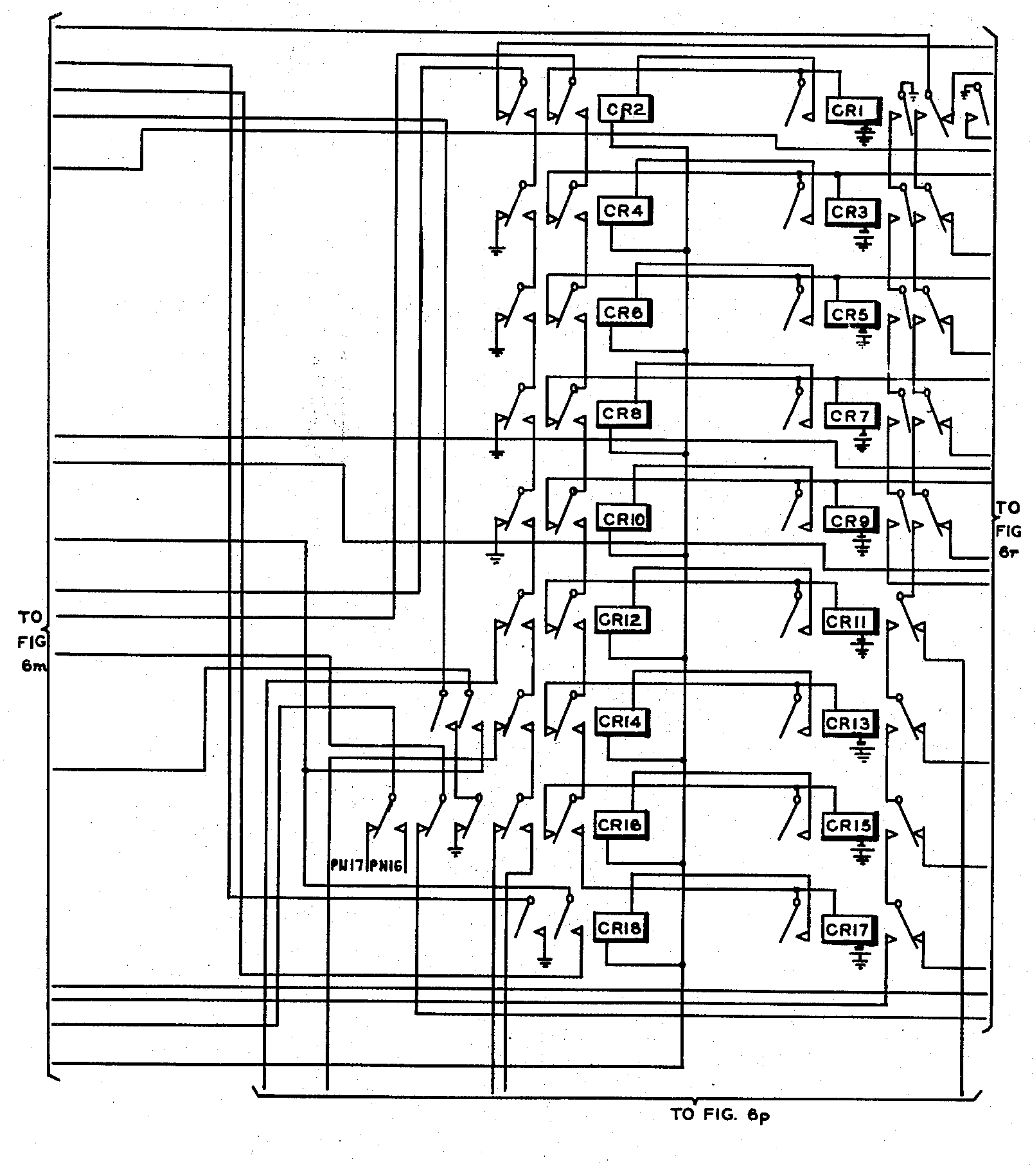
Figure 6P:
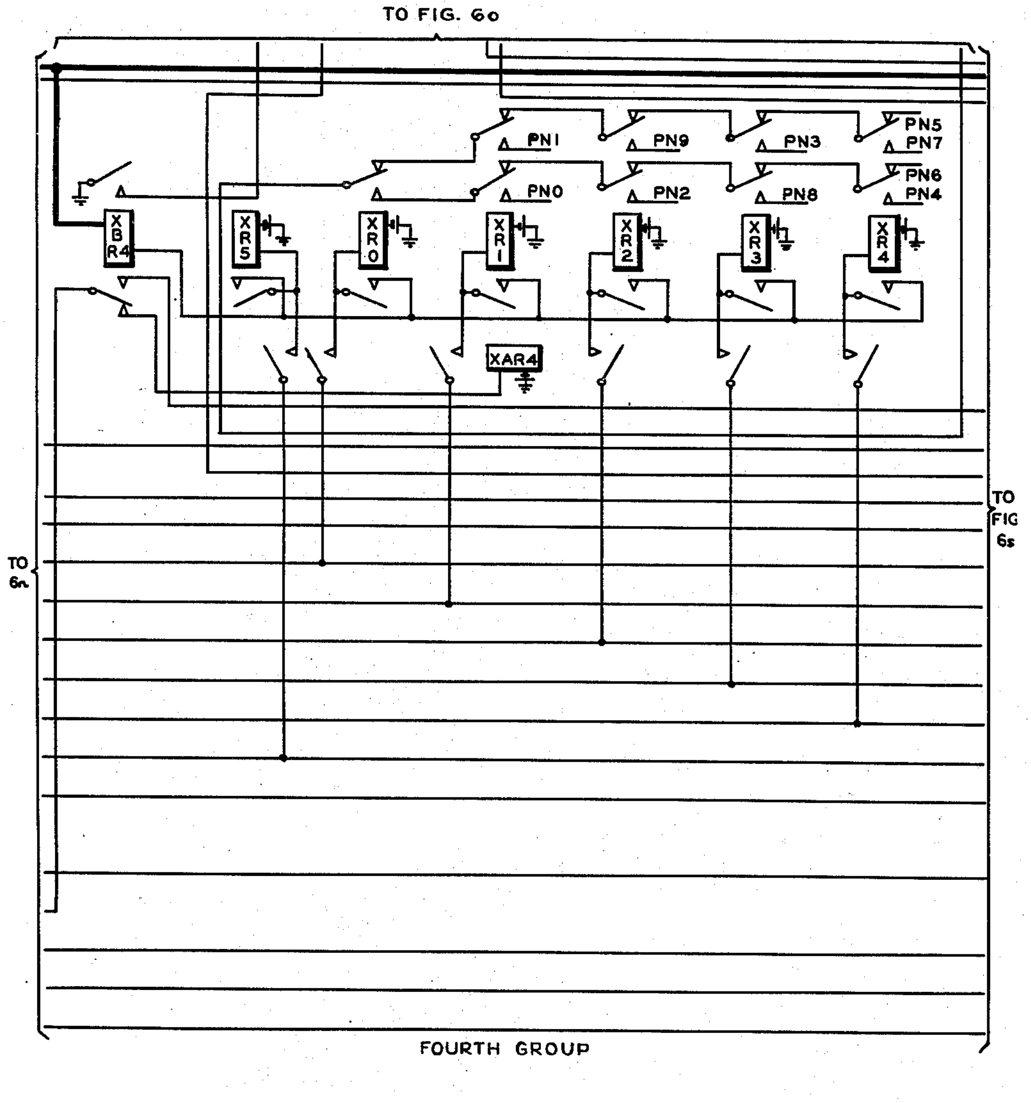
Figure 6R:
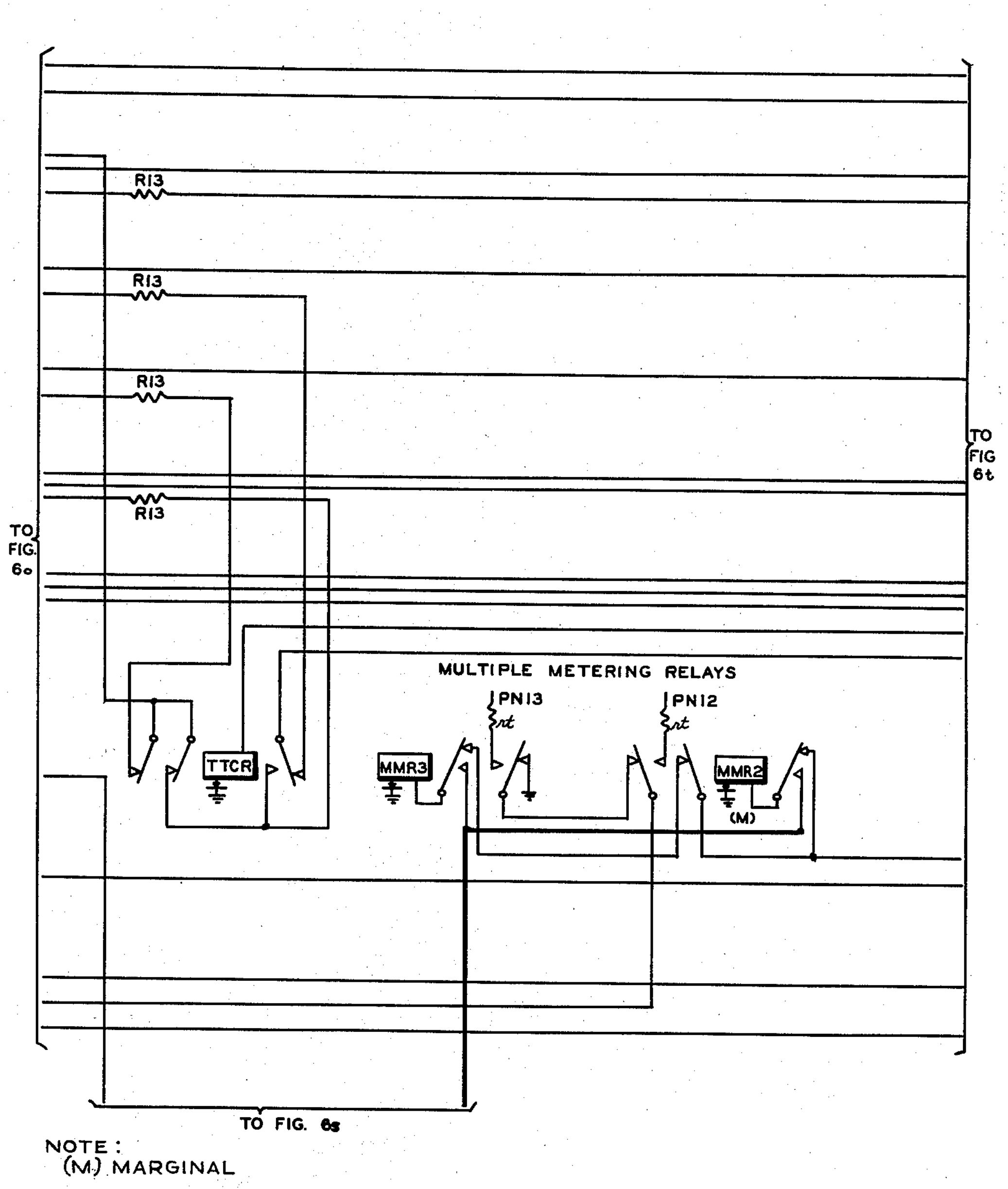
Figure 6S:
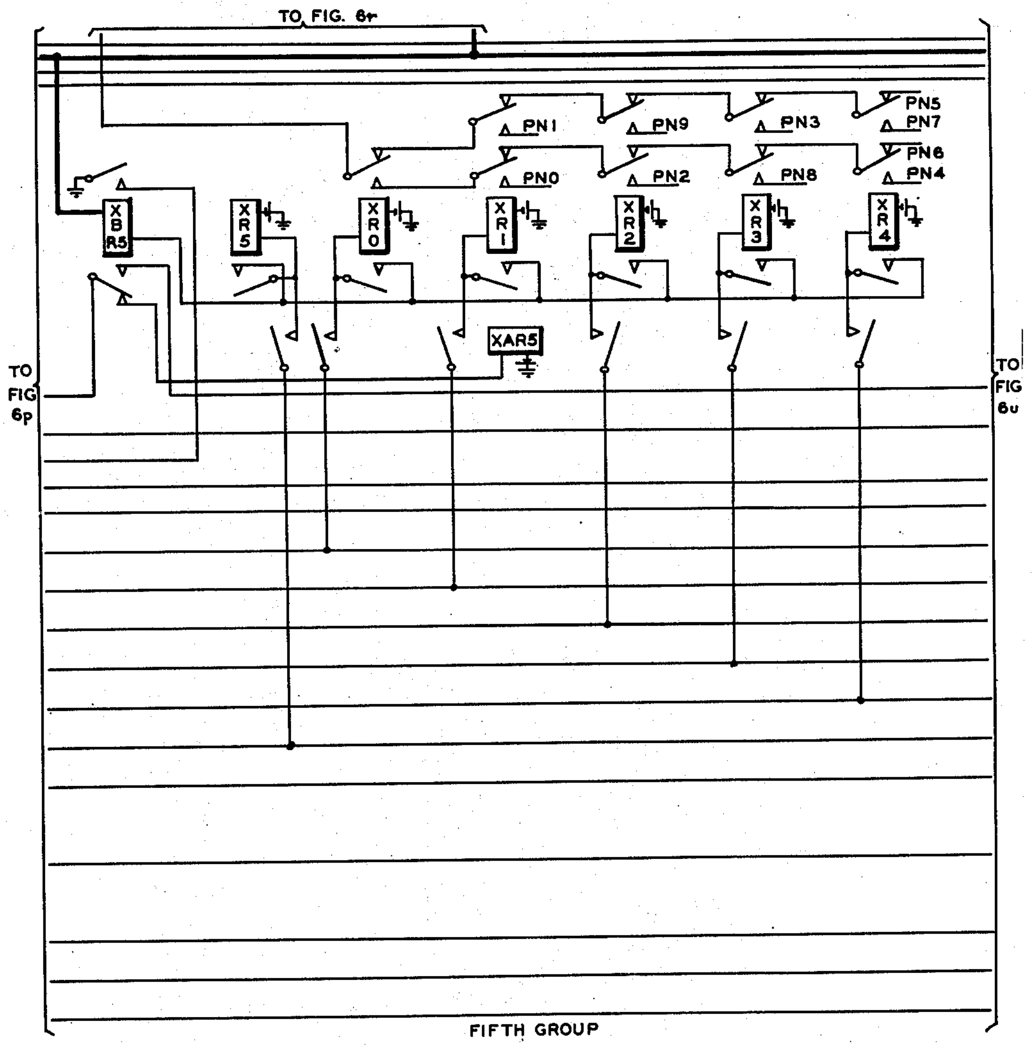
Figure 6T:
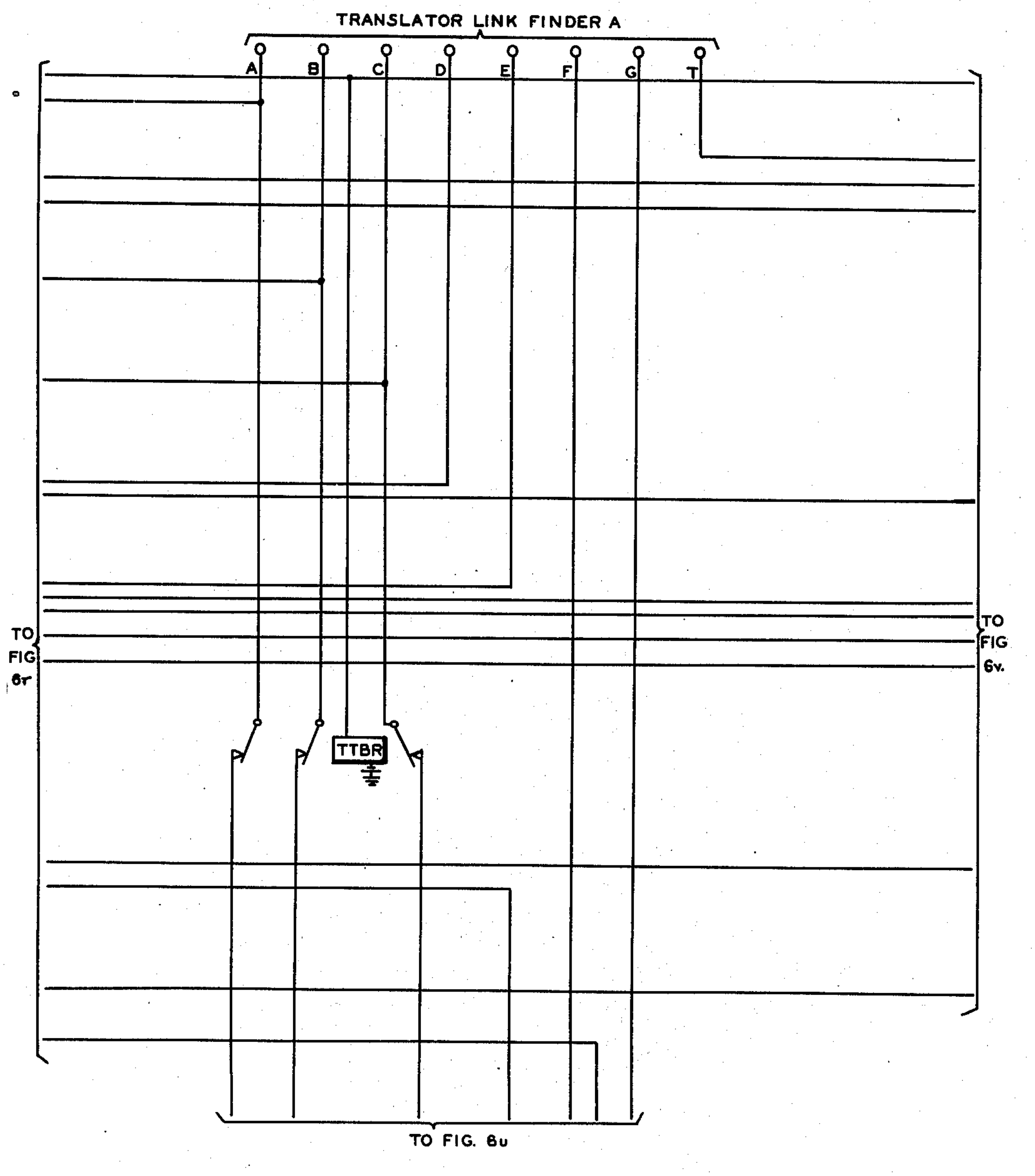
Figure 6U:
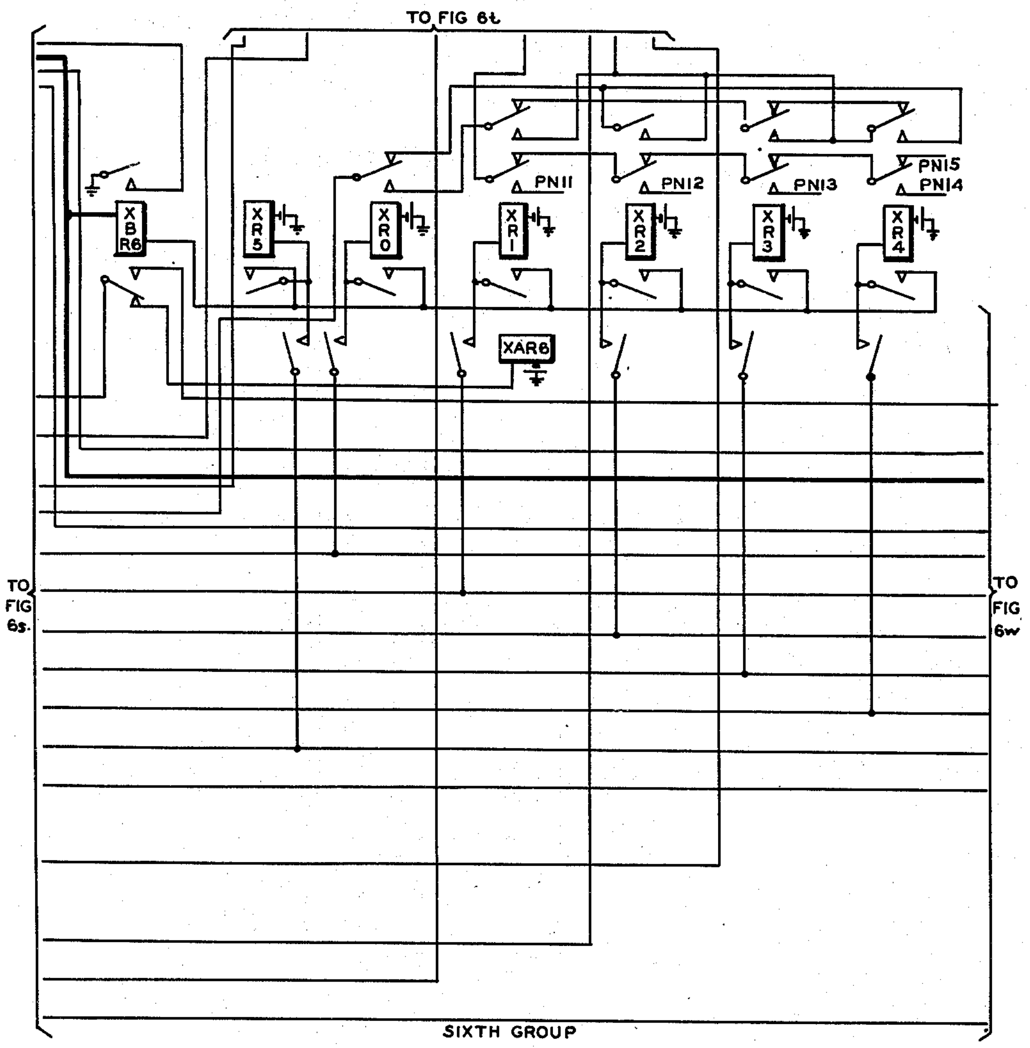
Figure 6V:
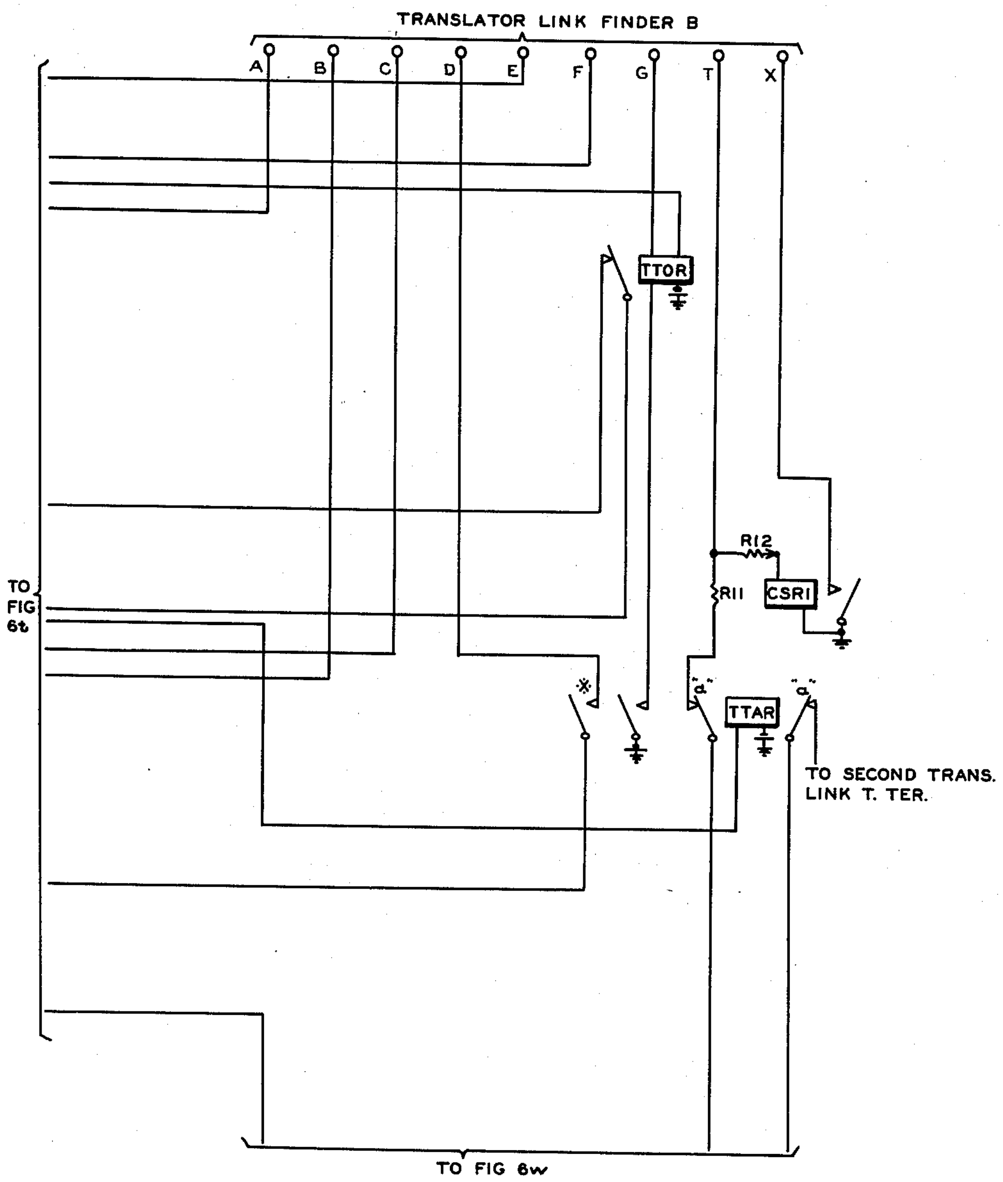
Figure 6W:
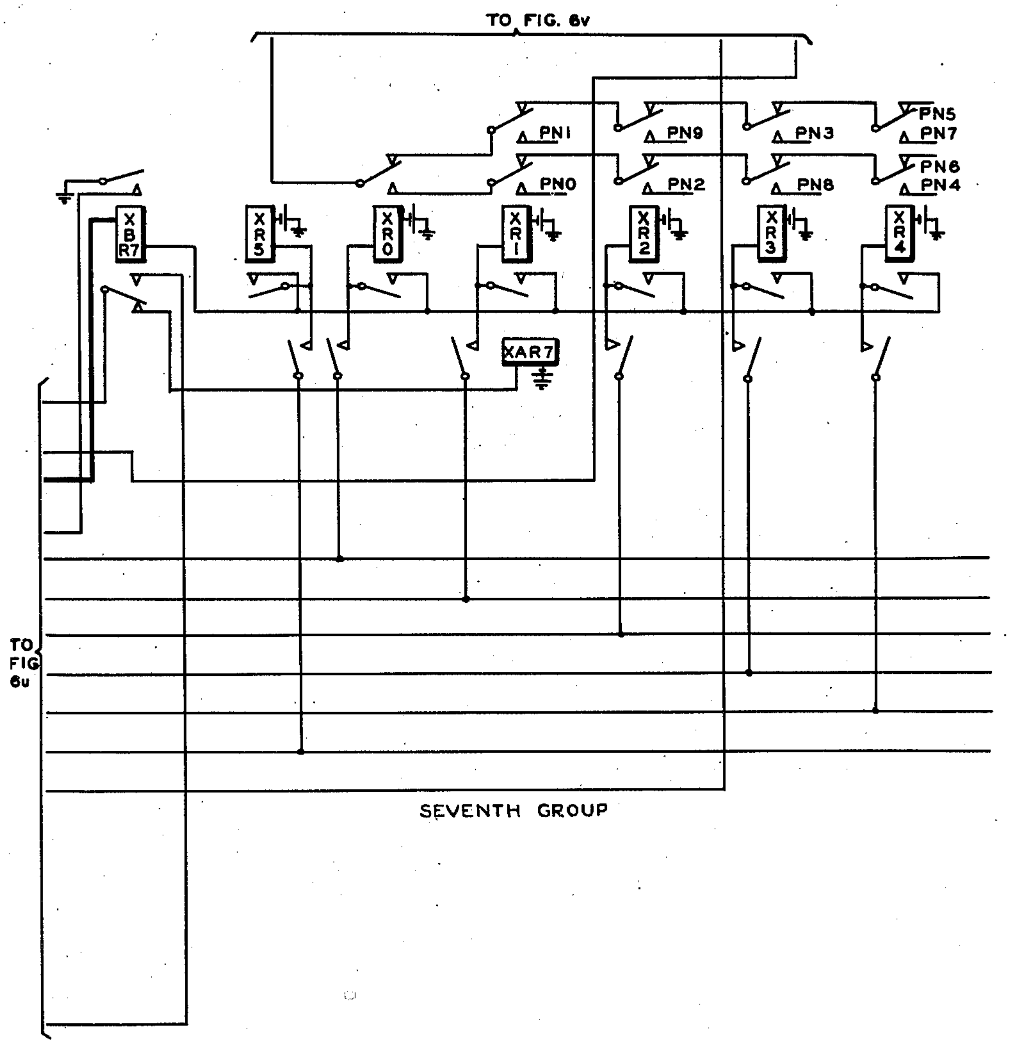
Figure 6Y:
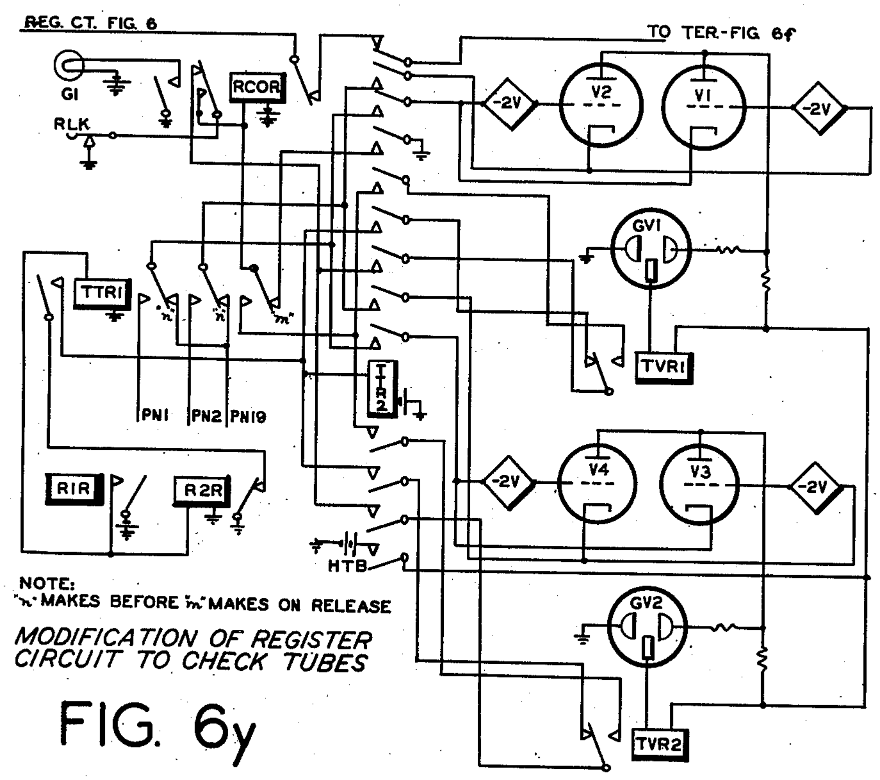
Figure 6Z:
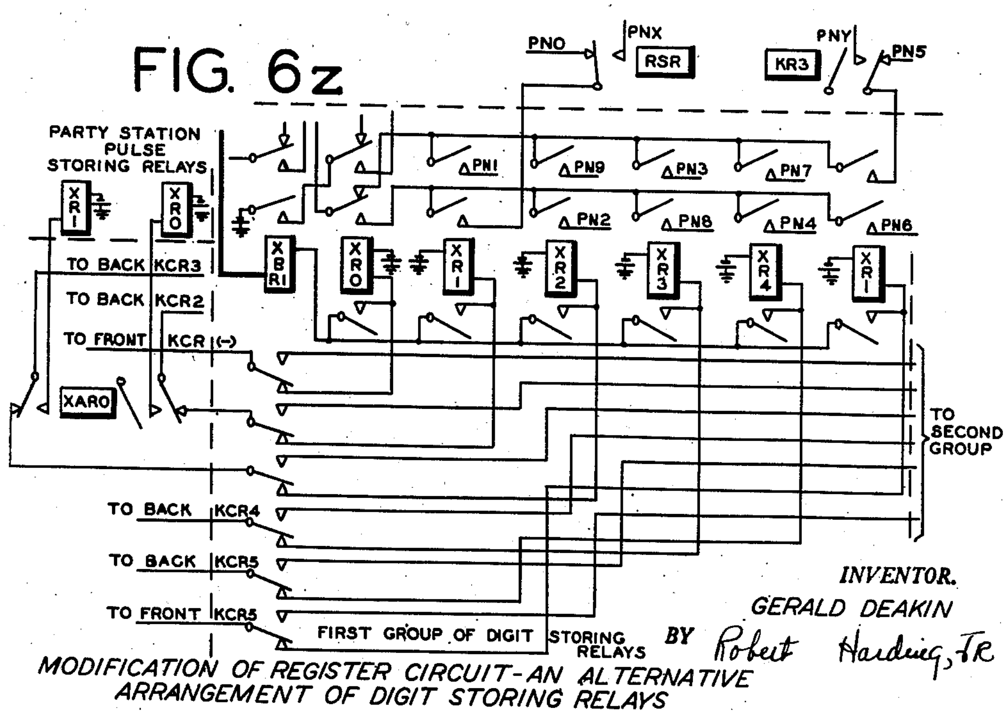
Figure 6A:
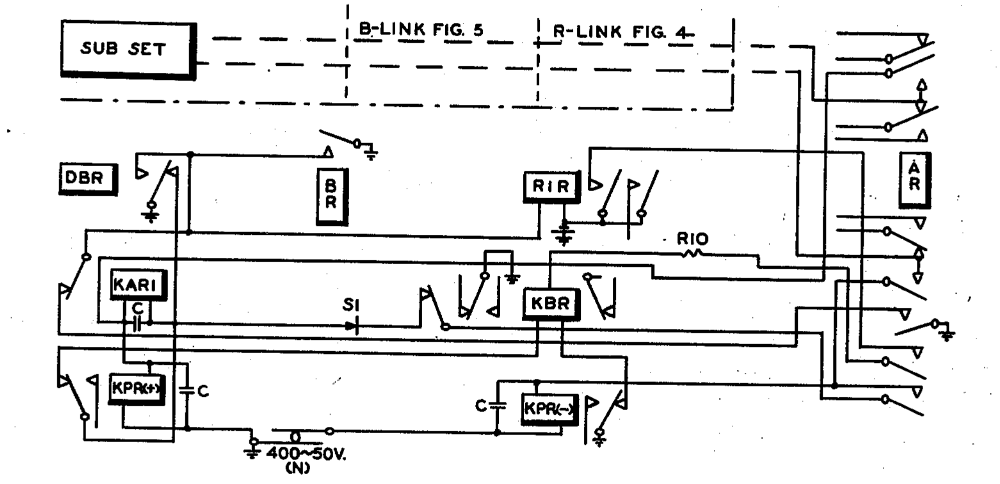
Figure 6B:
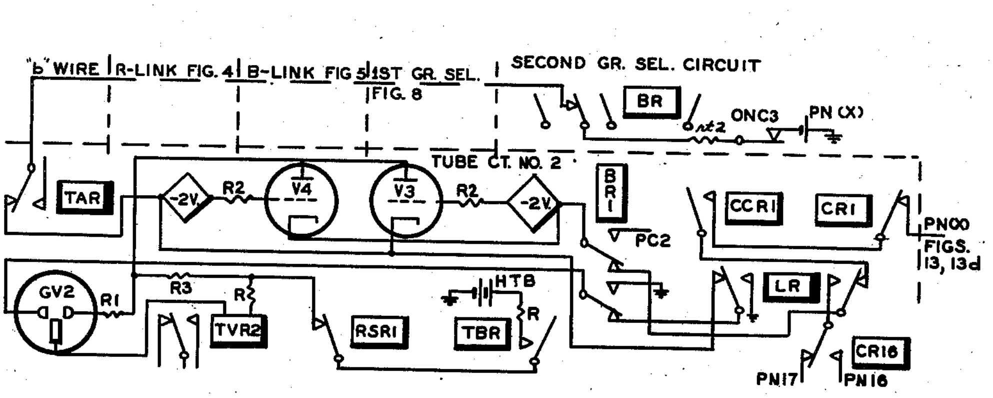
Figures 6C, 6D:
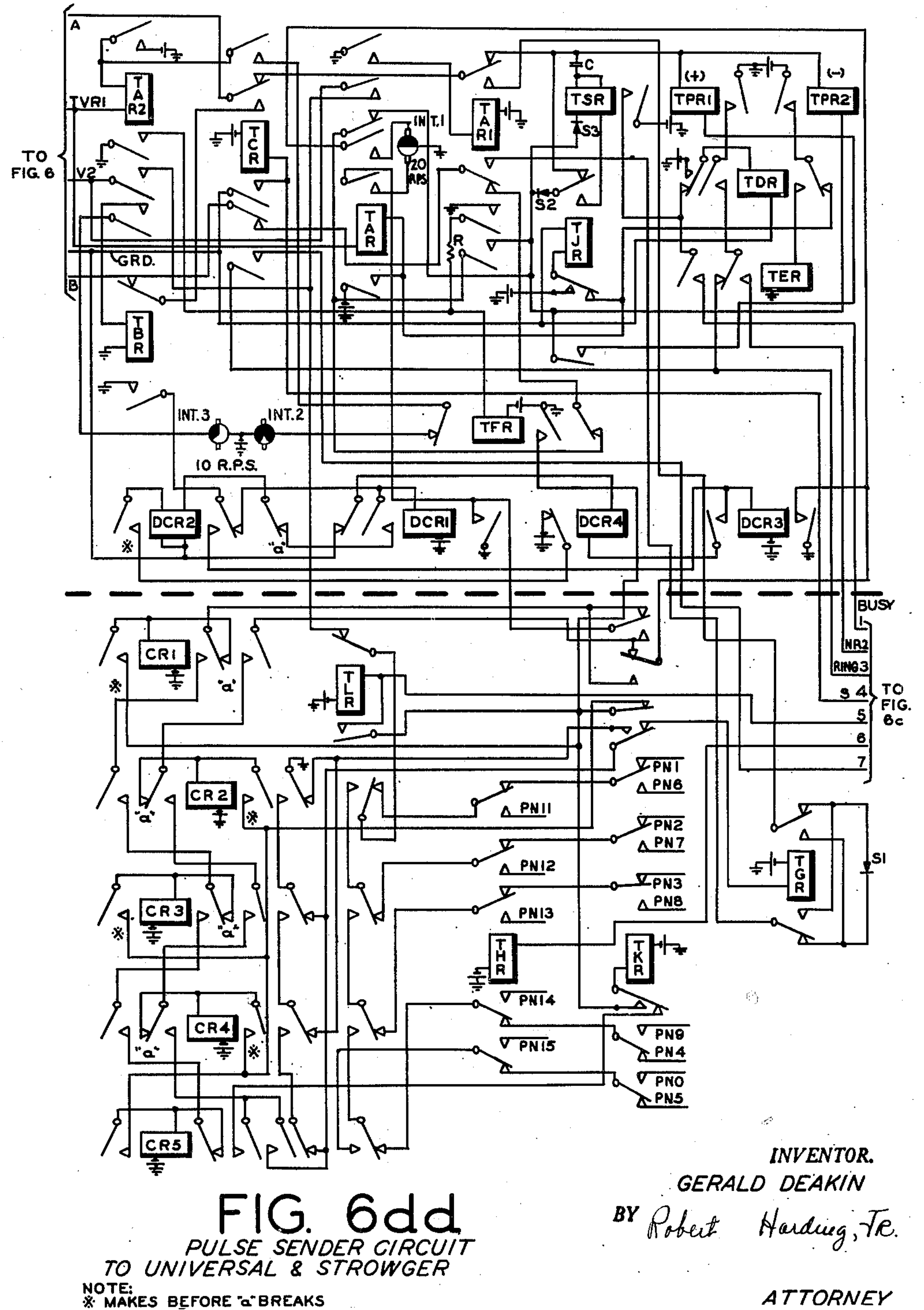
Figure 6E:
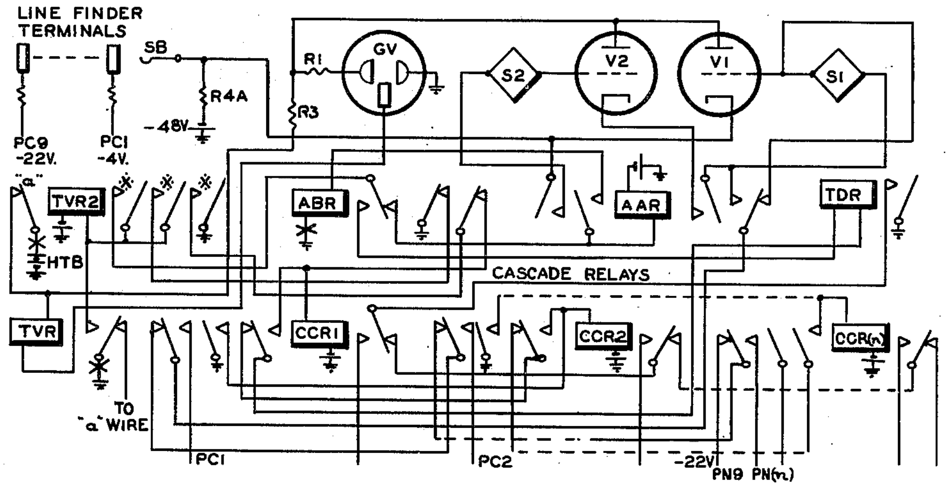
Figure 6F:
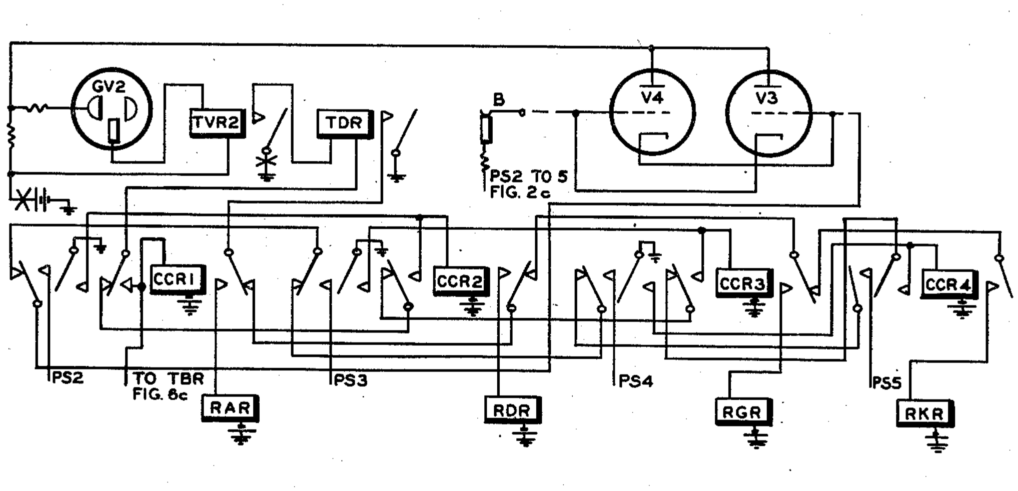

Figs. 6—6*x* illustrate the A-register;

Figs. 6*aa* and *bb* illustrate modifications of the A-register;

Figs. 6*cc* and *dd* illustrate the trunk pulsing equipment for use in conjunction with the register when connections are established with other universal offices or with a step-by-step office;

Fig. 6*y* illustrates a modification of the register circuit to check the operation of the tubes;

Fig. 6*z* illustrates a modification of the register circuit showing an alternative arrangement of digit storing relays;

Fig. 6*ee* illustrates a register circuit modified for single tube testing of a calling line;

Fig. 6*ff* illustrates a modification of a register circuit for four party ringing terminal per station.

Figure 7:
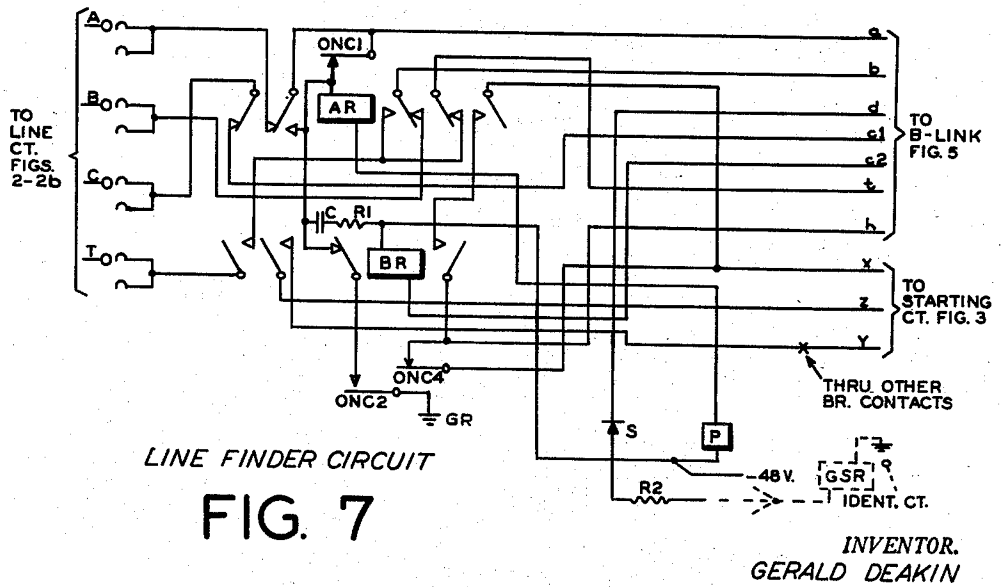
Figure 7A:
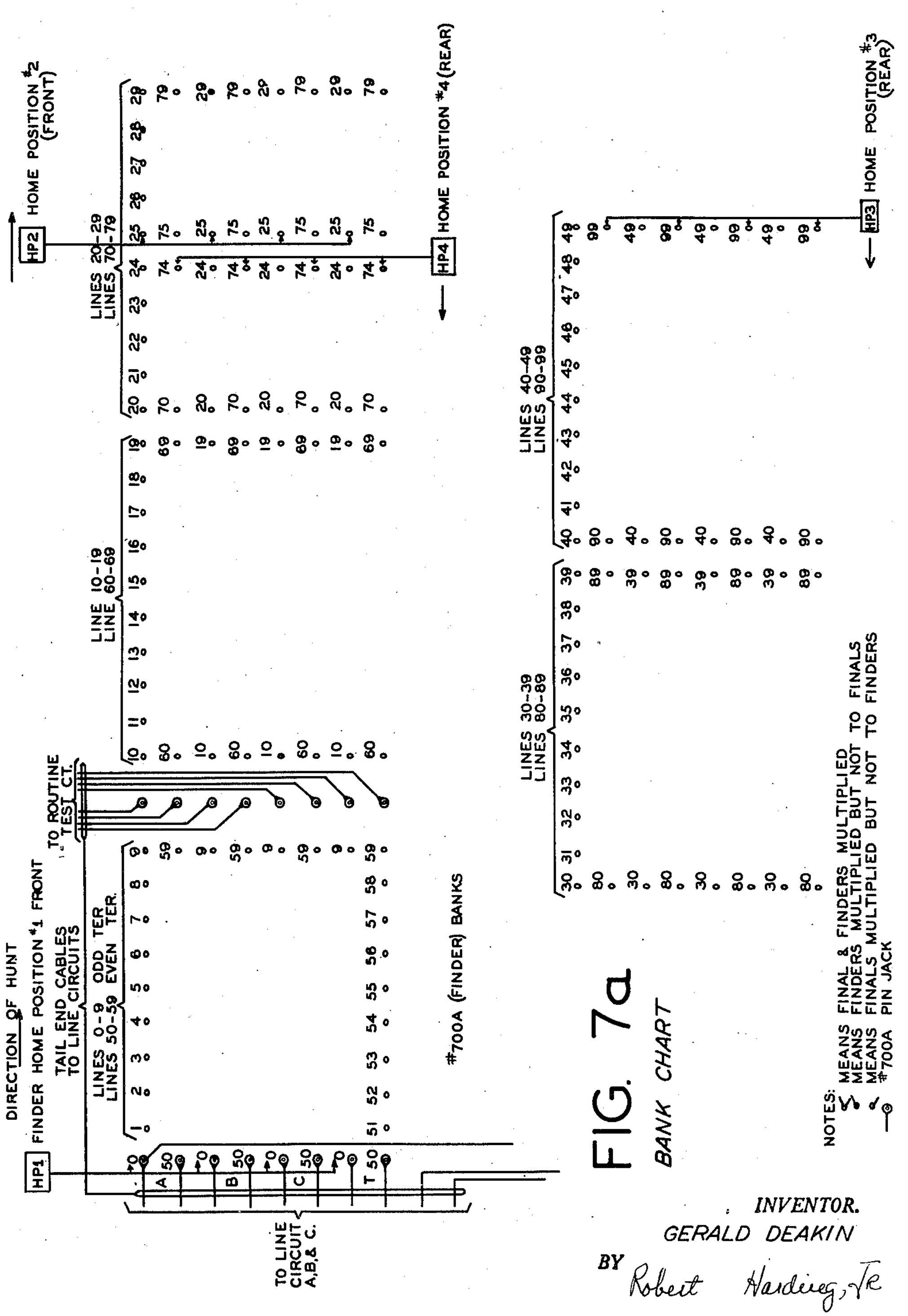
Figure 10A:
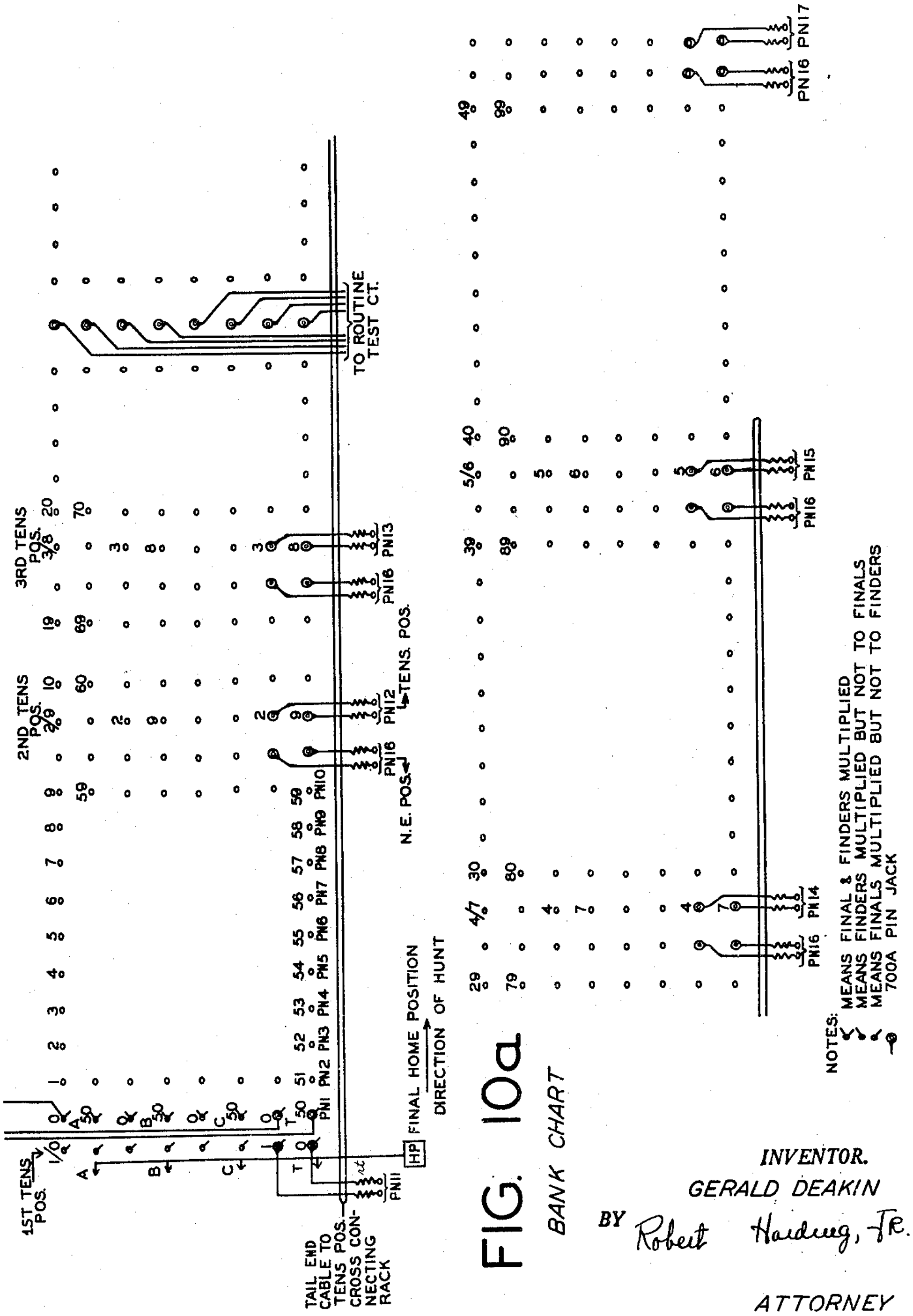

Fig. 7 is the line finder circuit;

Fig. 7*a* is a chart of the line finder banks;

Fig. 8 illustrates the circuit of the first group selector;

Fig. 9 illustrates the circuit of the group selector which can be used for second, third, fourth, etc., group selection;

Fig. 9*a* is a special service group selector;

Fig. 10 shows the circuit of the final selector;

Fig. 10*a* is a chart of the final selector banks;

Fig. 11 illustrates the circuit of the station marker;

Fig. 12 is the marker finder cooperating with the station marker; and

Fig. 12*a* the marker finder cooperating with the out-trunks.

Figures 13, 13A:
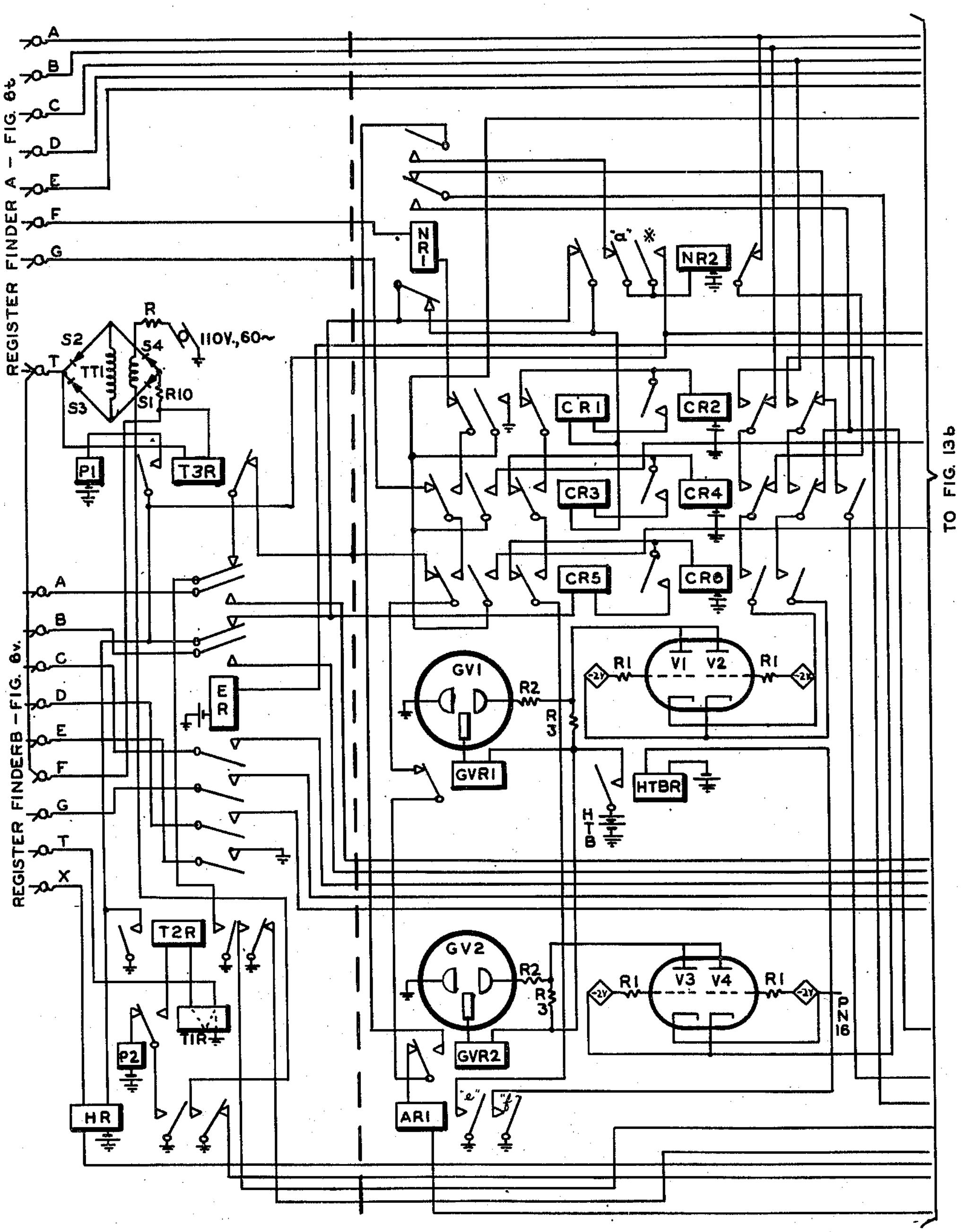
Figures 14, 15:
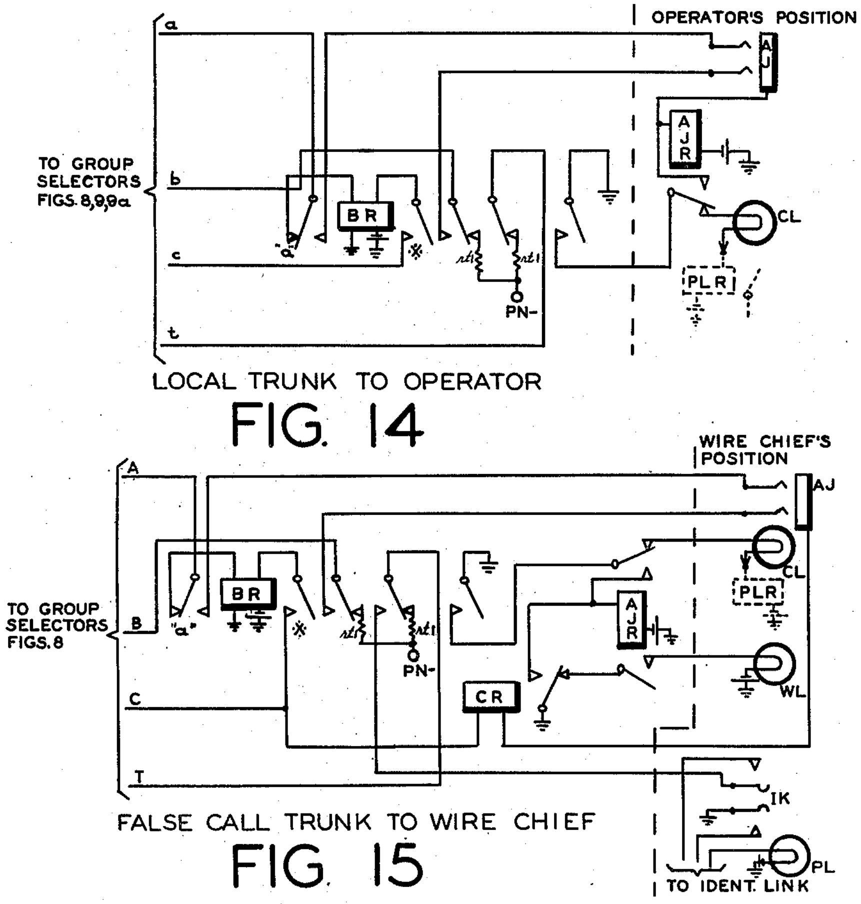
Figure 16:
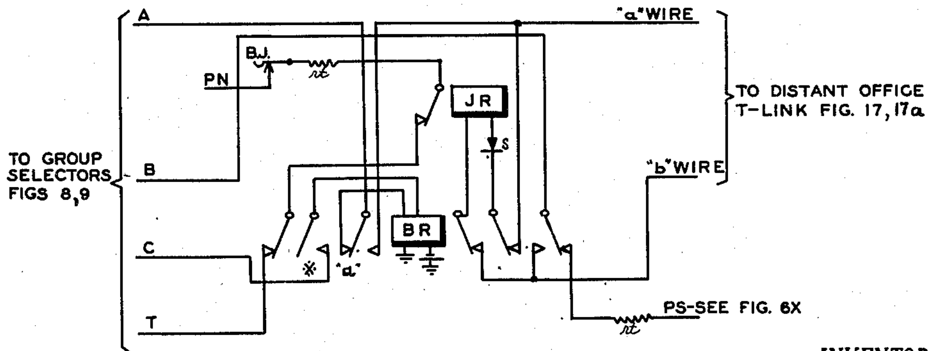
Figure 16A:
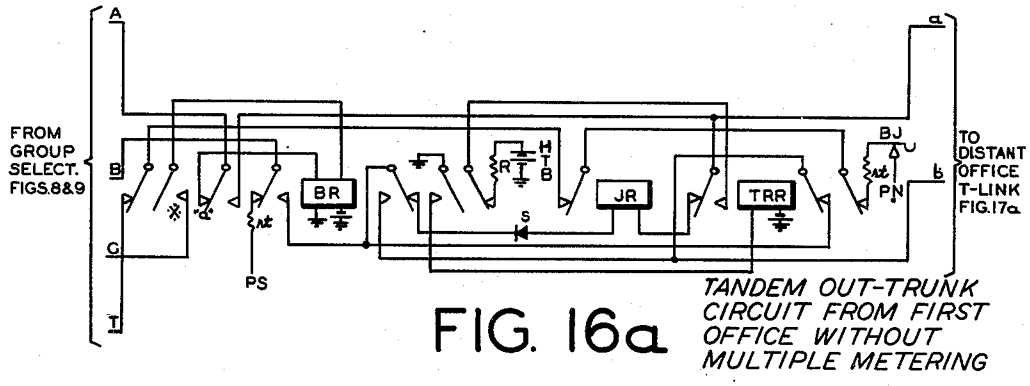
Figure 16D:
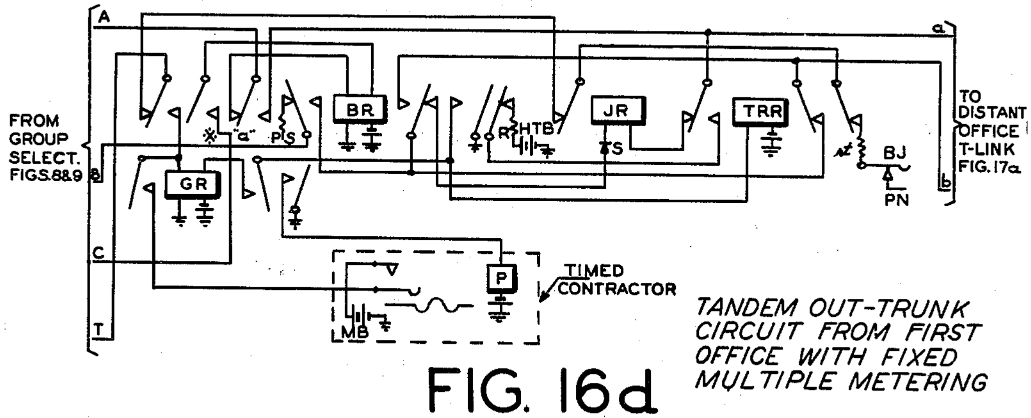
Figure 17:
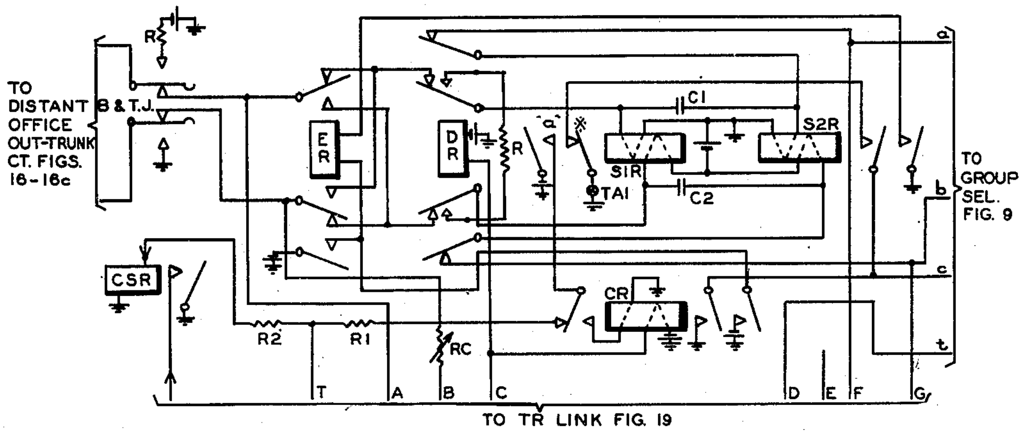
Figure 17A:
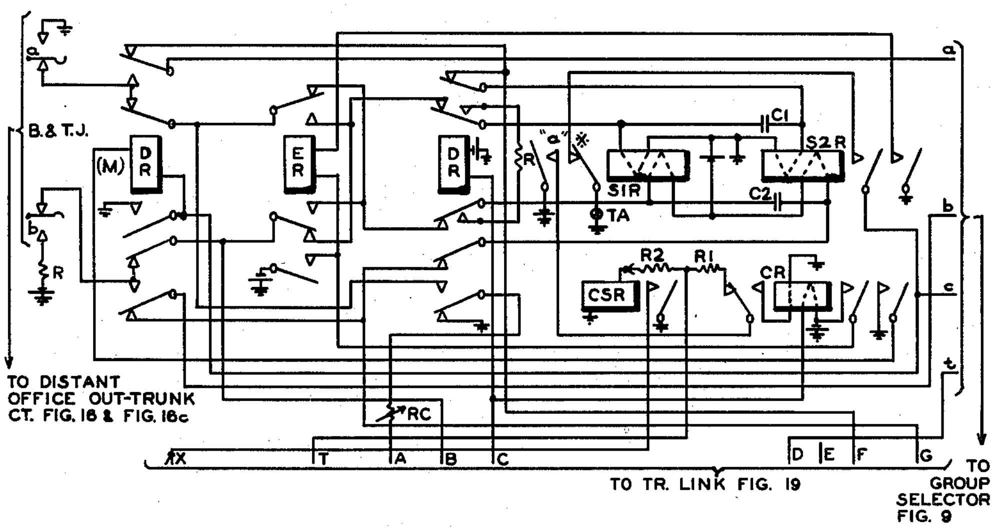
Figure 19:
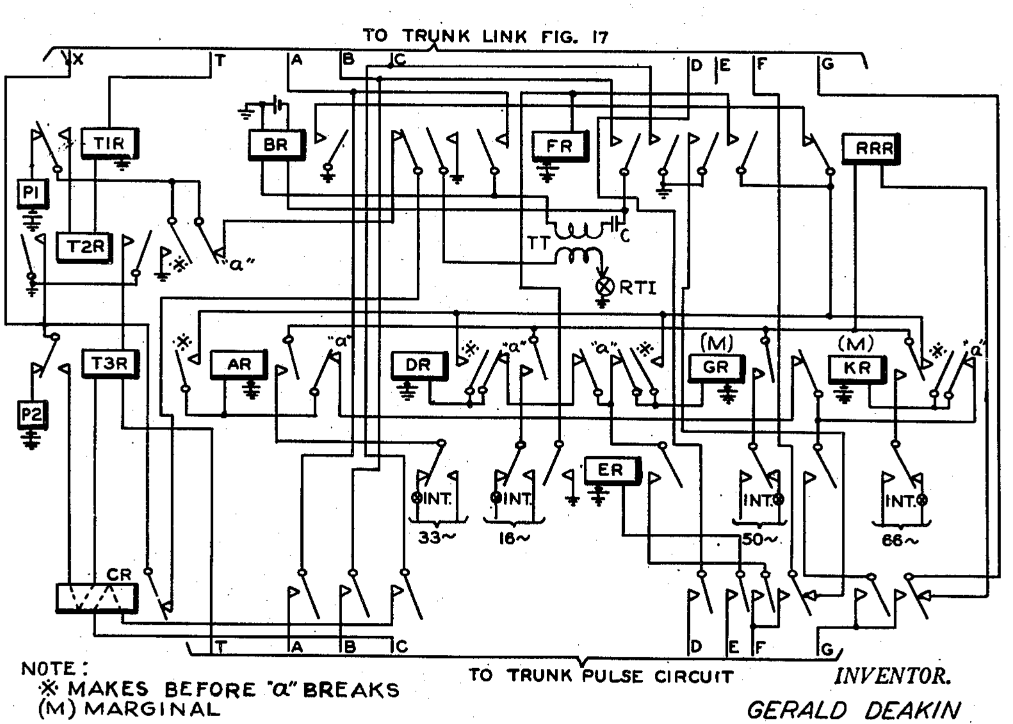
Figures 18, 18A, 18B, 18C, 18D:
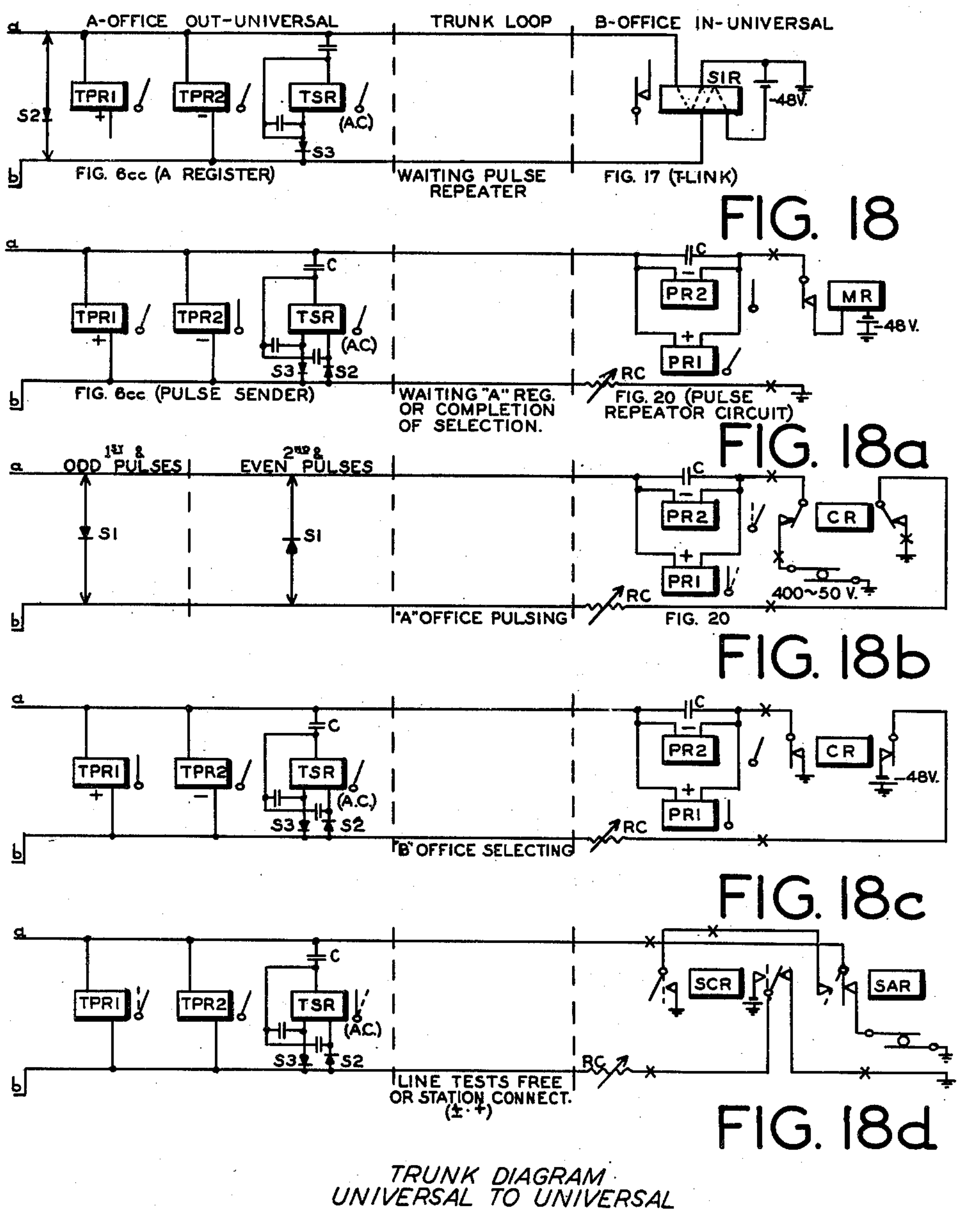
Figures 18E, 18F, 18G, 18H, 18I:
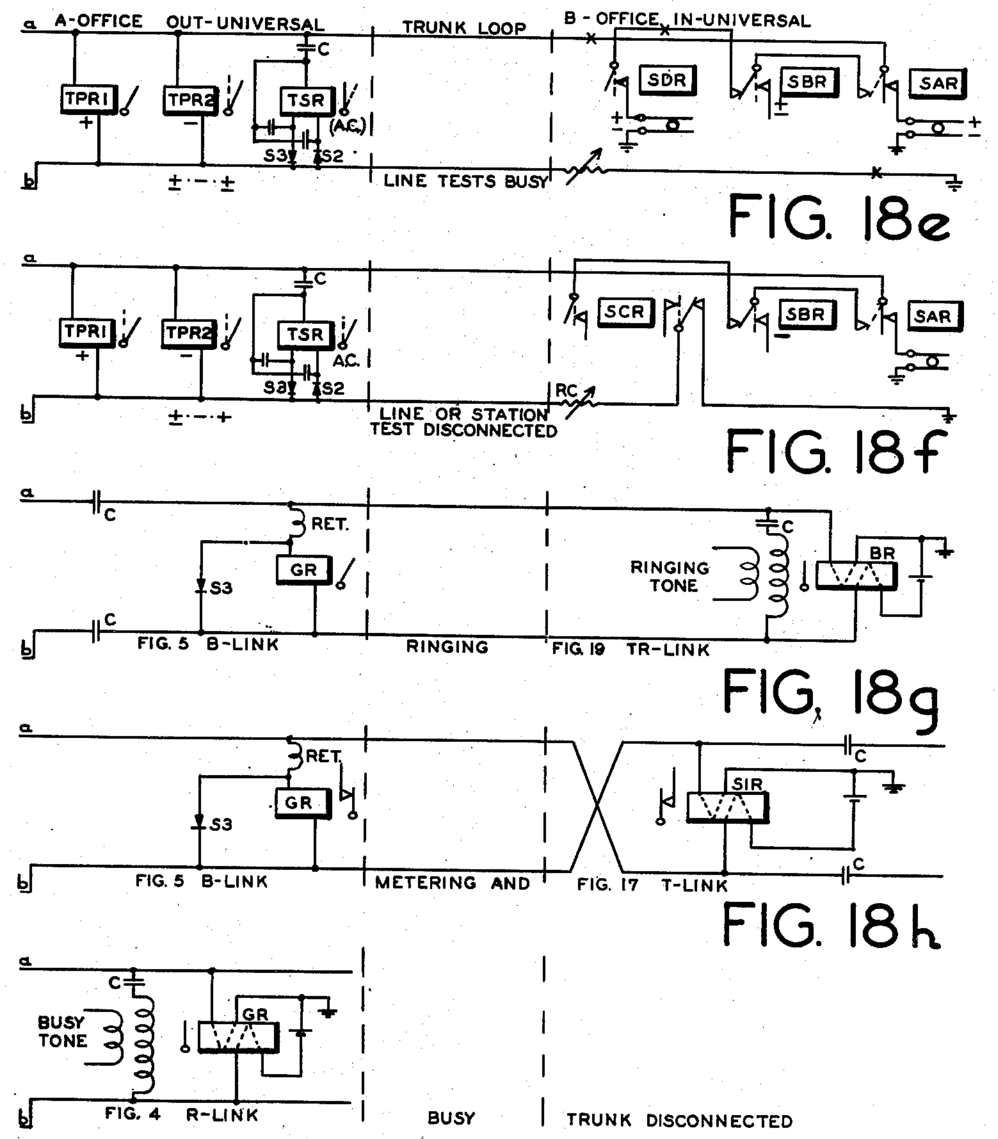

Figs. 13—13*d* illustrate the translator;

Fig. 14 is a local trunk;

Fig. 15 is the false call trunk;

Figs. 16—16*d* illustrate different types of out-trunks;

Fig. 17 is a trunk link;

Fig. 17*a* is a tandem trunk for establishing connections between two universal offices;

Figs. 18—18*i* are diagrams illustrating the condition of said relays during the establishment of inter-office connections;

Fig. 19 is a register link in the B office; and

Figures 20, 20A:
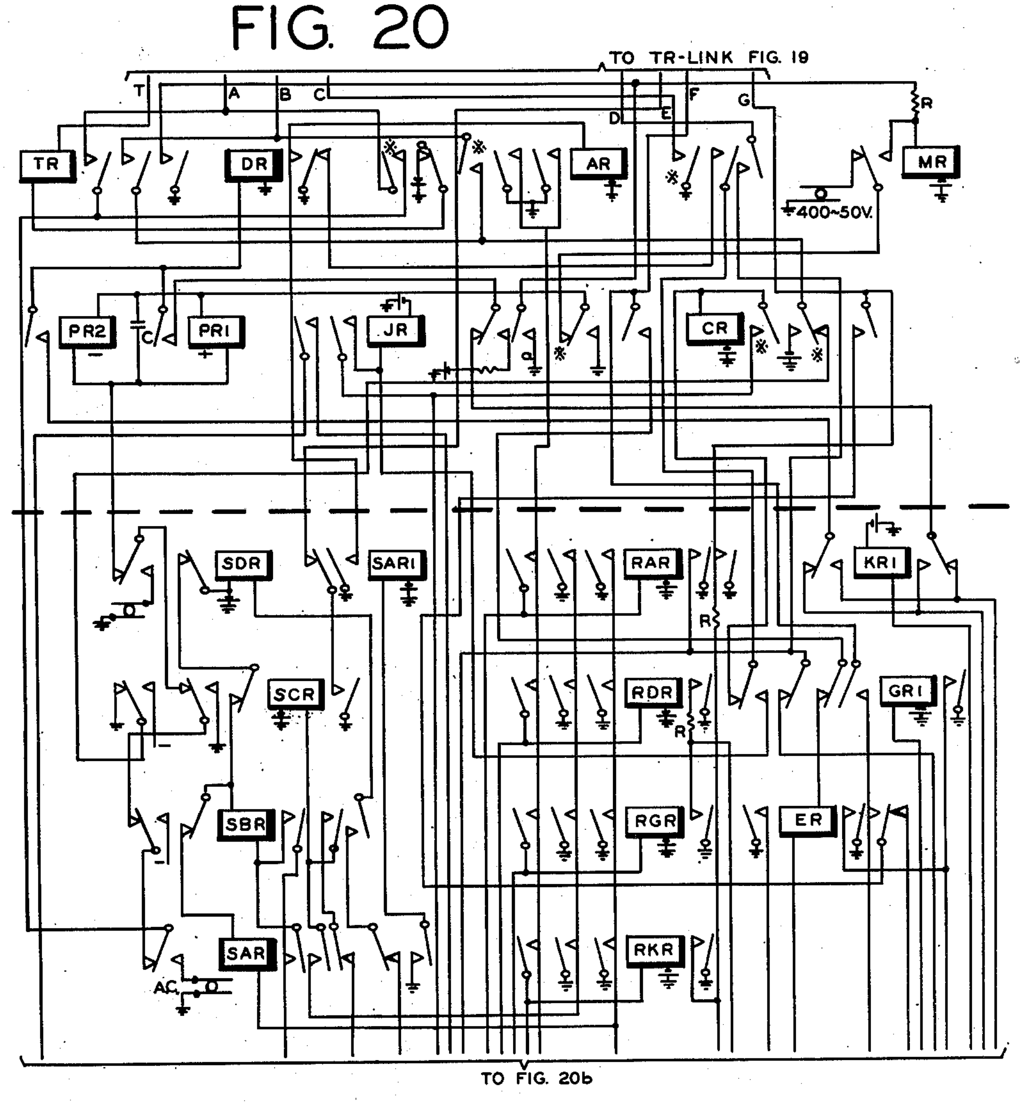
Figure 20B:
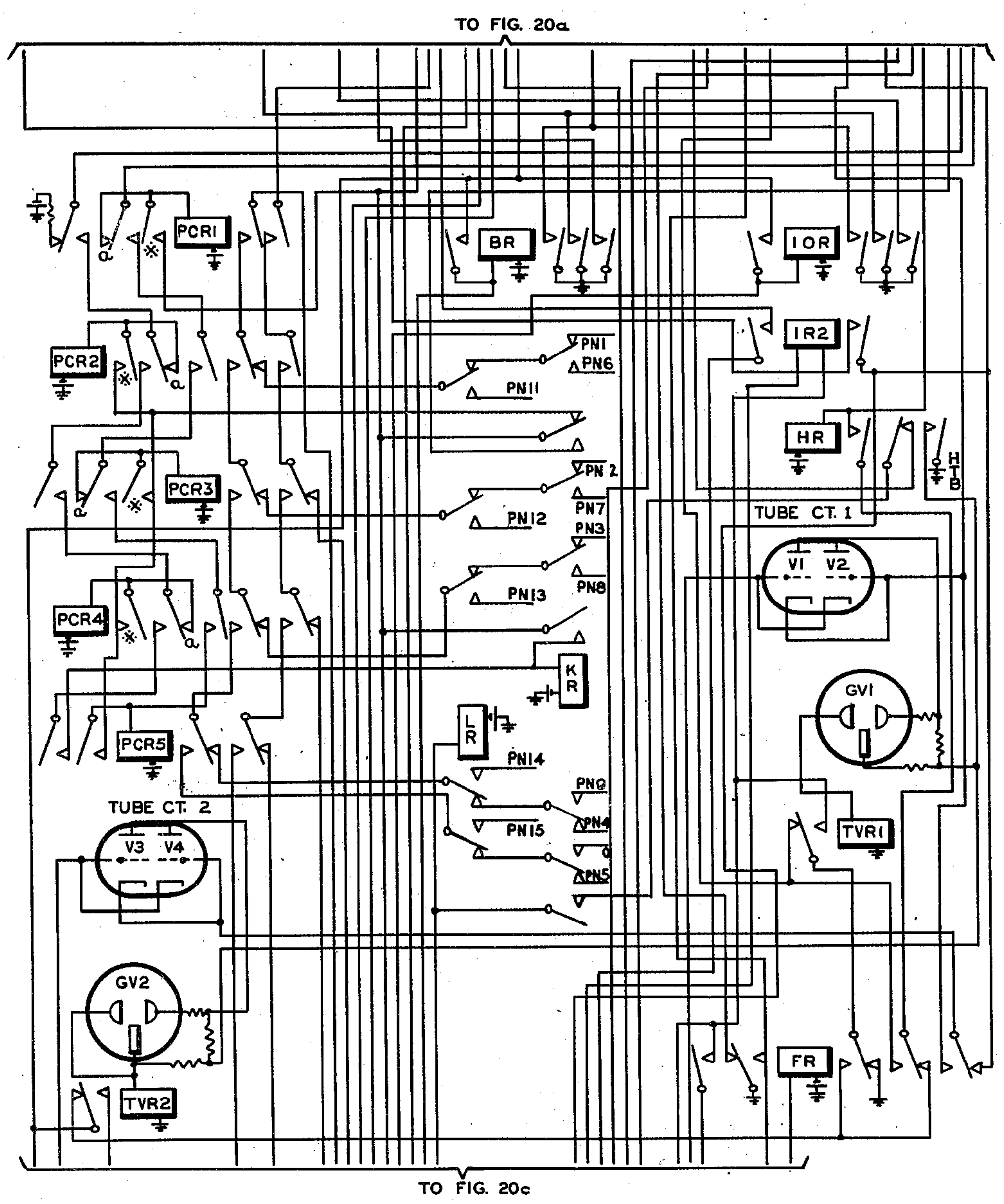
Figures 20C, 20D:
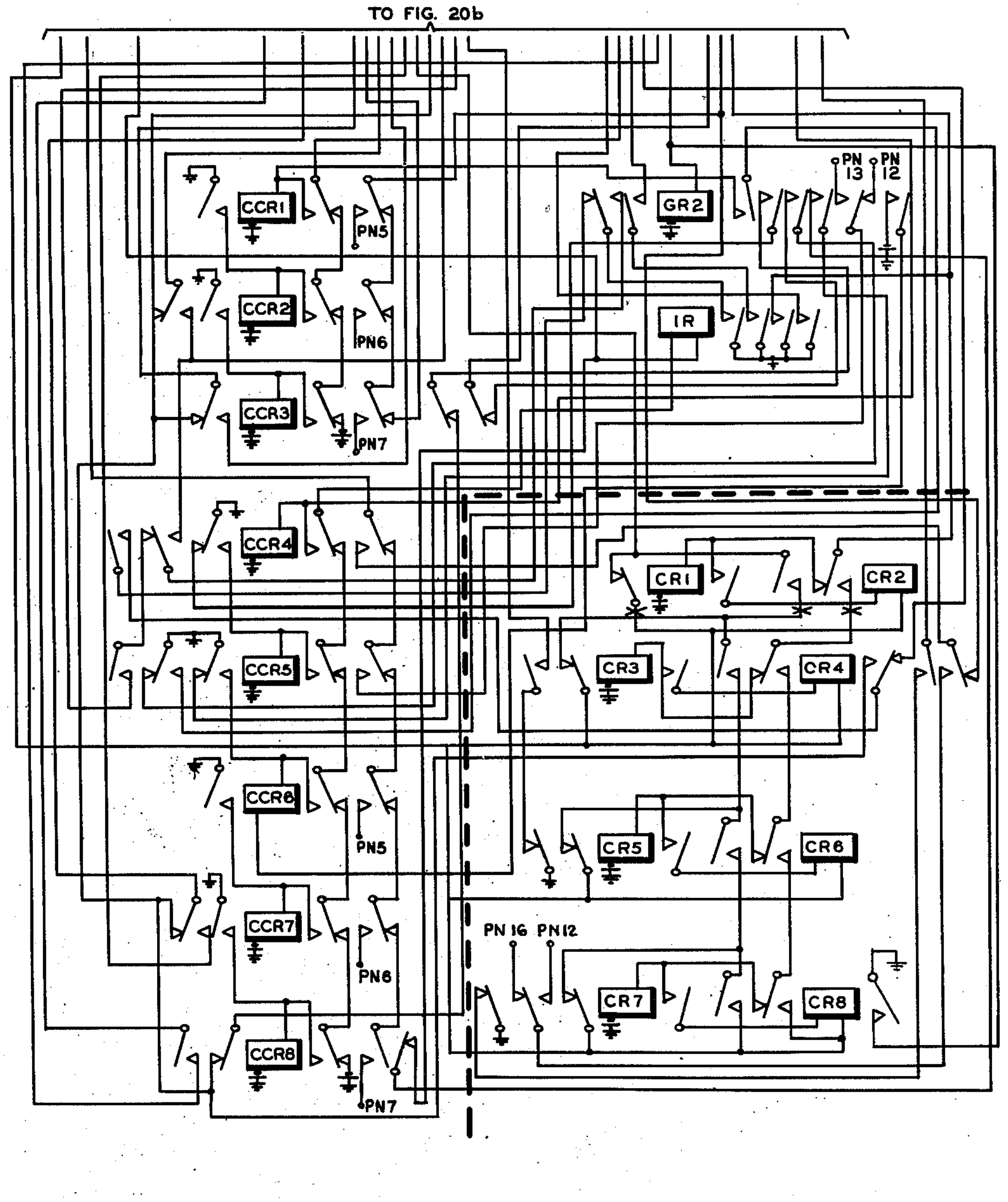

Figs. 20—20*d* illustrate a trunk pulse repeater.

Figure 1:
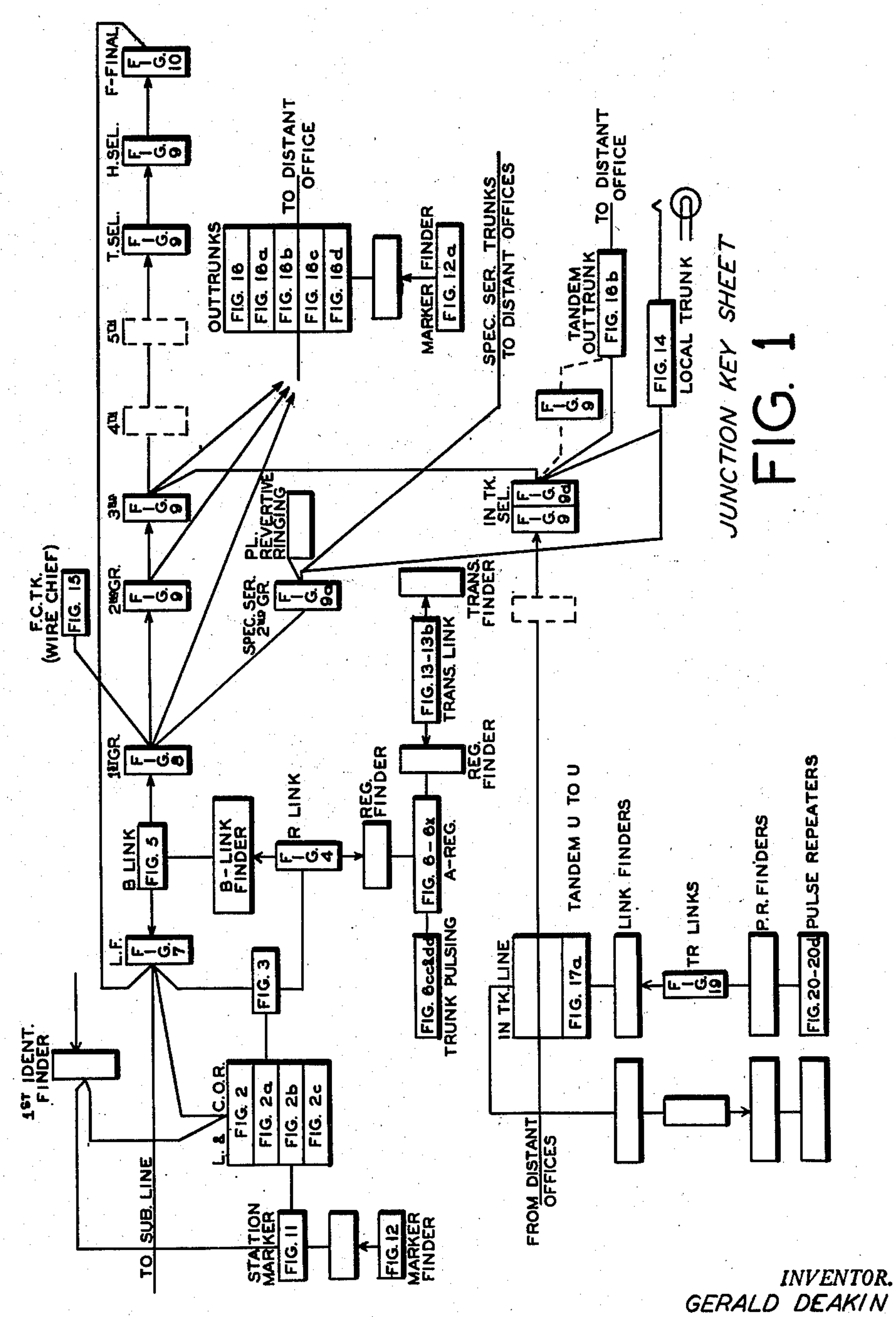
Figures 4, 5:
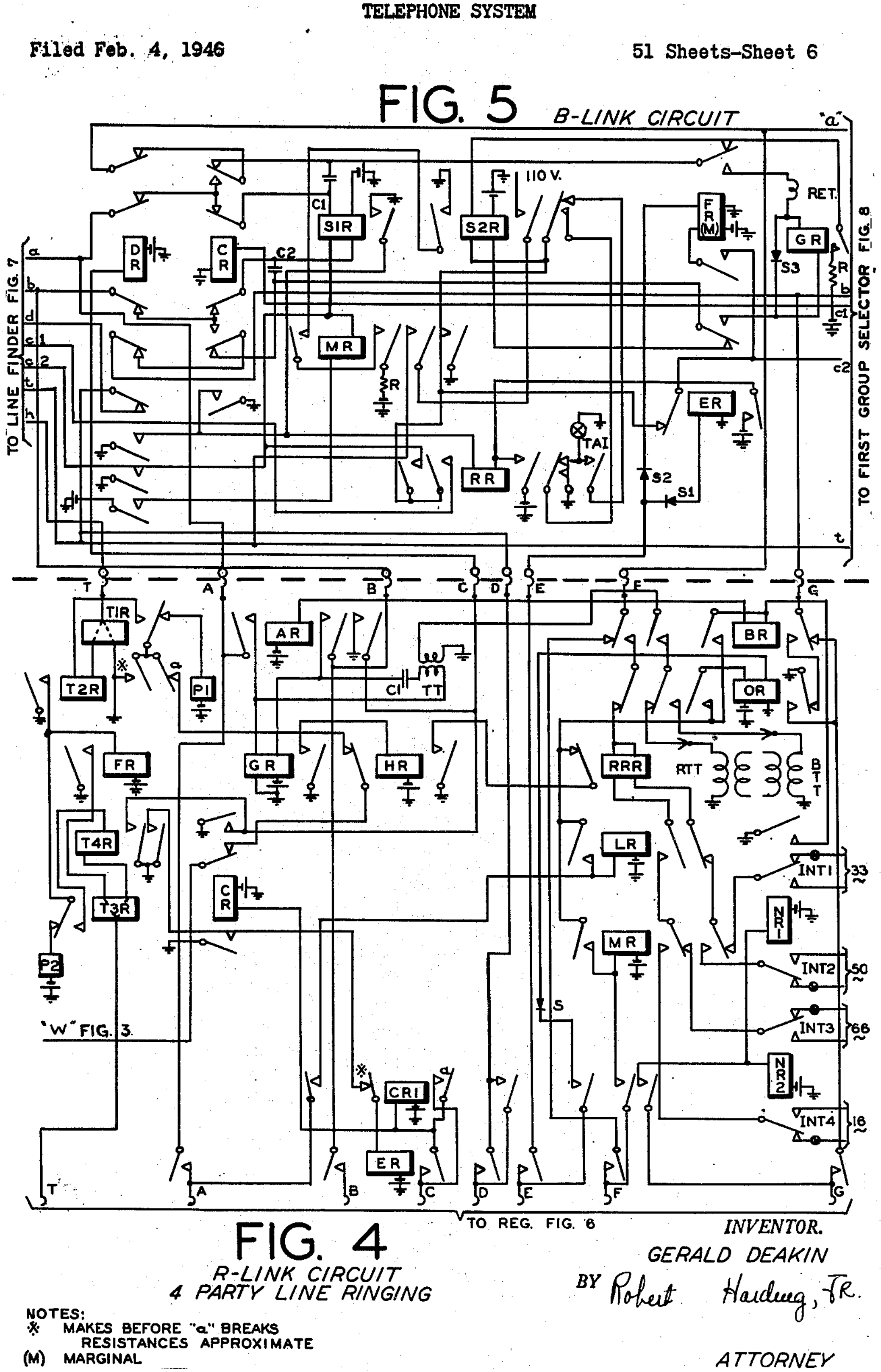
Fig. 4 is the register circuit including the line finder-group selector finder and the register finder.
Fig. 5 is the line finder-group selector.

Referring now to Fig. 1, a call is initiated by a subscriber actuating his line relay (Figs. 2, 2*a*, 2*b* or 2*c*) which operates the starting circuit (Fig. 3). Line finder-group selector link (sometimes referred to as B-link), and register finders (Fig. 4) are operated thereupon to select an idle A-register (Figs. 6—6*x*) and an idle line finder-group selector link (Fig. 5). The line finder-group selector link terminates in a line finder (Fig. 7) and a first group selector (Fig. 8). The line finder is operated under the control of the A-register as is the first group selector and all the other group selectors, the numerical setting of the A-register being controlled by the calling subscriber.

Depending on the size of the exchange, a local call is extended over a second, third, etc., and then over a thousands and a hundreds selector each of which is wired as shown in Fig. 9. The tens and units selection is performed by the final selector (Fig. 10).

For the purpose of identifying the line it is marked by the station marker (Fig. 11) to be picked up by the marker finder of Fig. 12. The station marker (Fig. 11) as well as the line circuits may cooperate with the customary identification finders.

Whenever translation is required, a special translator (Figs. 13—13*d*) is associated with the A-register (Figs. 6—6*x*).

When the calling subscriber wishes to make a party line revertive call or select a trunk to a distant office or a special operator, e. g. a toll operator, then he does this by dialing a number which will extend his line through the first group selector (Fig. 8) to a special service group selector (Fig. 9*a*) through which said special services can be established. From the first group selector (Fig. 8) a false call will be connected to the wire chief's desk over the trunk shown in Fig. 12.

A trunk to a distant office may be selected also through the first, second or the third group selector and then depending on the destination of the call through the out-trunks illustrated in Figs. 16—16*d*. When these trunks are used a marker finder (Fig. 12*a*) identifies the class-of-service to which the calling line is entitled.

Figure 16B:
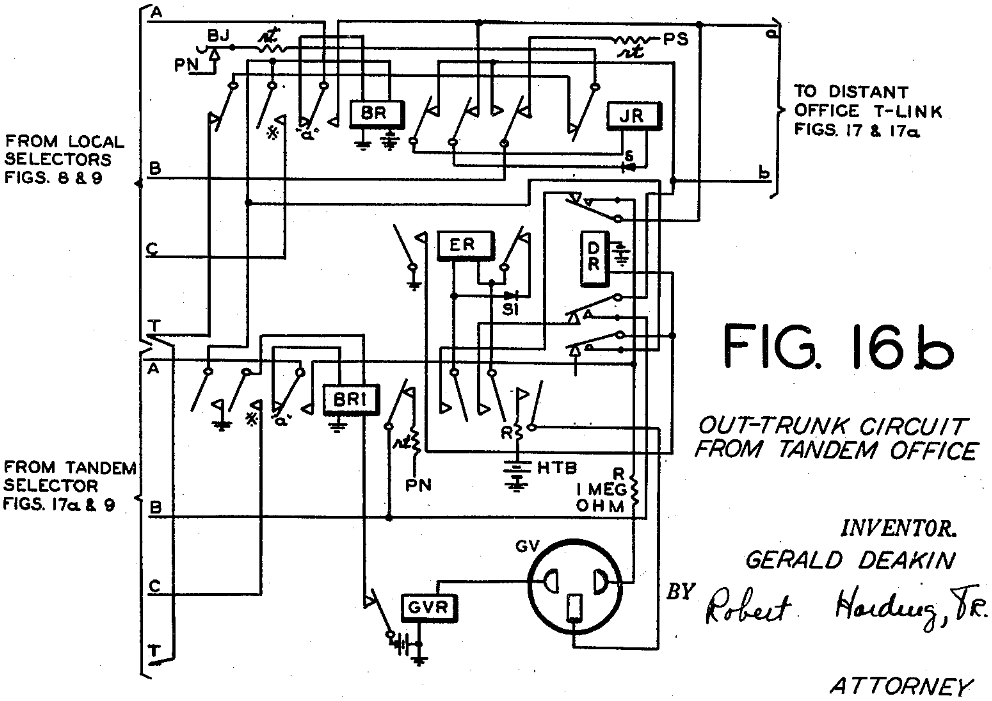

Tandem connections may be established over the third group selector (Fig. 9) and then over a tandem out-trunk (Fig. 16*b*).

In case of inter-office connections a trunk pulsing device (Figs. 6*cc* and *dd*) is used in conjunction with the A-register.

Calls from other exchanges are received on in-trunk selectors which may be arranged either as shown in Fig. 9 or as shown in Fig. 9*a*. When the call is to a subscriber within the exchange shown in Fig. 1, then the in-trunk selector operates as a third group selector to select a local thousands selector. When the call from the distant office is a tandem call then the in-trunk selector extends it through a tandem out-trunk (Fig. 16*b*) probably through the intervention of another selector (Fig. 9). Also, the in-trunk selector may extend the call to a local trunk operator's position via Fig. 14.

All tandem calls coming from a distant office are handled through a tandem circuit (Fig. 17) with which a pulse repeater (Figs. 20—20*d*) is connected through a trunk repeater line (Fig. 19).

The pulse repeater repeats the impulses received from the A-register at the distant office and more specifically from the trunk pulsing equipment (Figs. 6*cc* and *dd*) thereof. This is so if the distant office is a universal office. If it is a Strowger office then the pulse repeater (Fig. 20*d*) receives the impulses direct from the subscriber's dial or from the customary directory.

LOCAL CALL

*Starting the call*

When a subscriber removes handset, the line circuit is closed and the line relay LR (Figs. 2, 2*a*, 2*b* or 2*c*) operates to energize the starting circuit (Fig. 3), which in turn causes all idle associated register links (sometimes referred to as R-links) (Fig. 4) to hunt for the best available choice of line finder-group selector links (Fig. 5) and when one is picked up by a register link, that register link then chooses an idle register (Figs. 6—6*w*), after which the register causes the line finder (Fig. 7) associated with the line finder-group selector link to pick up the calling line in the same manner as it subsequently controls the group selectors (Figs. 8 and 9) and the final selector (sometimes referred to as F selector) (Fig. 10).

One hundred subscribers' lines in the banks of the line finders are divided into four sub-groups of twenty-five lines each, and the line finders and line finder-group selector links are similarly divided into four sub-groups, each sub-group serving as a first choice for the corresponding group of subscribers' lines. As best shown in Fig. 3, each sub-group of line finders has an individual test conductor X leading to a branch of the starting circuit. When a line in the sub-group numbered 25 to 49 calls (see Fig. 7*a*), battery (this word will be used to designate a source of potential of —48 volts) is placed on the corresponding Z lead over the left-hand front contact and armature of the line relay LR (Fig. 2). Should all the line finders of the first choice be busy, the Z-lead is extended through a series of BR-relay contacts (Figs. 7 and 3) and conductor Y to the winding of CTR associated with the calling line group (Fig. 3) to ground. CTR locks up to the Z-lead of its group, and places battery on the Z-lead of the sub-group immediately preceding, which is the first choice for lines 0 to 24. This controls the second choice finder for lines 25 to 49. If all the line finders of the second choice for lines 25 to 49 are busy, then the test lead is extended to the third choice, which is the first choice for lines 75 to 79, and if the third choice is busy, then to the fourth and last choice, which is the first choice for lines 50 to 74. In this manner the nearest available line finder is always selected for hunting and thus the line finder hunting time is reduced to a minimum.

*Register link selects line-finder group-selector link*

The battery potential placed on a Z-lead by the line relay LR (Figs. 2, 2*a*, 2*b* or 2*c*) is extended through resistor R1 (Fig. 3), lead X, in multiple through normally closed off-normal contacts ONC4 (Fig. 7) of all free line finders of the subgroup, conductor *h* (Fig. 5) to the T-terminals in the banks of the line-finder group-selector link finders (Fig. 4). At the same time, a circuit is closed from battery, front LR (Fig. 2), conductor Z, resistor R1 (Fig. 3), winding of common starting relay CSR1 of the sub-group to ground. CSR1 energizes CSR2 common to the four subgroups, which places ground on the common starting lead W of all register links (Fig. 4).

Since there is one resistor R1 and one CSR1 relay for each sub-group of twenty-five lines, only one call may be originated at a time in each sub-group, i. e., four calls per 100 lines. Should two calls arrive at the same instant in the same sub-group, or in a combined sub-group of fifty lines or more, when all prior choice finders are busy, then the line less favorably placed in the finder bank must wait for the completion of the first call. Under normal conditions this means an added delay of about one second for the second call.

When all line finders of a given choice are busy, a series circuit is closed, through contacts of the associated BR-relays of the busy finders (Figs. 3 and 7). Assume, for example, that all finders of the fourth sub-group, lines Nos. 75 to 99 (Fig. 3), are busy when a call is initiated in the fourth sub-group. The test circuit from battery at the line relay (Fig. 2) of the fourth group may be traced over conductor Z (Fig. 3), the series BR-contacts (Figs. 3 and 7) of the busy fourth sub-group, conductor Y and the winding of relay CTR of the fourth sub-group to ground. CTR places a test potential on the T-terminals of all idle line finder-group selector links (Fig. 5) of the third sub-group which immediately precedes the fourth sub-group. The CTR relay locks up over the front contact of LR (Fig. 2) until selection of the calling line is completed.

Should a line finder of the fourth group become free before the selection by a line finder in the third group is completed, its relay CTR remains locked up until the calling line is picked up. Should all finders in the third group be busy, the test is extended by the third group to the second, and so on.

The grounding of the common starting lead W (Fig. 3) energizes clutch magnet P1 (Fig. 4) of the line finder-group selector link finders of all idle R-links, circuit from ground, front CSR2 (Fig. 3), lead *w*, back CR (Fig. 4), back HR, back T2R, back T1R, winding P1 to battery. The line finder-group selector link finders hunt for an idle line finder-group selector link (Fig. 5) in the sub-group whose T-terminals carry the calling test potential. The first register link to reach an available line finder-group selector link closes a circuit from battery, front LR (Fig. 2), Z-lead, resistor R1 (Fig. 3), X-lead, ONC4 (Fig. 7) of the associated line finder, *h* wire, T-terminal (Fig. 5), brush T (Fig. 4), high resistance winding T1R to ground.

T1R operates and de-energizes P1, stopping the link finder on the selected line finder-group selector link. T1R shunts its high resistance winding by its low resistance winding in series with low resistance winding of T2R, thereby making the selected line finder-group selector link busy to all other register links since, as before stated, resistor R1 (Fig. 3) is common to the sub-group of line finder-group selector links. T2R locks up T1R and itself to the front contact of the line relay over the T-terminal. The shunting effect of the low resistance windings of T1R and T2R causes CSR1 (Fig. 3) to fall away, whereupon CSR2 becomes de-energized and the other hunting register links come to rest.

*Register link selects register*

T2R (Fig. 4) operates and energizes clutch magnet P2 of the register finder and also relay FR, which places ground on the high resistance winding of T3R. The register finder hunts for an idle register and when one is found, a circuit is established from ground, front FR, high resistance winding of T3R, brush T, terminal T of register (Fig. 6), conductor 112, back TER (Fig. 6*f*), conductor 147, winding BR (Fig. 6*g*) to battery. BR and T3R (Fig. 4) operate. T3R opens the circuit of P2 and the register finder comes to rest. T3R shunts its high resistance winding by its low resistance winding in series with T4R, thus making the register busy to all other register links.

T4R energizes ER of the register link over CR back, and DR (Fig. 5) of the line finder-group selector link over brush C of the line finder-group selector link finder. DR removes the transmission bridge from the *a* and *b* wires which are now cut through from the line circuit to the register.

DR energizes BR (Fig. 7) of the line finder by grounding wire *c2* and disconnects the *d* wire from the *t* wire, thereby disconnecting rectifier S (Fig. 7) and resistance R2 used for identification purposes as explained below.

*Substation equipment*

The substation is provided with a suitable controller or calling device. Any suitable controller may be used for this purpose, and particularly those adapted for multi-potential systems like those described in my copending applications Serial No. 500,412, filed August 28, 1943, now Patent No. 2,454,780; Serial No. 523,626, filed February 24, 1944, now Patent No. 2,406,001; Serial No. 527,921, filed May 24, 1944, now Patent No. 2,433,347; Serial No. 529,506, filed April 4, 1944; Serial No. 532,142, filed April 21, 1944, now Patent No. 2,440,249; Serial No. 532,143, filed April 21, 1944, now Patent No. 2,410,050; Serial No. 540,946, filed June 19, 1944, now Patent No. 2,438,496; and Serial No. 593,602, filed May 14, 1945, now Patent No. 2,520,130, and the applications and patents referred to therein.

Figure 2C:
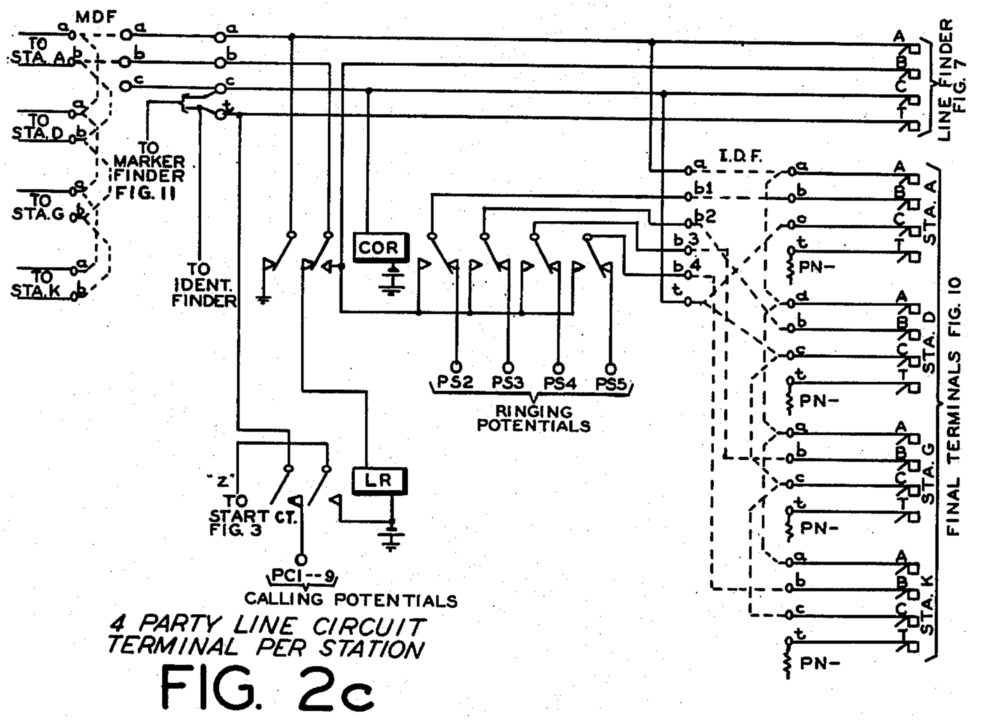

In Fig. 2*d* I have diagrammatically illustrated a five-pulse rectifier type of key set controller which may be connected with any one of the line circuits shown in Figs. 2—2*c*. The subscriber may move either the brushes *b1*, *b2* over commutator #1 or he may move the brushes *b3*, *b4* over commutator #2, depending whether the called digit is 1 to 5 or 6 to 0. The conducting segments of commutator #1 are numbered 1 to 5, from right to left, and those of commutator #2 are numbered 6 to 0, from left to right. A rectifier, S1 or S2, is moved with each pair of brushes and is connected across the line wires via the commutator, depending on the position of the brushes. The legends on Fig. 2*d* explain the pulsing scheme for all the digits as well as the order in which various contacts are closed. The brushes *b1*—*b4* are moved by means of finger grips which are pulled toward a fixed stop (not shown) and then released, whereupon they are moved back to the normal position (shown in the drawing) by means of a clock spring or the like. The stop is so arranged that the space between it and the nearest grip is equal to two spaces whereby the connection of the rectifier goes through a complete cycle when the finger grip is moved two spaces.

Each rectifier completes three cycles when grips representing digits 5 or 6 are pulled to the finger stop. Two separate rectifiers S1 and S2 are shown for the sake of simplicity, although by a suitable mechanical arrangement it is possible to associate the same rectifier with both rows of finger grips. The rectifiers (S1, S2) are shown in their home positions.

The spring nests Nos. 1 and 2, one nest provided for each commutator, are operated only when the finger grip operating one pair of brushes or the other is released, whereupon contact *c1* of the corresponding spring nest short-circuits the transmitter and receiver and immediately thereafter opens the line at contact *c2*. When a finger grip has travelled one space, it closes the rectifier circuit over contact *c3* and the corresponding commutator. When finger grip 1 is pulled and released, one positive pulse is produced, and when the finger grip 0 is pulled and released, one negative pulse. By a positive pulse is meant current flowing from the *a* wire to the *b* wire, and by a negative pulse, current flowing from the *b* wire to the *a* wire. Pulses are produced in the following order when digits 1 to 0 are keyed:

| Digit | Number and Order of Pulses |
|---|---|
| 1 | + |
| 2 | −+ |
| 3 | +−+ |
| 4 | −+−+ |
| 5 | +−+−+ |
| 6 | −+−+− |
| 7 | +−+− |
| 8 | −+− |
| 9 | +− |
| 0 | − |

When the finger grip reaches its home position, the contacts of the spring nest are released and return to normal, the rectifier is disconnected, the short circuit is removed from the transmitter and receiver, and the line circuit is again closed through the substation telephone set.

*Five-pulse rectifier key set for four-party lines*

The four-party line key set is the same as the main line key set so far as the pulsing of the digits is concerned. It has, however, an additional set of code contacts which send out, when the first digit is keyed, the following pulse or pulses to mark the calling station:

| Station | Number and Order of Pulses |
|---|---|
| A | + |
| D | − |
| G | +− |
| K | −+ |

When any finger grip is pulled to the stop for the first time, the line circuit is momentarily opened, after which the first code pulse is sent, followed by the second, if there is one. The line circuit is closed when the finger reaches the stop and from there on the set works as a main line set. The special code contacts are locked out until the handset is restored. Should it be desirable to identify a greater number of stations than four, this may be done by expanding the series of identifying pulses.

*Register selects and identifies calling line*

Since the manner in which these operations are performed is substantially the same as in my Patents 2,376,346 and 2,381,727 and my copending application Serial No. 529,506, filed April 4, 1944, they will not be further described.

*Selection and determination of class of line*

It is important to remember that the register, except on the "tens" selection, always makes two tests whether selection is toward the calling or the called line. The first test is for the calling or non-calling condition of lines or for the numerical designation of trunks. It is made over the T-terminal and its purpose is to cause the finder or selector to come to rest when the calling line or the desired trunk is reached. In the case of a line finder, the first test determines also whether the calling line is unrestricted or restricted.

The second test is made over the B-terminal immediately after the finder or selector comes to rest. Its purpose is to determine the class of the selected line or whether the selector stopped on the correct trunk, for instance, whether the selected calling line is equipped with a key set or a dial.

The cut-off relay of the subscriber's line or the holding relay of the selector or out-trunk is not energized until after the register has completed the second test. Thus, ample time is always available for this test.

*Assignment of test potentials*

Since the *t* and *b* wires of line finders and first selectors are not normally connected to each other, the same series of test potentials may be used for one purpose on the T-terminals and for another purpose on the B-terminals. As can be seen from the chart of Fig. 6X, only negative battery potentials are assigned, starting with four volts. The spacing between potentials is two volts. The numerical or T-terminal potentials are indicated as PN- and the service or B-terminal potentials as PS-potentials.

*Register arranged to select calling line*

As shown in Fig. 6X and in the line circuits (Figs. 2—2c), potentials PN1 and PN2 are assigned, respectively, to unrestricted and restricted lines. These potentials are designated as PC1 and PC2. Since the register must be able to select either kind of line when the finder brush makes contact with the T-terminal, the "switch" sides of the two tube circuits (Fig. 6*d*) are connected in multiple, the "marked" side of tube circuit No. 1 is connected to potential PC1 over BR front (Fig. 6*g*), and the "marked" side of the tube circuit No. 2 is connected to potential PC2 over BR1 front (Fig. 6*d*). Thus, one or the other of the two tube circuits fires the instant the line finder tests the calling line.

When BR (Fig. 6*g*) operates upon the seizure of the register, the following circuits are established:

*a.* Potential PC1 is placed to grid of V1 of tube circuit No. 1 (Fig. 6*d*).

*b.* Slow release relay R1R (Fig. 6) is energized. R1R energizes R2R and over back KAR (Fig. 6*a*) and resistor R10 places battery on the junction of the two windings of KBR. The other end of one winding of KBR is connected to ground over the back contact of KPR—. The other end of the other winding of KBR is connected to ground over the back contact of KPR+ and back DDR. These windings are differential and KBR does not operate at this stage.

*c.* AR (Fig. 6) and DR (Fig. 6*i*) are disconnected from the common ground lead so that they do not operate when R1R (Fig. 6) energizes R2R and this lead is grounded.

*d.* PS3 is placed over 173 on a front contact of cascade relay CCR3 (Fig. 6*j*).

*e.* PS12 is disconnected from a front contact of CCR2 (Fig. 6*j*) and in place thereof PS2 is connected over 172.

*f.* BR1 (Fig. 6*d*) is energized.

R2R (Fig. 6) closes a circuit from ground, R2R front, resistor R5, back TT0R (Fig. 6*v*), terminal C, brush C of the register link (Fig. 6), front ER (Fig. 4), in multiple through windings of CR and CR1 to battery. Due to the presence of resistor R5, CR operates but not CR1. CR grounds the C-brush of the line finder-group selector link finder and also the winding of ER so that both the line finder-group selector link and the register link are held when T4R is released, as explained later. CR opens the common starting lead W to the starting circuit (Fig. 3).

BR1 (Fig. 6*d*) closes the following circuits:

*a.* The switch side of tube circuit No. 1 is connected to the switch side of tube circuit No. 2.

*b.* The marked or register side of tube circuit No. 2 is connected to potential PC2.

*c.* The back contact of TVR2 is connected to the armature of TVR1.

*d.* The front contact of TVR2 is connected to the winding of restricted service relay RSR1.

*Finder hunts for calling line*

A circuit is now established from ground, front R2R (Fig. 6), back TVR2 (Fig. 6*d*), front BR1, back TVR1, winding low resistance TAR (Fig. 6*c*), back TFR (Fig. 6*g*), back AR (Fig. 6), back FR, A-terminal, A-brush (Fig. 4), front ER, A-brush, A-terminal (Fig. 5) of line finder-group selector link, conductor *a*, contact ONC1 (Fig. 7) of the line finder, winding AR, winding clutch magnet P to battery.

TAR (Fig. 6*c*) energizes and operates TBR and CCR1 (Fig. 6*j*). TBR locks up over its second winding and a back contact of TDR (Fig. 6*f*) to ground and places high tension battery on tube circuits Nos. 1 and 2 (Fig. 6*d*). CCR1 (Fig. 6*j*) energizes CCR2 over back JR (Fig. 6) and CCR2 energizes CCR3 (Fig. 6*j*).

AR and P (Fig. 7) of the line finder operate. AR opens the normal circuit of brushes A, B and C. The energization of P causes the finder to search for the calling line, the T-brush testing the T-terminals. When the calling line is reached, whether restricted or unrestricted, a circuit is established from PC1 or PC2, as the case may be (Fig. 2), front LR, T-terminal in the line finder bank, brush T (Fig. 7) of line finder, front BR, front AR, *b* wire, B-terminal of line finder-group selector link (Fig. 5), upper B-brush (Fig. 4) of register link, front Er, lower B-brush of register link, B-terminal (Fig. 6) of register, back FR, back AR, front TAR (Fig. 6*c*), thence in multiple to the grids of V2 and V4, the latter over front BR1 (Fig. 6*d*).

The service meter SM (Figs. 2 and 2*a*) associated with the main and P. B. X lines is connected to the T-terminal. It has a high resistance and does, therefore, reduce the effective value of calling potentials PC1 and PC2. To prevent false metering, the service meter is wound to operate on approximately 100 volts.

*Register selects unrestricted line*

An unrestricted calling line places potential PC1 on the T-terminal and, consequently, on the grids of tubes V2 and V4. Since the grid of V1 is connected by BR (Fig. 6*g*) to PC1, GV1 fires. GV2 does not fire because the grid of V3 is connected by BR1 to PC2. When GV1 fires, it energizes quick acting relay TV1 which opens the *a* wire circuit, thereby releasing TAR (Fig. 6*c*) of the register and AR (Fig. 7) and P of the line finder. The de-energization of P causes the line finder to come to rest on the terminals of the calling line. The release of AR recloses the normal A, B and C brush circuits and disconnects the T-brush from the *b* wire and in place thereof connects it to the *t* wire which is grounded, thus holding the calling line busy until the cut-off relay COR (Fig. 2) operates and releases the line relay which removes the calling potential from the T-terminal, as explained later. This busying ground may be traced from ground, back MMR3 and 2 (Fig. 6*r*), back ER (Fig. 6*i*), back PDR (Fig. 6*a*), D-terminal, D-brush (Fig. 6) of register link, front ER (Fig. 4), D-terminal of line finder-group selector link (Fig. 5), *t* wire, back AR (Fig. 7) of the line finder and front BR to the T-brush. Over its front contact, TVRI (Fig. 6*d*) energizes BR2 which locks up to ground, disconnects itself from the front contact of TVR1 and releases BR1.

*Register selects restricted line*

Restricted lines are selected in the same manner as unrestricted lines, the difference being that the potential PC2 placed on the T-terminal causes GV2 (Fig. 6*d*) of tube circuit No. 2 to fire instead of GV1 of tube circuit No. 1. GV2 operates quick acting relay TVR2 which opens the *a* wire circuit and causes the line finder to come to rest on the terminals of the calling line.

When TVR2 makes its front contact, it energizes RSR1 over BR1 front, which energizes RSR (Fig. 6*g*) and removes high tension battery from tube circuit No. 2, thereby de-ionizing GV2 and releasing TVR2. RSR1 holds CCR1 (Fig. 6*j*) energized when TAR (Fig. 6*c*) releases. RSR locks up to ground and changes the application of certain PN-potentials so as to direct extra charge calls from restricted lines to special trunks. RSR1 energizes BR2 (Fig. 6*d*) which locks up as previously explained and releases BR1. When TVR2 breaks its front contact, RSR1 releases. RSR1 is sufficiently slow releasing to insure the proper operation of BR2 and RSR.

*Register arranged to identify calling line*

When BR1 releases, it arranges the register for the second test which, with one exception, is always made by tube circuit No. 2. The release of BR1 has the following consequences:

*a.* Disconnects the switch side of tube circuit No. 1 from the tube circuit No. 2.

*b.* Disconnects potential PC2 from the marked side of tube circuit No. 2 and in place thereof connects said circuit to an armature spring contact of CCR1 (Fig. 6*j*).

*c.* Disconnects the armature of TVR1 from the back contact of TVR2, thus holding the *a* wire circuit open.

*d.* Disconnects the front contact of TVR2 from RSR1 and in place thereof connects it to one side of the winding of TDR (Fig. 6*f*).

*Calling line identification potentials*

As shown in Fig. 6X there are three identification PS— potentials, one of which is placed on the B-terminal of the line finder by the line relay. They are as follows:

PS1 (ML—K)—which is the same as PC1 and is used to indicate main or P. B. X lines (Figs. 2 and 2*a*) equipped with rectifier key sets.

PS2 (ML—D)—used to indicate main or P. B. X lines equipped with ordinary dials.

PS3 (PL—K)—which is used to indicate party lines (Fig. 2b) equipped with rectifier key sets arranged to identify the calling station. Party lines not provided with means of station identification would be treated the same as main lines and would have class potentials ML—K or ML—D, according to whether key sets or dials were used.

*Register identifies main or P. B. X line equipped with key set (Figs. 2, 2a and 2d)*

TVR1 (Fig. 6*d*) opens, upon energization, the *a* wire circuit and releases TAR (Fig. 6*c*) which in turn opens the circuit of the first cascade relay CCR1 (Fig. 6*j*). The cascade relays are slightly slow releasing so that before CCR1 breaks its front contact a test circuit is established from PS1 (Fig. 2) front LR, back COR, B-terminal of line finder, line finder-group selector brush (Fig. 7), back AR, *b* wire, B-terminal (Fig. 5) of B-link, B-brush (Fig. 4) of register link, front ER, B-brush and B-terminal of the register finder (Fig. 6), back FR, back AR, back TAR (Fig. 6*c*) to the grid of V4 (Fig. 6*d*). The test circuit continues from the grid of V3, back BR1, back LR (Fig. 6*g*), front CCR1 (Fig. 6*j*), back TFR (Fig. 6*g*), front BR to PC1.

GV2 fires and energizes TVR2 which closes a circuit from ground, front R2R (Fig. 6), front TVR2 (Fig. 6*g*), back BR1, back LR, back TFR, winding TDR (Fig. 6*f*), front CCR1 (Fig. 6*j*), winding CCR1 to battery. CCR1 is thus retained in its operated position. The operation of TDR (Fig. 6*f*) does a number of things:

*a.* It operates KAR, circuit from ground, front TDR, back AR (Fig. 6), resistor R7 (Fig. 6*a*), one winding of KAR to battery. KAR opens short-circuit of its second winding to ground, and over a front contact prepares to lock up in series with the calling line when AR operates. KAR also disconnects KPR— and KPR+ from the calling line and places a ground on the winding of R1R (Fig. 6), so that this relay does not release when BR (Fig. 6*g*) releases, as explained below.

*b.* It operates GR, circuit from ground, front R2R (Fig. 6), front TDR (Fig. 6*f*), front CCR1 (Fig. 6*j*), back DR (Fig. 6*i*), one winding of GR to battery. The operation of GR causes the energization of the cut-off relay of the calling line, as explained below.

*c.* It operates TER (Fig. 6*f*) which locks up to ground at R2R, and opens the *t* wire circuit of the register, thus releasing BR (Fig. 6*g*).

*d.* It opens the locking circuit of TBR (Fig. 6*c*) which falls away and removes high tension battery from the tube circuits (Fig. 6*d*), thereby de-ionizing GV1 and GV2 and releasing relays TVR1 and TVR2.

BR (Fig. 6*g*) removes calling potential PC1 from tube circuit No. 1 (Fig. 6*d*), disconnects potential PS2 from CCR2 (Fig. 6*j*) and in place thereof connects PS12, disconnects PS3 from cascade relay CCR3, removes ground from R1R (Fig. 6), and finally over a back contact energizes AR (Fig. 6) and DR (Fig. 6*i*). AR (Fig. 6) disconnects the selector side of the tube circuits from the *a* and *b* wires of the calling line and connects them instead to the *a* and *b* wires of the first group selector for the subsequent selections. It opens the initial operating circuit of KAR (Fig. 6*a*) but before doing so, connects the two windings of KAR to the calling line. Thus, this relay does not fall off when AR is operated.

DR (Fig. 6*i*) transfers the front contacts of cascade relays CCR1, CCR2 and CCR3 from calling line class identification circuits to the group selector identification circuits.

*Register identifies main or P. B. X line equipped with dial (Figs. 2 and 2a)*

The register operates in the same manner as when selecting a main line having a key set, but as the line relay places potential PS2 on the *b* wire instead of PS1, GV2 (Fig. 6*d*) does not fire until cascade relay CCR1 (Fig. 6*j*) makes its back contacts. Potential PS2 is then placed on the grid of V3, circuit from front BR (Fig. 6*g*) front CCR2 (Fig. 6*j*), back CCR1, back LR (Fig. 6*g*), back BR1 (Fig. 6*d*) to the grid of V3. TVR2 operates and energizes TDR (Fig. 6*f*) and holds CCR2 (Fig. 6*j*) energized. TDR energizes TER (Fig. 6f), GR (Fig. 6i) and FR (Fig. 6), circuit from ground, front TDR, back CCR1 (Fig. 6j), front CCR2, back DR (Fig. 6i), second winding of GR, winding FR (Fig. 6) to battery. FR locks up and disconnects the key pulsing circuit and in place thereof connects the *a* and *b* wires of the calling line to the dial pulsing circuit.

A short while after TER (Fig. 6f), BR releases and energizes AR (Fig. 6) and DR (Fig. 6i), all as previously explained. KAR (Fig. 6a) falls away because the line circuit is open at FR. DAR (Fig. 6a) is energized over FR front and energizes DBR which holds R1R (Fig. 6).

*Register identifies four-party line equipped with key set (Figs. 2b and 2d)*

The method of selection is as for main lines just described but, the party line potential being PS3, GV2 (Fig. 6d) dces not fire until cascade relays CCR1 and CCR2 (Fig. 6j) make their back contacts, whereupon potential PS3 is placed on the grid of V3 (Fig. 6d). When TDR (Fig. 6f) operates, it energizes XAR0 (Fig. 6b) of the party station pulse storing relays, circuit from ground, left inner front TDR (Fig. 6f), back CCR1 (Fig. 6j), back CCR2, front CCR3, back DR (Fig. 6i), winding XAR0 (Fig. 6b) to battery. XAR0 locks up over back PDR (Fig. 6a) and arranges the register for calling station identification, as explained later. After this, BR (Fig. 6g) releases and energizes AR (Fig. 6) and DR (Fig. 6i). XAR0 (Fig. 6b) energizes GR (Fig. 6i) which operates the cut-off relay.

*Cut-off relay energized*

The cut-off relay COR (Fig. 2) is not energized until the second test is complete, at which time, as already explained, GR (Fig. 6i) operates and when it does, a circuit is closed momentarily from ground, winding ER (Fig. 5), rectifier S1, E-terminal and brush of register link (Fig. 4), front ER, E-brush of register link, E-terminal (Fig. 6), front GR (Fig. 6i) to negative battery. ER (Fig. 5) closes the circuit of the line finder-group selector link release relay RR, circuit from ground, front DR, winding RR, front ER to battery. RR locks up to battery and extends ground at the right hand armature and front of MR over RR front, wire c1 to the line finder (Fig. 7), back AR, C-brush, C-terminal of line circuit (Figs. 2, 2a or 2b), winding COR to battery. COR operates, disconnects the line relay LR from the calling line, disconnects the PS-potentials from the B-terminal and in place thereof connects the *b* wire of the line to the B-terminal, and in the case of a party line (Fig. 2b), the *a* wire to the A-terminal.

The line relay, upon releasing, removes the calling PC potential from the T-terminal of the line finder and battery from the common starting lead to the starting circuit (Fig. 3).

When DR (Fig. 6i) operates on a call from a main line or when XAR0 (Fig. 6b) is energized after the storing of the party station identification pulses, GR (Fig. 6i) is released, thereby removing battery from the *e* wire and releasing ER (Fig. 5) of the line finder-group selector link.

*Starting circuit released*

The line relay holds the connection over its front contact until the cut-off relay is energized. During the hunting of the line finder, the complete holding circuit is as follows: From battery, front LR (Fig. 2), resistor R1 (Fig. 3), lead X, front AR (Fig. 7) of the line finder (ONC4 is now open), front BR, wire *h* to terminal T (Fig. 5), brush T (Fig. 4) of register link windings T1R and T2R, front T1R, front T2R to ground. T2R holds FR, T3R and T4R energized, the latter two in series with BR (Fig. 6g) of the register.

When the calling line is picked up, AR (Fig. 7) releases and opens the holding circuit of T1R and T2R (Fig. 4) of the register link. T2R and FR are made slow releasing, and while the line relay test potential is removed from the T-terminal of the line finder-group selector link, ground is still maintained on the T-terminal of the register, thereby holding BR (Fig. 6g) energized long enough for the completion of the second test and for TER (Fig. 6f) to open the register test circuit and release BR of the register and T3R and T4R (Fig. 4) of the register link before FR removes ground from the T-terminal of the register. The register is, therefore, guarded against double connections or false identification.

REGISTER RECEIVES KEY PULSES FROM CALLING LINE

*Rectifier pulsing circuit connected (keying tone heard)*

When AR (Fig. 6) operates, it disconnects the calling line from the tube circuits (Fig. 6d) and in place thereof connects it to the key pulsing circuit. At the same time, AR energizes KTR1 (Fig. 6) via a back contact of KTR2. KTR1 bridges a tone transformer TT across the calling line in series with condenser C and closes the primary circuit, through keying tone interrupter KT1. The calling subscriber will hear this tone.

*Calling party line station identified*

Assume now that station D (Fig. 2c) is calling. When the first digit is keyed, the line circuit is momentarily opened and KAR (Fig. 6a) falls off quickly, places battery on the junction of the two windings of KBR through resistor R10, disconnects its two windings from the calling line, grounds the *a* wire and connects an alternating potential of the proper characteristics, for instance, 400 cycles 50 volts, to the *b* wire through the windings of the two polarized pulsing relays KPR+ and KPR−.

Following the short opening, the key set (see Fig. 2d) closes the line through a rectifier so as to produce a momentary negative pulse to operate KPR− but not KPR+. These pulsing relays are very rapid in action. They will not operate on 400 cycle A. C. when a rectifier is not included in the circuit but will break their back contacts quickly and hold their front contact closed when a rectifier is inserted in the line to produce pulsating current of the proper polarity. Capacitor C allows the flow of current through the relay during the short intervals of no line current and the relay will keep the front contact closed. When KPR− breaks its back contact, it opens the circuit including one winding of KBR which operates and energizes KDR. KBR maintains R1R (Fig. 6) energized. R1R is sufficiently slow acting so that it does not fall off during the interval between the opening of its circuit by KAR and the closing of its circuit by KBR, or vice versa.

KPR− energizes digit counting relay KCR1− over back KCR+ and back KCR1−. KCR1− locks up over resistor R9 and back KER, and immediately thereafter over a front contact of KDR which operates KER. KCR1− energizes XR0 (Fig. 6b) of the party station pulse storing relays, circuit from ground, back DBR (Fig. 6a), front KCR1—, front XAR0 (Fig. 6b), winding XR0 to battery.

KER (Fig. 6a) operates KTR2 (Fig. 6) which locks up and releases KRT1, removing the keying tone transformer and keying tone from the line.

Just before the finger (Fig. 2d) reaches the finger stop, the line circuit is again momentarily opened and then closed, thereby causing the release of KPR— (Fig. 6a) which makes its back contact and closes the circuit including the second winding of KBR which releases.

A circuit is now closed from ground, back KBR, front KDR, front KCR1—, back DER (Fig. 6b), back KCR2, front XAR0, winding XR1 to battery. XR1 operates and locks up over the second winding of XR0, circuit from battery, winding XR1, front XR1, front XR0, winding XR0, back PFR (Fig. 6a), winding PDR, front R2R (Fig. 6) to ground. PDR (Fig. 6a) operates and releases XAR0 (Fig. 6b) which is slightly slow releasing and allows KDR (Fig. 6a) time to break its front contacts before it (XAR0) makes its back contact. Thus, relay KAR is not again energized and the subscriber's station remains connected to KPR+ and KPR—.

When KDR breaks its front contact, it releases KER and also KCR1— which breaks its front contact before KER makes its back contact. XAR0 (Fig. 6b) releases GR (Fig. 6i) and disconnects XR0, XR1 and 2 (Fig. 6b) from the digit selecting relays.

When station A calls, KPR+ operates and energizes KCR1+ (Fig. 6a) which energizes XR1 (Fig. 6b) but not XR0. Should station G call, KPR+ operates first and then KPR— which locks up relay XR2, and calling station K operates KPR— first and then KPR+ which locks up relays XR0 and XR2.

*Party station marked in bank of identification finder*

When PDR (Fig. 6a) makes its front contact, it always applies a station identification potential PLA (see Fig. 6X) over PBR back, winding low resistance PAR, front PDR, D-terminal of register (Fig. 6), D-brush of register finder, (Fig. 4), front ER, D-brush and terminal D of line finder-group selector B-link finder (Fig. 5), conductor *t*, back AR of the line finder (Fig. 7), front BR, brush T, terminal T of the party line circuit (Fig. 2b), back contact of station marking relay PLR3 (Fig. 11), back PLR2, back PLR1, resistor R and winding common starting relay CSR to ground and in multiple to the T-terminal of a first identification finder. CSR operates. Resistor R has a high resistance so that the potential placed on the *t* wire is not seriously reduced.

There is one station marking circuit (Fig. 11) for each four-party line (Fig. 2b) and one marker finder circuit (Fig. 12) for each 100 party lines. CSR (Fig. 11) energizes slow release relay CSR1 which energizes clutch magnet P (Fig. 12), circuit from ground, front CSR1, back DR, back GVR, winding low resistance HTBR, back AR, winding P to battery. Potential PLA is normally connected to the marked side of the marker finder tube circuit over back CR1. When the finder reaches the T-terminal, potential PLA applied at the register is placed on the tube circuit over the finder and GV fires. GVR energizes and opens the clutch magnet circuit, stopping the finder. Over back AR, GVR energizes BR which places a momentary low resistance ground on the *t* wire through resistor R8, thus energizing PAR (Fig. 6a) of the register.

HTBR (Fig. 12) falls off in due course and removes high tension battery from the tube circuit which causes GVR to fall away. BR now locks up in series with AR. AR operates and removes ground from the *t* wire which releases PAR (Fig. 6a). AR also connects the counting cascade relays CR1, CR2, etc. (Fig. 12) to the back contact of GVR.

At the register end, PAR (Fig. 6a) energizes PBR which locks up in series with PER when PAR releases. PBR disconnects potential PLA from the *t* wire and since relays XR1 and XR0 (Fig. 6b) are energized, potential PLD is connected to the *t* wire over PBR front.

GV in the marker finder circuit (Fig. 12) does not fire immediately and counting relay CR2 operates, circuit from ground, front starting relay CSR1 (Fig. 11), back DR (Fig. 12), back GVR, winding HTBR, front AR, thence in multiple to battery through resistor R9 and back CR1, winding CR2 to battery. The purpose of R9 is merely to increase current in HTBR to make it sufficiently slow releasing. CR2 disconnects PLA from the tube circuit and in place thereof connects PLD. Since this potential is already on the *t* wire side of the tube circuit, GV fires, operates GVR for the second time and opens the circuit of HTBR.

GVR breaks its back contact before CR4 has time to operate and over its front contact and front AR energizes CR which grounds the *t* wire through low resistance winding in relay DR. This will operate DR and PAR (Fig. 6a) becomes energized for the second time.

In most cases, CSR (Fig. 11) falls away when the *t* wire is grounded but if another call is waiting for identification, then CSR is held because resistor R is individual to each station marking circuit. However, should CSR fall away when the *t* wire is grounded, slow release relay CSR1 remains energized and holds the lead X grounded for a sufficient time to enable the following operations to take place:

DR (Fig. 12) closes a circuit momentarily from ground, front CSR1 (Fig. 11), front CR (Fig. 12), front DR, front CR1, back CR2, brush B of finder, terminal B of station marking circuit (Fig. 11), winding PLR2 to battery. PLR2 locks up to the *c* wire of the line circuit (Fig. 2b) in multiple with the cut-off relay and at the same time marks station D on terminal C of the first identification finder. It should be noted that the first identification finder receives the "tens" indication over the A-brush, the units indication over the B-brush and when a party line or some other special line is involved then it receives an additional indication over the C-brush. PLR2 disconnects the T-terminal of the marker circuit from the *t* wire of the line finder, thus leaving the *t* wire of the line (Fig. 2b) free and clear for subsequent number identification.

When a little later HTBR (Fig. 12) falls away and removes the high tension battery from GV and GVR, CR1 and CR fall off. CR releases AR and BR and slow releasing DR.

The average time to complete the station marking operation is about one second, the minimum one-half a second and the maximum about two seconds.

When PAR (Fig. 6a) operates for the second time, it energizes PFR over a front contact of PER which was locked up in series with PBR. When PFR breaks its back contact, the holding circuit of XR1 and XR0 and PDR is opened.

These relays return to normal and free the party line station identification relays. PDR grounds the *t* wire and closes the out-selection circuit, thus permitting the first group selector to be operated.

*Party station service meter connected*

A meter SM (shown in dotted lines in Fig. 11) may be associated with each marking relay, both being locked to the *c* wire. Only the marked meter may then be operated. The method of marking with meters is substantially the same as marking flat rate stations just described.

*Calling station keys the typical seven-digit number 269—3800*

Whether the call is originated by a main line station, a PBX or a party line station, the method of pulsing and recording digits is the same. For the purpose of illustration, we will assume that the calling subscriber keys the number 269—3800.

*Calling station keys digit 2*

The subscriber pulls the finger grip to the finger stop, then releases it. As the grip returns to its home position, the following takes place in the order given:

(*a*) Line opened.
(*b*) Line closed—negative pulse.
(*c*) Line closed—positive pulse.
(*d*) Line closed.

*Pulsing circuit disconnected*

When KBR (Fig. 6*a*) makes its back contact, KAR is energized, circuit from ground, back XAR0 (Fig. 6*b*), front KDR (Fig. 6*a*), back KBR, back FR (Fig. 6), resistor R7 (Fig. 6*a*), one winding of KAR to battery. KAR locks up the calling line and shortly thereafter KDR breaks its front contact and removes the operating ground from resistor R7. KAR then disconnects the pulsing relays KPR+ and KPR—.

*Digit 2 stored*

Digit 2 it stored during the release of the pulsing circuit. KCR1— energizes XAR1, circuit from ground, front KCR1—, back XAR0 (Fig. 6*b*), back XBR1 (Fig. 6*e*), winding XAR1 to battery. XAR1 connects the first group of digit storing relays to the digit counting relays (Fig. 6*b*). XR0 (Fig. 6*e*) operates over a circuit from ground, back DBR (Fig. 6*a*), front KCR1—, front XAR1 (Fig. 6*e*), winding XR0 to battery. It will be noted that XR0 does not operate when KCR1+ operates, thus distinguishing between a first negative and a first positive pulse.

As KCR2 (Fig. 6*b*) is energized by KCR1—, and a momentary circuit is established from the back contact of KBR (Fig. 6*a*), front KDR, front KCR1—, back DER (Fig. 6*b*), front KCR2, back KCR3, back DFR, front XAR1 (Fig. 6*e*), winding XR2 to battery. Shortly after this KDR (Fig. 6*a*) breaks its front contact, but XR0 and XR2 (Fig. 6*e*) have time to lock up to ground in series with XBR1— which is short-circuited as long as KDR (Fig. 6*a*) is on its front contact.

XBR1 disconnects XAR1 and connects XAR2 (Fig. 6*h*) of the second group of digit storing relays, but KDR (Fig. 6*a*) releases the locked up digit counting relays (Fig. 6*b*) and KCR1 removes ground from the operating lead to XAR2 which does not operate.

The circuit is now in condition to receive and store the second digit.

*Subscriber keys remaining digits (69—3800)*

The remaining six digits are keyed in the same manner as the first. An examination of the circuit will show that when the full number is keyed, the following relays are energized in the seven groups of digit storing relays:

*Table 4*

| Digit Keyed | Storing Group | Relay Operated | | | Potential Connected |
|---|---|---|---|---|---|
| 2 | 1 | XBR1 | XR0 | XR2 | PN2 |
| 6 | 2 | XBR2 | XR0 | ----- | PN6 |
| 9 | 3 | XBR3 | ----- | XR2 | PN9 |
| 3 | 4 | XBR4 | ----- | XR3 | PN3 |
| 8 | 5 | XBR5 | XR0 | XR3 | PN8 |
| 0 | 6 | XBR6 | XR0 | XR1 | PN0 |
| 0 | 7 | XBR7 | XR0 | XR1 | PN0 |

The following table lists the relays operated when digits 1 to 0 are keyed:

*Table 5*

| Digit Keyed | KCR Relays Operated | XR Relays Operated | Potential Connected |
|---|---|---|---|
| 1 | 1+ | 1 | PN1 |
| 2 | 1—, 2 | 0 and 2 | PN2 |
| 3 | 1+, 2, 3 | 3 | PN3 |
| 4 | 1—, 2, 3, 4 | 0 and 4 | PN4 |
| 5 | 1+, 2, 3, 4, 5 | 5 | PN5 |
| 6 | 1—, 2, 3, 4, 5 | 0 | PN6 |
| 7 | 1+, 2, 3, 4 | 4 | PN7 |
| 8 | 1—, 2, 3 | 0 and 3 | PN8 |
| 9 | 1+, 2 | 2 | PN9 |
| 0 | 1— | 0 and 1 | PN10 |

REGISTER RECEIVES DIAL PULSES FROM CALLING LINE

*Station dials*

FR (Fig. 6) is energized when the calling line is equipped with a dial instead of a key set. FR bridges the dial pulsing relay DAR (Fig. 6*a*) across the calling line, at the same time energizing KTR1 (Fig. 6) to apply the dialing tone to the calling subscriber. DAR (Fig. 6*a*) energizes slow release relay DBR which holds R1R (Fig. 6) energized. The circuit remains in this condition until the subscriber dials.

When the first dial pulse opens the line in the well-known manner, DAR (Fig. 6*a*) makes its back contact and energizes DCR1 and DDR. DBR does not fall off during the pulsing of the number; neither does DDR. When DDR operates it removes ground from one winding of KBR which operates and energizes KDR which energizes KER.

Over KCR1— back and DFR (Fig. 6*b*) back, DCR1 energizes KCR1+ which locks up as on a keyed call over the front contact of KDR.

When the line circuit is closed at the end of the first pulse, DAR breaks its back contact and DCR2 is allowed to operate in series with DCR1. DCR2 locks up over back DCR4 and opens the locking circuit of DCR1 which releases.

When the line is opened for the second time, DAR falls away and this time energizes DCR3 over front DBR, front DCR2 and back DCR4.

When the line circuit is reclosed for the second time, DAR breaks its back contact and DCR4 locks up in series with DCR3 over a back contact of DCR1. DCR4 releases DCR2.

When the third pulse is sent in, DCR1 operates for the second time and releases DCR4 and DCR3, after which DCR2 locks up for the second time.

On the fourth pulse, DCR3 and DCR4 operate for the second time, etc.

When DCR3 operates for the first time, it energizes over DFR back KCR2 (Fig. 6b) which locks up in multiple with KCR1+. When DCR1 (Fig. 6a) is operated for the second time, KCR3 (Fig. 6b) is energized and locked up. It will be seen, therefore, that the digit counting relays are operated just as when the call is keyed.

*Conversion of ten dial pulses into two series of five pulses*

Should a sixth pulse be sent in (representing digit 6), DCR3 (Fig. 6a) will operate for the third time and a circuit will be closed from ground, front DCR3, winding DER (Fig. 6b), front KCR5 to battery. DER locks up, releases KCR2 to KCR5 inclusive and energizes DFR which locks up over front KDR (Fig. 6a). KCR1+ does not release.

Should a seventh pulse be sent in, DCR1 (Fig. 6a) operates for the fourth time and KCR2 (Fig. 6b) for the second time.

An eighth pulse would operate KCR3, a ninth pulse KCR4 and a tenth pulse KCR5, all for the second time.

To distinguish between the two series of five pulses, DCR4 (Fig. 6a), which operates only on the even digits, grounds the common lead to the XR0 digit storing relays.

*Storing of dialed digits*

After the dialing of each digit, DAR remains on its front contact long enough to allow DDR to make its back contact. DDR closes the circuit of the second winding of KBR which de-energizes and energizes the digit storing XR relay or relays corresponding to the digit dialed. Since the digit 0 requires ten pulses when a dial is used and only one pulse when a key set is used, relay DFR (Fig. 6b) is used to re-arrange the connections between the digit counting relays and the digit storing relays so that the energization of the digit storing relays is the same whether the call is dialed or keyed. An examination of the circuit will show that the various relays are operated in accordance with the following table when any digit 1 to 0 is dialed:

| Digit Dialed | KCR Relays Operated | Transfer Relays Operated | Storing Relays Operated | Potentials Connected |
|---|---|---|---|---|
| 1 | 1+ | None | XR1 | PN1 |
| 2 | 1, 2 | None | XR0, XR2 | PN2 |
| 3 | 1, 2, 3 | None | XR3 | PN3 |
| 4 | 1, 2, 3, 4 | None | XR0, XR4 | PN4 |
| 5 | 1, 2, 3, 4, 5 | None | XR5 | PN5 |
| 6 | 1+ | DER, DFR | XR0 | PN6 |
| 7 | 1, 2 | DFR | XR4 | PN7 |
| 8 | 1, 2, 3 | DFR | XR0, XR3 | PN8 |
| 9 | 1, 2, 3, 4 | DFR | XR2 | PN9 |
| 0 | 1, 2, 3, 4, 5 | DFR | XR0, XR1 | PN10 |

TRANSLATION

Translation is effected by a translator link (Figs. 13—13b), one of which picks up the register as soon as the first digit is stored. The translator link does the following:

*a.* When a single-digit special service number such as 0 is keyed, the register extends the call to its destination by one, two, three, four or five selections, the equivalent of keying any one, two, three, four or five-digit number.

*b.* When a two-digit special service number is keyed, the register likewise extends the call to its destination in one, two, three, four or five selections and sends calls from restricted lines to special trunk groups.

*c.* When an office prefix is keyed, the register extends the call to the proper 10,000 line unit in one, two, three, four or five selections.

*d.* Directs the register to arrange for metering the call one, two or three times when the called party answers.

*e.* Releases the register after selection of special number. Such calls are not metered.

*Translator link*

Figure 13B:
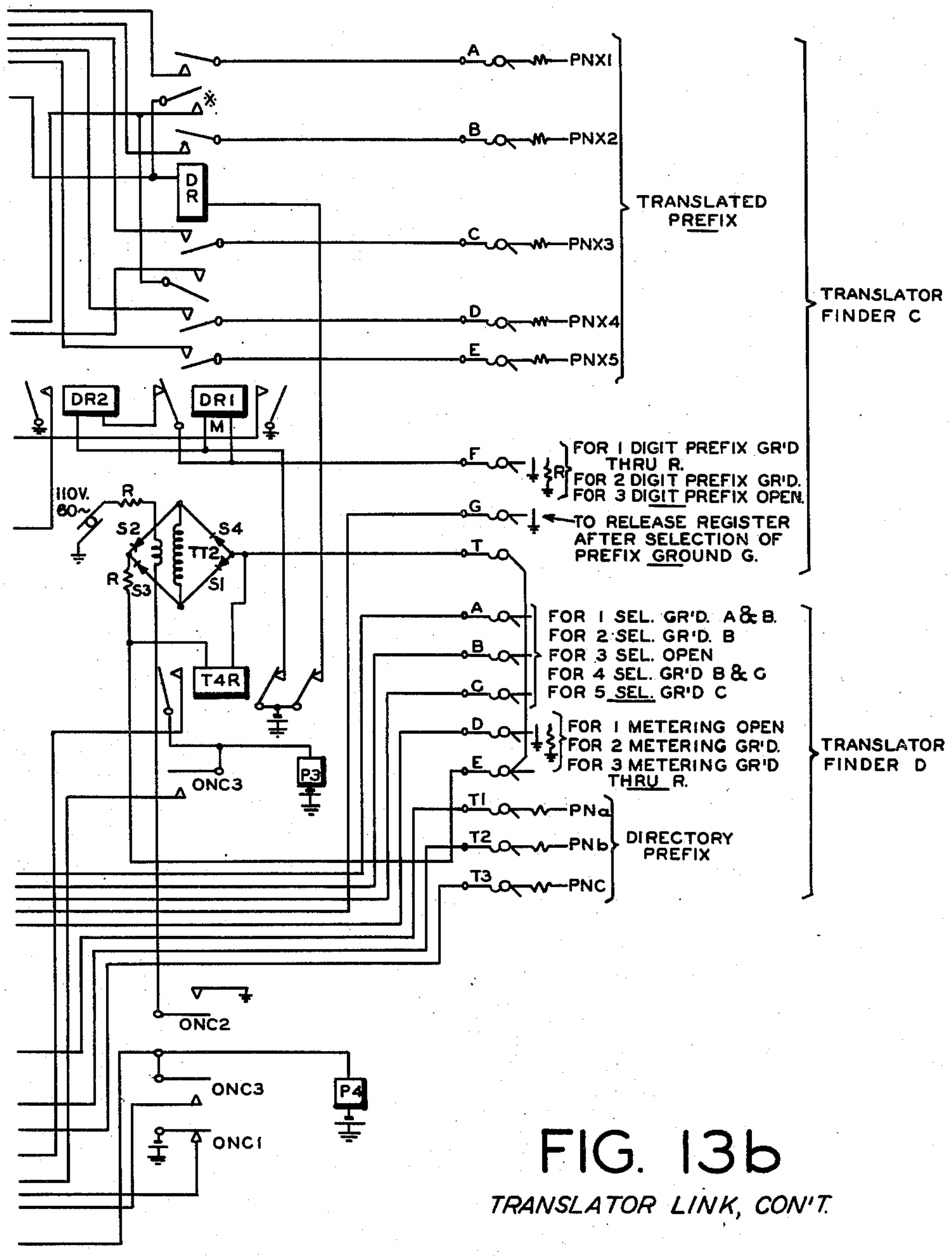

The translator link comprises two eight-brush register finders A and B (Fig. 13) and two eight-brush translator finders C and D (Fig. 13b). A sufficient number of translator links is provided to handle the maximum simultaneous traffic to the offices and special services. The holding time is short since a translator link is not picked up until the first digit is stored and it is released immediately after the special service or office prefix selection is complete. Each group of translator links cares for a total of 65 offices, special services and non-existing digits. It is assumed for the purposes of this description that for an area having some 100 central offices two groups of translator links are required, one for first digits 1 to 5 and the other for first digits 6 to 0. Additional groups of translator links may be added at any time to care for additional offices and an area having about fifty central offices may be served by one group of translator links.

Figure 13C:
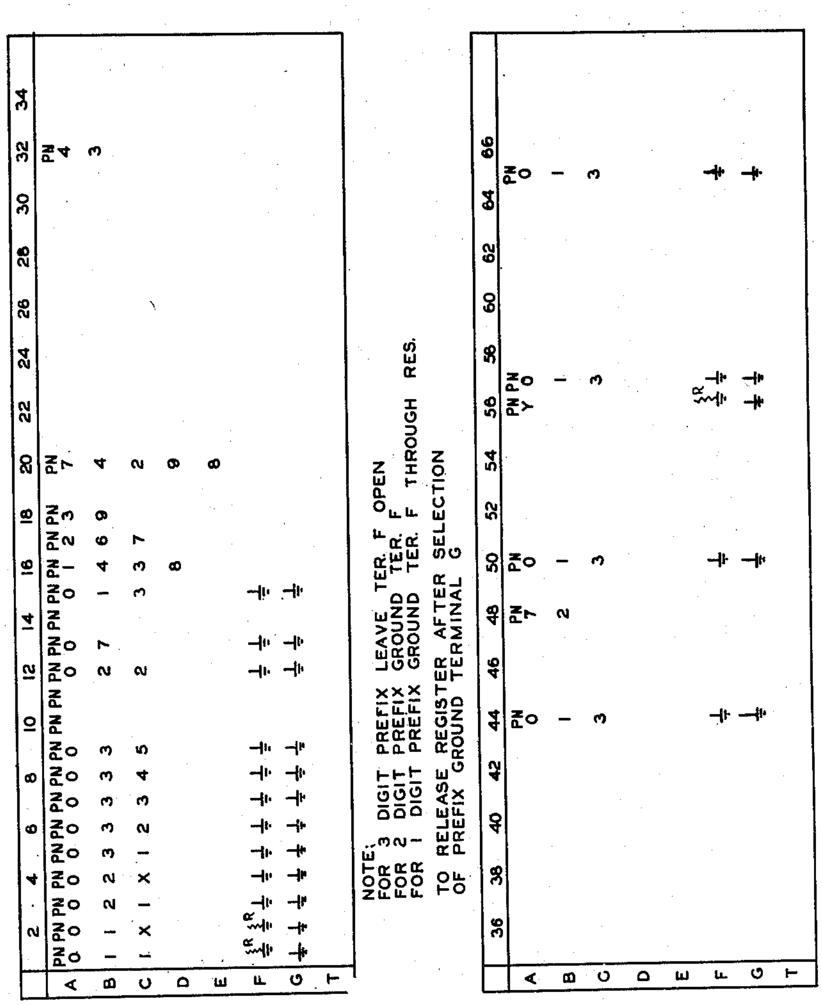

The translator finder banks of each group of translator links are multiplied so that only one set of cross connections is required per office or special service. It is not necessary to change anything in the register circuits when a change in translation is made. A typical cross-connection of translator finder banks C and D is shown in Figs. 13c and 13d, in which the 65 vertical columns of sixteen terminals are, respectively, assigned to eleven special services, eight non-existing first and second digits, 43 offices and three spares. It is assumed that the numbers are equally distributed between the first five digits and the last five digits. This, however, is not essential. Should there be more special services and/or office prefixes which start with the first five digits than with the last five, the strapping of the first group of digit storing relays (Fig. 6e) may be changed so as, for example, to place four first digits in one group and six first digits in the other group of translator links. It is assumed that the special service numbers start with 1 but any other digit may be used.

*Translator finders and banks*

The cross-connection of translator banks is as follows:

Finder C (Figs. 13b and 13c):

*Brushes A, B, C, D* and *E.*—Translation of the called number is done at these terminals. Any potential may be connected to any terminal, and one potential to five terminals.

*Brush F.*—When open, the translator waits for a three-digit prefix. When grounded through a resistor, it waits for a one-digit prefix and when direct-grounded, it waits for two digits.

*Brush G.*—When free, the register is arranged to release only after the four-digit number suffix is selected. When grounded, the register is released as soon as the translated prefix is selected.

Finder D (Figs. 13*b* and 13*d*):

*Brushes A, B and C.*—These brushes control the number of selections. When all are free, the register is arranged for three selections; when A and B are grounded—one selection; when B alone is grounded—two selections; when B and C are grounded—four selections; and when C only is grounded—five selections.

*Brush D.*—This brush controls metering. When D is open, an answered call is metered once; when grounded the call is metered twice; and when grounded through a resistor the call is metered three times.

*Brushes T1, T2 and T3.*—T1 is cross-connected to potential PN*a* which is that of the first digit of the special service or office prefix. T2 is cross-connected to potential PN*b* which is that of the second digit of the special service or office prefix. T3 is connected to potential PN*c* which is that of the third digit of the office prefix. Potential PN16 is used to trap non-existing office prefixes. The eight columns 15, 44, 46, 50, 52, 57, 59 and 65 in Fig. 13*d* are reserved for this purpose. Should there be only one office prefix commencing with the same first two digits, nine columns would be required. If there were two or more office prefixes all commencing with the same first two digits, then only five columns would be required.

The cross-connections of the test terminals of finder D once made should be left unchanged until radical alterations in the fundamental plan for the area are made.

*Translator link selected*

When the first digit of called number 269—3800 is stored, XBR1 (Fig. 6*e*) operates and closes a circuit from battery, front XBR1, front XR0, back TTAR (Fig. 6*v*), resistor R11, resistor R12, winding common starting relay CSR1 to ground. CSR1 grounds the starting lead X to all idle translator links of the first group, circuit from ground, front CSR1, one winding HR (Fig. 13) of the translator link, ONC1 of finder D (Fig. 13*b*) to battery. The relays HR of all idle translator links become energized and the associated clutches P2 will start the finders B to search for the calling register. The first finder B to reach the calling register closes a ciruit from battery (front XBR1 (Fig. 6e), front XR0, back TTAR (Fig. 6*v*), resistor R11, terminal T, brush T of finder B (Fig. 13), high resistance winding of T1R to ground. T1R opens the circuit of P2 and shunts its high resistance winding by its low resistance winding in series with low resistance T2R, thus making the register busy to all other hunting B-finders. The low resistance shunt reduces current through resistor R12 (Fig. 6*v*) sufficiently to cause CSR1 to fall away and stop the other hunting finders. T2R (Fig. 13) holds HR energized when CSR1 (Fig. 6*v*) falls away.

HR closes the primary winding circuit of transformer TT1 of rectifier bridge RU—1 unit, from ground, front HR, primary winding of TT1, resistor R to 110 volts 60 cycle source to ground. Direct current flows through resistor R10 and relay T3R which operates and energizes magnet P1 of finder A, ground being supplied over T2R front. Finder A searches for the terminal T which is engaged by brush F of finder B. Shortly after finder B comes to rest, finder A reaches the same vertical row of terminals whereupon T3R is short-circuited, circuit from one side of T3R, brush F of finder B, multiple wiring, terminal T, brush T of finder A to other side of T3R. T3R falls away and de-energizes P1. Finder A can never advance beyond finder B but it will be only two or three terminals behind finder B. As all idle register links in the selected group hunt simultaneously, the average time required to select the register during normal traffic conditions will be short.

Finders A and B have no home positions, whereas finders C and D have and must always hunt in the same numerical direction.

In another finder A, which may be hunting simultaneously with the one under consideration and shown in Fig. 13, the relay corresponding to T3R will also be energized by the application thereto of an independent D. C. potential through another resistor like R10. When, therefore, the second finder tests in its multiple bank terminals which the first finder A is testing, then it will not disturb the operation of relay T3R nor will the operation of its relay T3R be disturbed, and both these relays will remain energized. The only way in which T3R may be caused to de-energize is to establish the above-traced short circuit through the wiper of the associated finder B.

*Translator finders operate*

As soon as finders A and B have come to rest on the terminals of the calling register, a circuit is established from ground, front T2R (Fig. 13), back ER, back T3R, back CR5 (Fig. 13*a*), back GVR1, back GVR2, winding low resistance AR1, winding power magnet P4 (Fig. 13*b*) of finder D to battery. AR1 and P operate. AR1 energizes slow releasing relay HTBR (Fig. 13*a*) and over a back contact of CR5 also CR6. HTBR connects high tension battery to the tube circuits.

Finder D (Fig. 13*b*) searches for the T1 terminal connected to the PN-potential of the first digit stored, which in this case is PN2. Potential PN2 is placed on the register side of the tube circuit No. 1 (Fig. 13*a*) over a circuit from PN2, front XR2 (Fig. 6*e*) of the first group of digit storing relays, back XR1, front XR0, back OR (Fig. 6*g*), back TTBR (Fig. 6*t*) to terminal A of finder A, thence brush A of finder A (Fig. 13) back NR2 (Fig. 13*a*), back CR4, front CR6 to tube circuit No. 1. Brush T1 of finder D (Fig. 13*b*) is connected to the other side of tube circuit No. 1 over a back contact of CR4 (Fig. 13*a*) and CR5 front. The translator side of tube circuit No. 2 is permanently connected to potential PN16, and this tube circuit controls the sending of calls to an intercepting operator should a non-existing prefix be keyed.

Referring to Fig. 13*d*, note that terminal T1 is connected to potential PN2 in column 16. When, therefore, finder D reaches this terminal, GV1 (Fig. 13*a*) fires and energies GVR1 which opens the circuit of AR1 and P4. Finder D comes to rest.

Since terminal F of finder C in column 16 (Fig. 13*c*) is not grounded, the circuits of DR1 and DR2 (Fig. 13*b*) are not closed and the translator link waits for the storing of the second digit which, in most cases, would be keyed by the time translator finder D makes its first translation.

AR1 (Fig. 13*a*) releases HTBR and removes the short-circuit from CR5 which now locks up in series with CR6. When HTBR, which is slightly slow releasing, breaks its front contact, it de-ionizes GV1 and releases GVR1.

When the second digit (6) of the called number is keyed, PN6 is placed by the second group of relays (Fig. 6h) on brush B of finder A (Fig. 13). AR1 (Fig. 13a) is energized for the second time and operates CR4 over front CR5 and back CR3. The circuit of AR1 and P4 (Fig. 13b) is closed over back GVR2 (Fig. 13a), back GVR1, front CR5, back CR3, brush G, terminal G of finder A (Fig. 13), front XBR2 (Fig. 6h) to ground. Finder D hunts for the second time and when it reaches column 30 (Fig. 13d) it finds potential PN6 on terminal T2. Since terminal F of finder C (Fig. 13c) is still open, the translator waits in this position for the third digit. GV1 (Fig. 13a) fires for the second time. AR1 falls away and releases HTBR which removes short-circuit from CR3 which now locks up in series with CR4.

When the third digit (9) is keyed, the third group of digit-storing relays (Fig. 6k) places potential PN9 on brush C of finder A (Fig. 13) and ground over XBR3 (Fig. 6k) on brush F of finder A. The circuit of AR1 (Fig. 13a) and P4 (Fig. 13b) is closed for the third time, this time from brush F (Fig. 13), winding NR1 (Fig. 13a), back contact of CR1, front CR3 and CR5. NR1 disconnects tube circuit No. 2 from brush T2 (Fig. 13b) and connects it to brush T1. CR2 (Fig. 13a) operates and connects brush C of finder A to tube circuit No. 1 and brush T3 of finder D to the other side of the same circuit. Finder D searches for the terminal T3 connected to potential PN9 which is in column 32 (Fig. 13d). When finder D reaches this column, GV1 (Fig. 13a) fires for the third and last time, releasing P4 and AR1.

In this column of the last third digit of the series following a second digit, potential PN16 is cross-connected to the T1 terminal. Since PN16 is one terminal T1 in column 32 (Fig. 13a), GV2 also fires and energizes GVR2 which, however, is rendered ineffective since GVR1 removes ground from its armature. Therefore, NR2 does not operate. AR1 releases HTBR and allows CR1 to lock up in series with CR2.

Finder C (Fig. 13b) follows finder D as finder A followed finder B. When finder C comes to rest on the same row of terminals as finder D, T4R falls away and operates DR which locks up over front T2R (Fig. 13). DR (Fig. 13b) operates ER (Fig. 13) which, in turn, releases CR1 to CR6 inclusive (Fig. 13a). DR (Fig. 13b) connects brushes A, B, C, D and E of finder C through to the corresponding brushes of finder A (Fig. 13). ER connects brushes A, B, C and D of finder D (Fig. 13b) through to the corresponding brushes of finder B (Fig. 13) and brush G of finder C (Fig. 13b) to brush G of finder B (Fig. 13). It will be noted that while finder C (Fig. 13b) is in motion, relay T4R operates and keeps the circuit of DR open, thus making it impossible to operate DR or ER before finder C comes to rest.

REGISTER ESTABLISHES LOCAL CONNECTION

*Commencement of selection*

The keyed prefix of the called number —269— has been stored in the register and the translafor finder D (Fig. 13b) was advanced to row 32 (Fig. 13d) which is assigned to office 269. The prefix is arbitrarily translated into the number 43 by placing potentials PN4 and PN3 (Fig. 13c) on terminals A and B, row 32 of finder C. The prefix could, of course, have been translated into any other one- to five-digit number, since the keyed prefix contains three digits, terminal F of finder C is left free.

The connection will, therefore, be established over a first group selector, a second group selector, a thousands selector (sometimes referred to as a T selector), a hundreds selector (sometimes referred to as an H selector), and a final selector (sometimes referred to as an F. selector).

The selection cannot start until the third digit of the prefix is stored and translated. The translator switch advances to the corresponding position immediately after a digit is stored, and the time required to translate the third digit is negligible. As explained elsewhere, the trunking arrangement is such that during normal traffic the selection for the office prefix will be very rapid so that the final selector operates almost as soon as the "tens" and units are stored.

*First group selector operates (first test)*

When ER (Fig. 13) closes its front contacts, the fundamental circuit over the *a* wire is closed from ground, front ER, brush E, finder B, terminal E (Fig. 6v), back contact of counting relay CR2 (Fig. 6o), back PDR (Fig 6a), back BR1 (Fig. 6d), back TVR1, winding low resistance relay TAR, back TFR (Fig. 6g), front AR (Fig. 6), back JR, terminal F, brush F of register-link (Fig. 4), front ER, back BR, brush F, terminal F of line finder-group selector link (Fig. 5), contact ONC1 of first group selector (Fig. 8), winding AR, winding clutch magnet P to battery. TAR (Fig. 6c) and AR and P (Fig. 8) operate. The former energizes TBR which places high tension battery on tube circuits No. 1 and No. 2 (Fig. 6d) and causes cascade relays CCR1, CCR2 and CCR3 (Fig. 6j) to operate one after the other.

AR (Fig. 8) disconnects brushes A, B, C and T of the first group selector from their normal circuits and in place thereof connects brush T to the *b* wire through a front contact of BR which was energized upon the seizure of this selector. P causes the first group selector to search for a second group selector (Fig. 9) having the translated potential PN4 on the T-terminal.

When the first selector moves out of its home position, ONC1, and 3 open and ONC2 closes. BR remains locked up over its front contact.

The test circuit may be traced over brush T (Fig. 8), front BR and AR, wire *b*, G-terminal (Fig. 5), G-brush of register link (Fig. 4), back BR, front ER, G-brush, G-terminal of register (Fig. 6), back JR, front AR, front TAR (Fig. 6c) to the selector side of tube circuit No. 1 (Fig. 6d). The marked side of tube circuit No. 1 may be traced from the grid of V1, back TFR (Fig. 6g), back CR1 (Fig. 6o), terminal A (Fig. 6t), brush A of finder A of translator link (Fig. 13), front DR (Fig. 13b), brush A of finder C to PN4 on the translator cross-connecting rack (Fig. 13c).

When the first group selector reaches a T-terminal correspondingly marked GVI (Fig. 6d) fires and energizes TVR1 which opens the *a* wire circuit. TAR (Fig. 6c) and AR (Fig. 8) and P release. The first group selector comes to rest on the terminals of the selected second group selector. When AR makes its back contact, which it does quickly, the T-brush is grounded and made busy, circuit from ground back MMR3 and 2 (Fig. 6r), back ER (Fig. 6i), back PDR (Fig. 6a), D-terminal through register link (Fig. 4), *t* wire (Fig. 5), back AR (Fig. 8), front BR, T-brush, back BR (Fig. 9) of second group selector, resistor *rt*1, ONC3 to potential PN4.

*First group selector makes second test*

All normal selectors (Figs. 9, 9*a* and 10) have the same test potential on both the *t* and *b* wires but through separate *rt* resistors and the preceding selector tests for this potential first over the T-brush as above explained and then over the B-brush as follows:

TAR (Fig. 6*c*) is made slightly slow releasing so as to make sure that AR (Figs. 8, 9 and 9*a*) breaks its front contacts before TAR connects the second tube circuit (Fig. 6*d*) to the *b* wire. Should TAR make its back contact first, tube circuit No. 2 would make a premature test over the T-brush.

When both AR (Fig. 8) and TAR (Fig. 6*c*) make their back contacts, potential PN4 is placed on the selector side of tube circuit No. 2, but this time over back BR (Fig. 9) of the second group selector *rt*2, ONC3 to PN4. The marked side of tube circuit No. 2 is connected to potential PN4, as was the marked side of tube circuit No. 1, circuit from the grid of V3 (Fig. 6*d*), back BR1, back LR (Fig. 6*g*), front CCR1 (Fig. 6*j*), back CR1 (Fig. 6*o*), thence to PN4 through the brushes A of finders A and C in translator link (Figs. 13—13*b*).

TAR (Fig. 6*c*) opens the circuit of the first cascade relay CCR1 (Fig. 6*j*). All cascade relays are made slightly slow releasing so that the aforementioned test circuit is established and GV2 (Fig. 6*d*) fires before CCR1 (Fig. 6*j*) has had time to break its front contacts.

When TVR2 (Fig. 6*d*) makes its front contact, it closes a circuit from ground, front TVR2, back BR1, back LR (Fig. 6*g*), back TFR, winding TDR (Fig. 6*f*), front CCR1 (Fig. 6*j*) and winding to battery. CCR1 is thus prevented from releasing. TDR (Fig. 6*f*), releases TBR (Fig. 6*c*) which removes high tension battery from the tube circuits and restores them to normal, but before this happens a circuit is established from ground, front TDR (Fig. 6*f*), front CCR1 (Fig. 6*j*), front DR, back selection counting relay CR2 (Fig. 6*o*), winding CR1 to battery. CR1 operates and when TVR2 (Fig. 6*d*) breaks its front contact, which it does when the high tension battery circuit is opened, it releases TDR (Fig. 6*f*) which removes the short circuit from CR1 (Fig. 6*o*) allowing it to lock up in series with CR2. CR1 energizes CR7 and CR9 over back TTCR (Fig. 6*r*). These lock up in series with CR8 and CR10 respectively.

*Relay BR of second group selector (Fig. 9) energized*

TDR (Fig. 6*f*) momentarily places battery on the *a* wire and energizes BR (Fig. 9) of the second group selector, circuit from ground, one winding of BR, back BR, brush A (Fig. 8), back AR, *a* wire F-terminal of line finder-group selector link (Fig. 5), thence through the register link (Fig. 4) to the F-terminal of the register (Fig. 6), back JR, front AR, front TDR (Fig. 6*f*), back ER (Fig. 6*i*), resistor R14 to battery. BR (Fig. 9) is, therefore, energized only after the second test has been made. When BR operates it locks up to the C-brush of the first group selector (Fig. 8) and connects the *a* wire to the A-brush of the second group selector (Fig. 9). BR also disconnects the *b* wire from the *t* wire, and both from potential PN4.

*Second group selector operates*

The second group selector operates in the same manner as the first, but the *a* wire circuit is closed from ground over the back contact of CR4 (Fig. 6*o*) the instant CR2 makes its front contact. Thus there is no loss of time in starting the second selection determined by the translation of the office prefix potential PN3 (see column 32, row 32, row B, finder C, Fig. 13*c*) which is placed on the marked side of tube circuit No. 1 circuit from translator cross-connecting rack, brush B of finder C (Fig. 13*b*), front DR, brush B of finder A (Fig. 13), back CR3 (Fig. 6*o*), front CR1, back TFR (Fig. 6*g*) to V1 (Fig. 6*d*). The *b* wire circuit is closed through the first group selector (Fig. 8), front AR (Fig. 9) of the second group selector to the T-brush. When this brush finds potential PN3 on the *t* wire, the second group selector comes to rest just as the first group selector did, after which the register operates as before but in this case energizes CR3 (Fig. 6*o*) which in due course locks up in series with CR4.

*Second, third and fifth prefix selection suppressed*

Since the office prefix 269 has been translated into prefix 43 and since the translator has capacity for five selections, the third selection is suppressed by the premature energization of CR5, circuit from the ground placed on terminal B of finder D of the translator (Fig. 13*b*), brush B, front ER (Fig. 13), brush B of finder B, back TTCR (Fig. 6*r*), resistor R13*a*, winding CR5 (Fig. 6*o*) to battery. CR6 locks up in series with CR5. As already mentioned, CR7 to CR10 inclusive were energized when CR1 operated. Thus the *a* wire of the fundamental circuit and the marker wire of tube circuit No. 1 are extended through front contacts of the first five pairs of counting relays to armature springs of CR12 and CR11 respectively.

*Translator link released*

When CR3 makes its front contact it closes a series circuit from battery, winding TTAR (Fig. 6*v*), front contacts of the odd counting relays CR9 (Fig. 6*o*) to CR1, to ground. TTAR (Fig. 6*v*) operates and removes test potential from the T-terminal of finder B of the translator link (Fig. 13). T1R and T2R release. T2R releases HR, DR (Fig. 13*b*) and ER (Fig. 13). When HR makes its back contact, it returns finder D (Fig. 13*b*) to its home position over contact ONC3 of finder D. T2R (Fig. 13) returns finder C (Fig. 13*b*) to its home position over finder C. HR (Fig. 13) opens the primary circuit of rectifier unit RU—1 (Fig. 13) and ONC2 (Fig. 13*b*) of finder D opens the circuit of rectifier unit RU—2.

Finders A and B (Fig. 13) having no home positions remain set until another call arrives from the register. The translator link cannot be picked up for a second call until finder D (Fig. 13*b*) reaches its home position and closes the test circuit at ONC1.

*Thousands, hundreds, and final selectors operate*

Selection within each 10,000 line unit is made by a thousands selector which selects the proper thousands, and hundreds-selector which selects the proper hundreds and a final selector which selects the "tens" and units. There is no translation in this 10,000 line unit and each selector operates numerically in accordance with the fifth, sixth and seventh groups of digit storing relays.

*Thousands selector operates*

When the thousands digit is stored, in the present case the digit 3, XBR4 (Fig. 6p) operates and grounds the *a* wire of the fundamental circuit over back CR12 (Fig. 6o) and through front contacts of the even-numbered counting relays CR2 to CR10 inclusive. The marking potential PN3 is placed on tube circuit No. 1 over front XR3 (Fig. 6p) of the fourth group of digit storing relays, back XR2, XR1 and XR0, back CR11 (Fig. 6o), thence through contacts of the odd-numbered counting relays CR1 to CR9 inclusive. The thousands selector (Fig. 9) selects a hundreds selector with potential PN3 on the T-terminal in the same manner as the second group selector selected the thousands selector. The second test is made in the usual way. Counting relays CR11 (Fig. 6o) and CR12 lock up and BR (Fig. 9) of the hundreds selector locks up through the C-brush of the thousands selector.

*Hundreds selector operates*

When the subscriber keys the hundreds digit (8), XR3, XR0 and XBR5 of the fifth group of digit storing relays operate and the hundreds selector (Fig. 9) selects a final selector (Fig. 10) having potential PN8 on its T-terminal. When the second test is made, CR13 (Fig. 6o) and CR14 lock up and BR (Fig. 10) of the final selector locks up to the C-brush of the hundreds selector (Fig. 9). CR14 (Fig. 6o) energizes ER (Fig. 6i) which removes ground from the *t* wire after the second test is complete.

*Tube circuits No. 1 and No. 2 test simultaneously in the "tens" and units positions*

ER places over its bottom front contact battery on one side of LR (Fig. 6g) the other side of which is connected to a front contact of TBR (Fig. 6c). When the *a* wire of the fundamental circuit is closed in the "tens" and units positions of the final, TAR (Fig. 6c) operates and energizes TBR. LR (Fig. 6g) operates and during hunting connects the selector side of tube circuit No. 1 (Fig. 6d) to the selector side of tube circuit No. 2. LR disconnects the marked side of tube circuit No. 2 from cascade relay CCR1 (Fig. 6j) and in place thereof connects it to the armature of CR16 which may select potential PN16 or PN17, the potentials assigned for non-existing units and "tens" digits (Fig. 6X).

Tube circuit No. 1 fires when the proper "tens" or units is found but if a non-existing "tens" or units is keyed, tube circuit No. 2 fires and in either case the fundamental circuit is opened and LR releases and restores the two tube circuits to normal.

When TVR1 operates, it energizes TDR (Fig. 6f) over a front contact of LR (Fig. 6g). When TVR2 (Fig. 6d) operates, it energizes LR1 (Fig. 6g) which energizes TDR (Fig. 6f). In either case, TDR releases TBR (Fig. 6c) which de-ionizes GV1 (Fig. 6d) or GV2 and releases LR.

*Final selector and its bank*

The final selectors have eight brushes without brush spreaders, whereas the group selectors have eight brushes which are converted by brush spreaders into four-brush selectors. In the final selector the choice between one or another set of brushes and thus the odd or even rows of terminals with which they cooperate is controlled by a relay TR. The relay normally connects the odd row of brushes to the circuit and when operated connects the even rows of brushes and disconnects the odd. This is done so as to reduce the selection time of the normally most distant "tens." In effect, the number of "tens" position selections is reduced from ten to five and the average hunt reduced accordingly. Referring to the final selector bank chart (Fig. 10a), it will be seen that lines 0 to 49 occupy the odd terminals and lines 50 to 99 the even terminals. Since the most desirable numbers, particularly for P. B. X's, end in 00, 1 in the odd row is paired with 0 in the even row in the first "tens" position, 2 with 9 in the second "tens" position, 3 with 8 in the third "tens" position, 4 with 7 in the fourth "tens" position, and 5 with 6 in the fifth "tens" position. Each position appears immediately preceding its corresponding twin group of ten lines.

*Final selector selects "tens"*

When any digit 6 to 0 is keyed and the corresponding XR-relays in the register are energized, ground is placed on the *b* wire at the commencement of selection by MR (Fig. 6i). MR operates over a circuit from ground, back TBR (Fig. 6o), front of the corresponding XR-relay or relays (Fig. 6u), back CR16 (Fig. 6o), front ER (Fig. 6i), winding MR to battery. MR closes a circuit from ground over its left front, front AR (Fig. 6), back JR, terminal G, and thence the *b* wire of the final selector (Fig. 10), front BR, ONC1, winding TR to battery. TR locks up to the C-brush of the hundreds selector.

The next numerical digit is 0 and relays XR0 (Fig. 6u), XR1 and XBR6 of the sixth group of digit storing relays are energized. XBR6 places ground on the *a* wire and energizes AR (Fig. 1D) and P, the circuit at the final selector being over front BR, back CR, winding AR, winding P to battery.

When the selector moves out of its home position, ONC1 and ONC3 open and ONC2, 4 and 5 close. ONC1 disconnects TR from the *b* wire.

TAR (Fig. 6c) energizes TBR which releases MR (Fig. 6i) whereupon ground is removed from the *b* wire. The final selector hunts over the even row of terminals in search of the "tens" terminal group connected to potential PN11 (Fig. 6X). This potential appears on the thousands terminals of the first "tens" group (Fig. 10a), on which the final selector comes to rest. GV1 (Fig. 6d) fires and energizes TVR1 which energizes TDR (Fig. 6f) which, in turn, releases TBR (Fig. 6c) and energizes CR15 (Fig. 6o). TBR (Fig. 6c) releases TVR1 (Fig. 6d), whereupon CR16 (Fig. 6o) locks up in series with CR15.

Since the "tens" positions are common, the selected T-terminals in the final are not made busy. As previously stated, ER removed ground from the *t* wire after the hundreds selection. Two or more F-selectors may, therefore, come to rest on the same T-terminal without interference. There is no second test in the "tens" position.

When CR16 (Fig. 6o) operates, it opens the circuit of MR (Fig. 6i) so that this relay will not be again energized when the units selection is made.

*Final selector makes units selection (first test)*

The last numerical or the units digit is also 0. When this digit is keyed, relays XR0 (Fig. 6*w*), XR1 and XBR7 of the seventh group of digit storing relays are energized. PN0 is placed on the marked side of tube circuit No. 1 (Fig. 6*d*), the selector side of both tube circuits is connected to the *b* wire by LR (Fig. 6*g*) and ground is placed on the *a* wire over front XBR7 (Fig. 6*w*) and front CR16 (Fig. 6*o*).

The final selector (Fig. 10) is operated for the second time over substantially the same circuit and hunts for the subscriber's line in the group of ten terminals following the "tens" position having potential PN0 on the T-terminal (Figs. 2, 2*a*, 10, 10*a*). When the final selector reaches this line, whether free, busy or out of service, GV1 (Fig. 6*d*) fires and energizes TVR1 which opens the *a* wire circuit and thus causes the final selector to come to rest on the terminals of the called line.

Should the called number be a P. B. X, the same PN-potential will appear on all trunks (Fig. 2*a*). As the trunks are picked up, the potential is removed except from the last trunk so that when all trunks are busy the F-selector hunts to the last trunk and stops on that trunk.

Party lines (Fig. 2*b*) are selected in the same manner as main lines.

*Register arranged to make second test on both a and b wires*

When TVR1 (Fig. 6*d*) operates, it energizes TDR (Fig. 6*f*), holds CCR1 (Fig. 6*j*) and releases TAR (Fig. 6*c*). TDR (Fig. 6*f*) releases TBR (Fig. 6*c*) which a little later de-ionizes GV1 (Fig. 6*d*) and releases TVR1 and LR (Fig. 6*g*). TDR (Fig. 6*f*) in the meantime energizes CR17 (Fig. 6*o*) in the usual way and when TVR1 (Fig. 6*d*) breaks its front contact, CR18 (Fig. 6*o*) locks up in series with CR17 and TDR (Fig. 6*f*) releases. CR18 energizes TFR (Fig. 6*g*). Since cascade relays (Fig. 6*j*) CCR1 to CCR3 are still on their front contacts, the operation of TFR (Fig. 6*g*) does the following:

*a*. Operates cacade relays (Fig. 6*j*) CCR4 to CCR9 inclusive.

*b*. Transfers the *a* wire from connection with TAR (Fig. 6*c*) to the selector side of tube circuit No. 1 (Fig. 6*d*).

*c*. Disconnects the marked side of tube circuit No. 1 from its normal connection with the counting relay CR1 (Fig. 6*o*) to connection with cascade relays CCR7 to CCR9 (Fig. 6*j*).

*d*. Disconnects the front contact of TVR2 (Fig. 6*d*) from TDR (Fig. 6*f*) and connects it to TGR (Fig. 6*j*).

*e*. High tension battery is again placed on both tube circuits by HTBR (Fig. 6*g*) which is energized over a circuit from ground, backs TGR (Fig. 6*j*) and THR, fronts CCR6 and CCR9. HTBR (Fig. 6*g*) operates OR1 which locks up to ground.

The *a* wire is now associated with tube circuit No. 1 (Fig. 6*d*) and cascade relays (Fig. 6*j*) CCR7 to CCR9, and the *b* wire with tube circuit No. 2 (Fig. 6*d*) and cascade relays (Fig. 6*j*) CCR4 to CCR6.

*Line condition signalled to register*

The potential found on the A or B-terminals or received from the *b* wire when the register makes the second test of the called line indicates the condition of the line, whether free, busy or out of service, and in the case of a party line which one, if any, of the stations is disconnected. The various potentials and their location are given in the following table:

| Condition Represented | On A-Terminal | On B-Terminal | On *b* Wire |
|---|---|---|---|
| Line Busy | | | PS13 |
| Main Line Free | | PS12 | |
| Main Line Disconnected or Out of Service | | Open | |
| P. L. Stations A and D Connected | PS5 | | |
| P. L. Stations G and K Connected | | PS5 | |
| P. L. Stations A Connected, not D | PS6 | | |
| P. L. Stations D Connected, not A | PS7 | | |
| P. L. Stations G Connected, not K | | PS6 | |
| P. L. Stations K Connected, not G | | PS7 | |
| P. L. Stations A and D Disconnected | Open | | |
| P. L. Stations G and K Disconnected | | Open | |

*Register signals line condition to register link*

Better to understand how the register controls the register link (Fig. 4) and the line finder-group selector link (Fig. 5) over the terminals of the register link finder, reference should be made to the following:

*a*. To release register link and register, open C-terminal. Ringing condition on a trunked call.

*b*. To break down a connection to and including the first group selector but leaving register connected, −48 volts is placed on the E-terminal to operate ER (Fig. 5).

*c*. With full ground on the C-terminal, to operate CR1 (Fig. 4) which releases ER (Fig. 4).

1. Busy −48 volts on E-terminal to operate OR (Fig. 4) and ER (Fig. 5) register link held. Register released.

2. Trunk call—positive battery on E-terminal to operate FR (Fig. 5).

3. Ring on local call (line free)—ground on D-terminal (*t* wire) to operate DR (Fig. 10) and COR (Figs. 2, 2*a*, 2*b*) register link held.

| P. L. Station | G-Terminal | F-Terminal | A-Terminal |
|---|---|---|---|
| A 33 cycle | GRD | | |
| D 50 cycle | GRD | GRD | |
| G 66 cycle | GRD | | GRD. |
| K 16 cycle | GRD | GRD | GRD. |
| Operated in Fig. 4 | (NR1 and NR2). | (MR) | (LR). |

NR1 operates BR and AR.

Register releases.

Main line treated as station A so far as ringing is concerned.

*Register makes second test—main or P. B. X line free (Fig. 2 or 2a)*

When the *a* wire is opened, AR (Fig. 6) falls away and the circuit of the C-brush of the final selector is closed from ground right-hand outer, back contact of AR (Fig. 9) of the hundreds selector, brush C, back AR (Fig. 10) of the final selector, high and low resistance windings of CR, back DR, front TR (since the selector is on the even terminals), terminal C of the line circuit (Figs. 2 or 2*a*), winding COR to battery. CR (Fig. 10) operates but not COR (Fig. 2). CR (Fig. 10) shunts its high resistance winding by its low resistance winding, thus making the line busy to a second hunting final selector but COR (Fig. 2) does not operate. When CR closes its front contacts, it places potential PS12 on the *b* wire, circuit from PS12 (Figs. 2 or 2*a*), back LR, back COR, *b* wire, the final selector (Fig. 10) and the reset of the connection to the grid of V4 of tube circuit No. 2 of the register (Fig. 6*d*).

When TDR (Fig. 6*f*) breaks its front contact, which it does when TVR1 (Fig. 6d) breaks its front contact, the holding circuit of cascade relay CCR1 (Fig. 6j) is opened and in due course this relay makes its back contact, thus placing potential PS12 on the marked side of tube circuit No. 2, circuit from PS12, back BR (Fig. 6g), front CCR2 (Fig. 6j) back CCR1, back LR (Fig. 6g), back BR1 (Fig. 6d) to the grid of V3. Since PS12 is now on the grid of V4, GV2 fires and energizes TVR2 which energizes TDR (Fig. 6f) and holds CCR2 (Fig. 6j) energized. TDR (Fig. 6f) energizes RAR, circuit from ground, front TDR, back CCR1 (Fig. 6j), front CCR2, front DR (Fig. 6i), front ER, one winding of RAR (Fig. 6m) to battery. RAR operates and grounds the C, D and G-terminals (Fig. 6) of the register link to meet the requirements above outlined for a free main line. When HTBR releases it removes high tension battery from the tube circuits, GV2 (Fig. 6d) de-ionizes and deenergizes TVR2.

*Main or last P. B. X trunk or party line busy*

When the final selector stops on a busy line of any kind, CR (Fig. 10) does not operate due to the shunting effect of the low resistance winding of CR of the final selector of the already established connection. Potential PN13 is placed on the b wire, over ONC4, resistor rt3, back CR, back AR to the b wire and thence to the grid of V4 of tube circuit No. 2 (Fig. 6d). In due course, CCR1 (Fig. 6j) and CCR2 make their back contacts, whereupon PS13 is placed on the marked side of tube circuit No. 2, circuit from PS13, front DR (Fig. 6i), front CCR3 (Fig. 6j), back CCR2, back CCR1, back LR (Fig. 6g), back BR1 (Fig. 6d) to tube circuit No. 2. GV2 fires and energizes TVR2 which energizes TDR (Fig. 6f) and holds CCR3 (Fig. 6j). TDR (Fig. 6f) energizes TCR (Fig. 6i) over a front contact of CCR3, front DR and front ER. TCR grounds the C-terminal and places —48 volts on the E-terminal of the register link finder, thus meeting the busy requirements.

When ER (Fig. 5) breaks its back contact, it removes ground from wire c2 to the first group selector, thereby releasing BR (Fig. 8) which releases the connection to the final selector. Thus on a busy call only the line finder-group selector link and register link remain connected to the calling line.

When ground is placed on the C-terminal (Fig. 6), CR1 (Fig. 4) operates in multiple with CR and locks up to the C-brush until released by the register. When CR1 makes its front contacts, OR operates and energizes AR and BR. AR bridges GR across the calling line. GR energizes HR which locks up AR and BR over the back contact of RRR. OR opens the circuit of the F and G-brushes so that the called side of the connection is kept clear. BR and OR connect the primary winding of transformer TT to the common busy tone transformer BTT. Thus the calling subscriber receives the busy tone. The register is released as described below.

When the calling subscriber hangs up, GR releases HR and HR releases AR and BR. AR removes ground from the c wire and releases DR (Fig. 5) of the line finder-group selector link. Since the calling line is open, S1R releases RR which releases MR and removes ground from wire c2 to the line finder and first group selector. The group selector has already been restored to normal and the line finder is now returned to its home position. The calling line cut-off relay is de-energized when RR breaks its front contacts. The call is not metered.

*Register tests a free party line*

When the final selector stops on the terminals of a free party line, cascade relays CCR1, CCR2 and CCR3 (Fig. 6j) fall away, after which the two groups of cascade relays CCR7, 8 and 9 and CCR4, 5 and 6 commence to fall off and in so doing apply in sequence to tube circuits No. 1 and No. 2 (Fig. 6d) respectively potentials PS5, PS6 and PS7.

The potentials on the a wire represent stations A and D (Fig. 2b) and the potentials on the b wire stations G and K. For example, assume that stations A, D and K are connected but not station G. Potential PS5 is applied to terminal 4 and thus to the a wire, and PS6 to the terminal 2 and thus to the b wire. GV1 (Fig. 6d) fires the instant CR (Fig. 10) makes its front contact and connects the A-brush to the A-terminal since CCR7 (Fig. 6j) is energized and thus places PS5 on tube circuit No. 1 (Fig. 6d). GV2 fires as soon as cascade relays CCR1 to CCR4, inclusive, make their back contacts and connect PS7 to tube circuit No. 2 over the front contact of CCR6.

When TVR1 makes its front contact, it locks up CCR6 in series with CCR7. When TVR2 makes its front contact, it locks up CCR5 in series with TGR. These locking circuits are not broken until the register is released. THR places battery on the windings of RAR (Fig. 6m) and RDR over front contact of CCR7. TGR (Fig. 6j) places battery on the winding of RKR (Fig. 6m) over front contact of CCR6.

None of the relays RAR, RDR, RGR or RKR operates before the calling subscriber keys the ringing digit. HTBR (Fig. 6j) falls away and deionizes GV1 or GV2, depending whether one or both are ionized, when its circuit is opened at back contacts of TGR and THR (Fig. 6j). In case of an "out of service" station or line, not considered here, one or neither of these relays operates, in which event HTBR is released when the last cascade relays CCR6 and CCR9 of each string break their front contacts.

*Called line cut-off relay operated*

The called line cut-off COR (Figs. 2, 2a or 2b) is energized only after the completion of the second test and when the called line is found free. This is accomplished by momentarily grounding the D-terminal (t wire) of the register link. In the case of a free main line, this is done by RAR (Fig. 6m). In the case of a free party line, this is done by the energization of TGR and/or THR (Fig. 6j). The ground may be traced from front RAR, TGR or THR, as the case may be, D-terminal, front ER or CR1 (Fig. 4), D-terminal of line finder-group selector link (Fig. 5) to the t wire, then in series through back AR and thousands brushes of first, second, T and hundreds selectors to ONC5 (Fig. 10) of the final selector, back and one winding of DR to battery. DR operates, disconnects itself from the t wire and locks up over its low resistance winding in series with the winding of COR (Figs. 2, 2a or 2b), circuit from ground, brush C of the hundreds selector, wire c, back AR (Fig. 10), second winding of DR, front DR, front TR, winding COR (Figs. 2, 2a or 2b) to battery. At the same time, DR (Fig. 10) disconnects CR from the C-brush but before doing so, connects CR to battery through a resistor R. The purpose of the latter is to reduce current drain.

With the current thus increased in the c wire, COR (Figs. 2 or 2a) operates and disconnects the line relay LR and ground from the b and a wires, respectively, and the PS-potentials from the B-terminal or the A and B-terminals in the case of a party line, and in place thereof connects the line circuit through to the final selector A and B-terminals. With DR (Fig. 10) energized and the register disconnected, as explained later, the *t* wire extends from the T-terminal of the calling line through to the T-terminal of the final selector and becomes available for identification or metering purposes.

*Station keys party line ringing digit*

Party lines, as shown in Fig. 2*b*, are operated on a terminal per line basis, the same as main lines. A party line has but one number and each station has the same line number plus a station suffix which we have assumed is A, D, G or K corresponding to digits 2, 3, 4 and 5. When the subscriber keys the ringing digit, the digit counting relays (Fig. 6*b*) operate in the usual way. For example, assume that the subscriber keys the digit K. Relays KCR1 (Fig. 6*b*) and KCR2 to KCR5 inclusive operate and also XAR8 (Fig. 6*n*) which connects the four ringing selection relays (Fig. 6*m*), RAR, RDR, RGR, and RKR to the back contacts of KCR3, KCR4 and KCR5 (Fig. 6*b*) and the front contact of KCR5 respectively. XAR8 (Fig. 6*n*) also locks up the digit counting relays over back KDR (Fig. 6*a*) so that they do not release in the usual way at the end of keying.

As already explained, the register takes note of the stations connected to the party line and places battery on one side of the windings of the corresponding ringing selection relays (Fig. 6*m*). When, for example, station K is keyed, a circuit is established from ground, front XAR8 (Fig. 6*n*), back KDR (Fig. 6*a*), which releases very shortly after keying, front KCR1 (Fig. 6*b*), back DER, in series through front contacts of KCR2 to KCR5 inclusive, back DFR, front XAR8 (Fig. 6*n*), winding RKR (Fig. 6*m*), front CCR6 (Fig. 6*j*), back CCR5, front TGR to battery. RKR (Fig. 6*m*) operates and grounds the A, C, G and F terminals (Fig. 6) of the register link, thus meeting the ringing condition for station K.

*Register released*

The register is held as long as R1R (Fig. 6) remains energized. On a keyed call, this relay is held by KAR (Fig. 6*a*) and on a dialed call by DBR which are held energized during keying or dialing and as long as the calling line loop is closed. The opening of the line circuit any time during selection will, therefore, release the partially completed connection.

When the second test of the called subscriber's line is completed then, whether the line is free or busy, full ground potential is placed in the register on the C-terminal of the register link, energizing CR1 (Fig. 4). This relay locks up temporarily to the C-terminal, opens the circuit of ER which releases, but CR1 arranges the register link to receive pulses from the register over the A, D, E, F and G brushes. ER opens the *b* wire circuit to the register, thereby releasing KAR (Fig. 6*a*) on a keyed connection or DAR on a dialed connection. These relays either have their *a* winding opened by ER (Fig. 4) or short-circuited when ground is applied to the *a* wire by RGR or RKR (Fig. 6*m*). Shortly after this, R1R (Fig. 6) opens the circuit of the general release relay R2R. When R2R breaks its front contacts, all locked up relays are released and the register is restored to normal.

*Called subscriber rung*

As previously explained, the C, D and G terminals of the register link are always grounded when a free main line is found. These terminals are also grounded when station A of a free party line is called and found connected.

Full ground on the C-terminal energizes the marginal relay CR1 (Fig. 4). This relay opens the circuit of ER which releases but CR1 remains locked up over the C-brush until it is released by the register.

Ground on the G-terminal energizes NR1 and NR2 over a front contact of CR1. NR1 energizes AR and BR in series. AR bridges GR across the calling line. GR operates and energizes slow releasing relay HR which locks up AR and BR, circuit from ground, front HR, back RRR, front BR, winding BR and AR to battery. BR connects ground to brush G and the *a* wire over a back contact of OR. It also connects brush F and the *b* wire to the tripping relay RRR over another front contact. AR grounds the C-brush of the line-finder-group selector link finder and holds DR (Fig. 5) energized. BR (Fig. 4) connects the ringing tone from common transformer RRT to the primary winding of tone transformer TT, the secondary of which is bridged by AR across the calling line through condenser C1. The calling subscriber hears the ringing tone.

When the register releases and removes ground from the C-brush, CR1 and CR release and the circuits of all brushes of the register finder are opened. Although the register link brushes remain on the register terminals, this does not interfere with the register when the latter takes up a new call.

The character of the ringing current supplied to the tripping relay RRR depends upon the grounding or non-grounding of terminals A and F. If neither terminal is grounded, 33 cycle current is momentarily applied to the *b* wire over front NR1, back MR and LR, one winding of RRR, back OR, front BR, the F-brush to the *b* wire. Shortly after this initial ring, CR1 releases and opens the circuit of NR1 and NR2, whereupon the 33 cycle current continues to the *b* wire, but this time over interrupter INT1.

*Called subscriber answers*

When the called subscriber answers, RRR (Fig. 4) operates and opens the locking circuit of AR and BR. BR disconnects ringing current from the called line and AR the bridged relay GR from the calling line. When AR breaks its front contact, it removes ground from the C-terminal of the line finder-group selector link which releases DR (Fig. 5). DR completes the speech transmission circuit from the calling line to the called line. Speech current for the calling line is supplied by relay S1R and for the called line by S2R over back contact of FR. S1R holds slow release relay RR of the line finder-group selector link energized.

*Call metered*

When S2R (Fig. 5) makes its left hand front contact it short-circuits MR, and applies over its right hand front contact position 110 v. metering battery to the *t* wire. The first circuit may be traced from ground, front S2R, front MR to the junction between one side of MR and resistor R which is connected to battery. As the other side of the winding of MR is connected to ground over fronts RR, MR is short-circuited and starts to release. It is, however, slow enough to close momentarily a circuit from positive metering battery, front S2R, front MR, *t* wire, back AR of line finder (Fig. 7), front BR, brush T of line finder, T-terminal of line circuit (Figs. 2, 2*a* or 2b), winding high resistance service meter to ground. The service meter operates once. When MR (Fig. 5) breaks its front contacts, the metering circuit is opened and also the locking circuit of MR through resistor R to battery. MR cannot now be re-energized so that the call may be metered in the above-described manner only once. For multiple metering additional metering pulses are supplied by the out-trunk circuit.

*Identification rectifier connected*

When DR (Fig. 5) makes its back contacts, it connects rectifier S and resistor R2 of the line finder (Fig. 7) to the *t* wire over wire *d*. The rectifier and resistor are connected to the common identification starting relay GSR. This circuit is not involved in local connections but is used by a toll operator or automatic ticketer to identify the number or character of the calling line. This is explained elsewhere. The rectifier is polarized for current from a negative battery.

*Calling subscriber hangs up*

When the calling subscriber hangs up, S1R (Fig. 5) falls away and releases RR. RR removes ground from wires *c*1 and *c*2 toward the line finder and releases BR (Fig. 7). BR, over its back contact, energizes AR and P and the line finder returns to its home position with its A, B, C and T-brush circuits opened. When the finder reaches its home position, ONC2 opens, AR and P release and the finder comes to rest.

*Called subscriber hangs up after calling subscriber*

When the calling subscriber hangs up first, as is usually the case, the connection to the called subscriber is not broken until the called subscriber hangs up or until the timed alarm operates. Wire *c*2 toward the first group selector remains grounded, circuit from ground, TAI (Fig. 5), back RR, front S2R, back ER, wire *c*2, front BR (Fig. 8), winding BR to battery. RR makes its back contact before breaking its front contact. When the called subscriber hangs up, S2R falls away and releases the first group selector whereupon, one after the other the second group selector, the thousands selector, the hundreds selector, the final selector and the cut-off relay of the called line release.

*Called subscriber fails to hang up*

Should the called subscriber fail to hang up within ten seconds, or other predetermined time, the timed alarm TAI (Fig. 5), in series with the back contact of RR, opens its circuit to ground and releases BR (Fig. 8) which releases the first group selector and the connection to the called line. The called line now becomes a calling line and selects a register in the usual way. If the called subscriber fails to clear the line within another thirty seconds or so, the call is automatically sent to the wire chief by the register as a false call, as explained below.

*Calling subscriber fails to hang up*

Should the calling subscriber fail to hang up after the called subscriber has hung up, the connection is temporarily held over the timed alarm. After the predetermined lapse of time, say ten seconds or so, the holding circuit is broken. The holding circuit may be traced from ground, TAI (Fig. 5), front RR, back S2R, front RR to wire *c*2 of first line finder. The line finder releases and the calling subscriber now originates another call, and if he fails to hang up in due course, the call is automatically sent to the wire chief.

ELECTRONIC BUSY ON SECOND TEST

A selector, for example, a second group selector, is made busy after the first test when relay AR (Fig. 9) makes its back contact and grounds the *t* wire. The second test is made when the test potential is removed from the *b* wire by the operation of the BR-relay. In the modification of the register shown in Fig. 6*bb*, the busy guard following the second test is established the instant the gas tube (in this case GV2), fires, i. e. within approximately ten microseconds after the test circuit is closed.

In this modified circuit (Fig. 6*bb*), one electrode of GV2 is normally connected in multiple to the selector side of tube circuit No. 2 at the grid of V4 over back BR1 and back LR. This connection is satisfactory for a test made while the selector is stationary. For a high speed stopping test it is preferable that the electrode of GV2 be connected directly to ground, as shown in the normal register (Fig. 6*d*). The only time tube circuit No. 2 is used to stop a finder or selector is when the finder hunts for the calling line and when the final selector selects the "tens" and units. In the first case BR1 (Fig. 6*d*) is energized and in the second case LR (Fig. 6*g*) is energized. In the modification (Fig. 6*bb*), when either of these relays is energized a ground is placed on the electrode of GV2, thus restoring the circuit to the high speed stopping condition.

The selector tests for the PN-potential corresponding to that placed on the marked side of the tube circuit, and when this is found, GV2 fires. The operating circuit of relay TVR2 (Fig. 6*bb*) is not direct to ground over GV2 as in Fig. 6*d*, but through the selector to the source of PN-potential and ground. The circuit may be traced from high tension battery HTB, resistance R, front TBR, back RSR1, a resistance, winding TVR2, main gap of tube GV2, back BR1, back LR, back TAR, *b* wire, through register link, line finder-group selector link, first group selector, back BR (Fig. 9), test resistor *rt*2, ONC3, PN-battery to ground. Tht flow of current through *rt*2 instantly changes the normal PN-potential on the B-terminal side of *rt*2 so that a second test made more than, say, 100 microseconds later will fail and a double connection will be prevented.

MODIFICATION OF REGISTER CIRCUIT FOR SINGLE-TUBE TESTING OF CALLING LINE

The register circuit (Fig. 6) previously described tests the calling line (Fig. 2) over the T-terminal with one tube circuit (Fig. 6*d*) to determine whether it is restricted or unrestricted and then over the B-terminal with a second tube circuit to determine whether the calling line is equipped with a dial, a key set or a partly line key set.

However, all identifying potentials may be placed on the T-terminal. A typical assignment of potentials could be as follows:

PC1 (−4 volts), unrestricted line with dial.
PC2 (−6 volts), unrestricted line with key set.
PC3 (−8 volts), unrestricted party line with key set.

PC4 (−10 volts), restricted line with dial.

PC5 (−12 volts), restricted line with key set.

PC6 (−14 volts), restricted party line with key set.

OPERATION

*First test (broad band)*

Since the line finder must stop instantly when a calling line is tested and since the calling line may have, within the present limits, any one of nine potentials, it is obvious that the test circuit must operate as soon as any calling PC-potential is found, but not on any higher potential such as is used for identification (see Fig. 6*x*) or on positive metering battery. This is shown in Fig. 6*ee* which is a modification of the A-register, only so much being illustrated as is necessary for explaining the novel features of the invention.

The modified circuit employs only one triode V1, of a pair. The grid of V1 is connected to PN9, over back cascade relay CCR (*n*), through as many cascade relays as are required in the group, and back AAR. The cathode of V1 is connected to line finder brush SB and is normally open, except for a 50,000 ohm R4A connection to −48 volts. Triode V2 is not used in the first test.

When the line finder hunts for the calling line, the *a* wire circuit is closed to ground over back TVR and high tension battery is placed on the tube circuit and TVR, all as in the Fig. 6*d*. Since the cathode of V1 is connected to −48 volts through R4A, it is negative with respect to the grid which is connected to PN9, i. e. −22 volts. Thus current flows through resistor R3 and GV cannot fire.

The calling line (Fig. 2) places a PC-potential on the T-terminal having a value corresponding to the character of the line. When line finder brush SB makes contact with the terminal connected to any of these potentials, it instantly applies to the cathode of V1 either positive potential or the same potential as exists on the grid since the highest PC-potential is −22 volts, the same as the PN9− potential normally on the grid. The current through R3 is, therefore, reduced and GV fires to operate TVR which causes the line finder to come to rest on the terminals of the calling line.

Should SB test a terminal having an identification or some other potential higher than PN9, −22 volts, than the cathode becomes negative with respect to the grid and GV does not fire.

When GV operates, TVR energizes TVR2, which makes its three front contacts before it opens its single back contact. Over one front contact TVR2 energizes cascade relay CCR1 which causes the string of cascade relays to operate in the usual way. Over another front contact it locks up over back ABR, and over the third front contact, it energizes AAR over another back contact of ABR.

When TVR2 opens its back contact, it removes high tension battery from GV and TVR which de-ionizes the former and releases the latter. When TVR breaks its front contact, ABR locks up in series with AAR, thereby releasing TVR2 which breaks its front contacts and makes its back contact.

It will be noted that when TVR2 operates for the second time, the shunt around it is open at a back contact of ABR which is locked up in series with AAR. ABR controls the release of the casade relays and whether one, two or more fall off will depend upon the potential applied to the selector side of the tube circuit. In the present case we assume that the potential is PC1 and that GV fires when TVR2 makes its back contact, which it does before slow acting cascade relay CCR1 has time to break its front contacts.

The operation of the cascade relays is in principle the same as in Fig. 6*d* in which TDR operates in series with CCR1. The circuit may be traced from ground, front TVR2, back BR1, back LR, back TFR, winding TDR, front CCR1, winding CCR1 to battery.

*Second test (narrow band)*

AAR connects V1 and V2 in the same way as in Fig. 6*d*. The grid of V2 and the cathode of V1 are connected to SB, and the grid of V1 and the cathode of V2 to the cascade relays.

When TVR2 places high tension battery on GV for the second time, the tube circuits make the second test. Should, for example, the calling line potential be PC1, V1 will find this potential on a front contact of CCR1. Thus GV will fire for the second time and TVR will energize TDR and hold CCR1. TDR will adapt the register circuit in the usual way for an unrestricted line with a key set, as described in connection with the corresponding relay in Fig. 6*f*.

Should the calling line have some other potential on the T-terminal, for example, PC2, GV will fire only after CCR1 has made its back contact, allowing PC2 to be placed on the grid of V1 over front CCR2 and back CCR1. It will be noted that the cascade relays commence to release the instant ABR breaks its back contact.

MODIFICATION OF REGISTER CIRCUIT FOR FOUR-PARTY RINGING, TERMINAL PER STATION

In terminal per line operation, the calling party must dial an extra digit to select the proper ringing current and the line and register circuits must cooperate to indicate whether or not the called line is connected and if so, whether the wanted station is also connected. This is accomplished by using different potentials on the B-terminal, as shown in the line circuit of Fig. 2*b*.

With terminal per station operation, the switching capacity of a 10,000-line unit is obviously reduced but all stations, both main and party, have the same number of digits. As each party station has its own terminal in the final, the distinguishing T and B-potentials, in any order, may be connected directly to each terminal and the terminals may be located anywhere in the 10,000-line unit.

*Line circuit*

The line circuit for terminal per station operation is shown in Fig. 2*c*. The four stations, if on different lines, are jumpered at the main distributing frame. There is but one line and cut-off relay per line and one set of terminals in the line finder bank. The calling station is identified, when equipped with a key set, in the same manner as previously explained.

For the sake of flexibility, an intermediate distributing frame I. D. F. should be used. Any four final terminals may be cross-connected on this frame to the single set of finder terminals. The *a* and *c* wires are common to all stations. The four B-terminals are wired to four changeover contacts on the cut-off relay and each has its distinguishing PS-potential. The four T-terminals have their distinguishing PN-potentials which agree with the numerical position of the terminal in the final bank. The identification of the line when calling will be made exclusively the T-terminal. This leaves the B-terminal free for exclusive use in the final. The assignment of PS-potentials to the B-terminals of the four stations are as follows:

PS2, station A
PS3, station D
PS4, station G
PS5, station K

The party line circuit may, of course, be used as a main line, in which case potential PS2 would be used since this potential selects current used for ringing on main lines.

*Operation*

The party line is selected by the final and the first test made exactly as previously described. The second test in this case may now be made exclusively over the B-terminal, although the A-terminal could also be used if necessary. Immediately after the first test is made, TAR of the register circuit (Fig. 6*c*) cuts in tube circuit No. 2 and releases the cascade relays, all in the usual way. For the sake of simplicity, the cascade relays may be connected as shown in Fig. 6*ff*.

Should the call be for station A, potential PS2 will be on the grid of V3 when the second test commences. Since the same potential will be found on the B-terminal, GV2 fires and energizes TVR2 which operates TDR and holds CCR1 energized. TBR operates RAR.

Should the call be for station G, potential PS4 will be found on the B-terminal and TVR2 will fire only when CCR2 makes its back contact. TVR2 energizes TDR which holds CCR3 energized. TBR operates RGR.

*Called line rung*

RAR, RDR, RGR and RKR correspond to the relays similarly labelled in the register circuit (Fig. 6*m*). When RAR operates, station A or a main line is rung. When RDR is operated, station D is rung, etc., all as previously described.

*Flexibility*

An examination of Fig. 2*c* will indicate the extreme flexibility of the circuit. For instance,

*a*. By removing the PN-potential from the T-terminal, calls for that station may be automatically sent to the intercepting operator.

*b*. Ringing current may be adapted to any station equipment by the connection of the proper PS-potential.

*c*. Any four terminals in the entire 10,000-line unit may be cross-connected to form one four-party line.

*d*. Any line finder terminal may be used for a main line with dial or key set, restricted or unrestricted, or for a party line, restricted or unrestricted, by merely changing the PC-potential on the T-terminal.

ALTERNATIVE ARRANGEMENT OF DIGIT STORING RELAYS

A preferred and simplified arrangement of the digit storing relays is shown in Fig. 6*z*. The XAR-relay (Fig. 6*c*) is omitted and the total number of relays per group reduced from eight to seven.

The operation remains substantially the same. For example, when digit 2 is keyed, XR0 operates first and then XR2 and when KDR (Fig. 6*a*) falls away at the end of keying and releases KCR1— (Fig. 6*b*), both these relays lock up in series with XBR1 (Fig. 6*z*) which transfers the connection from the digit counting relays to the next group of digit storing relays.

When an odd digit such as 3 is keyed, XR0 is not energized. XR3 will lock up in series with XBR1 the instant KDR (Fig. 6*a*) breaks its front contact.

ALTERNATIVE REGISTER KEYING CIRCUIT

In keying a number to the register of Fig. 6, the line circuit must be momentarily opened at the commencement of each digit, and a separate keying tone must be used. In the alternative arrangement of Fig. 6*aa*, the line circuit need not be opened before the keying of each digit and the 400 cycle A. C. used in operating the pulsing relays produces the keying tone which is heard when the register is selected and also between key pulses.

The register release relay R1R is initially operated when BR is energized. When BR is released after identifying the calling line, AR is energized and the key pulsing circuit is connected to the calling line.

The key pulsing relays KPR+ and KPR— have relatively high resistance windings whereby 400 cycle A. C. may be connected through the telephone circuit to give the keying tone the proper volume. These pulsing relays do not break their back contacts when the 400 cycle current passes through them and when no rectifier is in the circuit. KPR does not, therefore, operate and KAR1 remains bridged cross the calling line over a front contact of AR and a back contact of KBR in series with rectifier S1. Due to the shunting effect of the D. C. loop through the subscriber's set, KAR1 which is wound to a high resistance receives insufficient current to operate and break its back contact. Thus the register release relay R1R is retained energized over a circuit from ground, front AR, back KAR1, winding R1R to battery.

During pulsing, relay KBR operates in the usual way and removes KAR1 from the line circuit so that this relay will not be energized. Between pulses, when KBR makes its back contact the line circuit is closed through the substation and KAR1 remains shunted out.

KAR1 is not involved in the release of a normal connection, since the register releases after the completion of selection. However, should the calling subscriber hang up prematurely, the D. C. line shunt will be removed from KAR1. KAR1 will operate in series with KPR+ and KPR— and rectifier S1, and open its back contact to release R1R. The resistance of KAR1 is such that insufficient current flows through the correspondingly polarized pulsing relay to cause it to break its back contact and energize KBR. Likewise, the high impedance of the ringer in the subscriber's set or sets bridged across the line prevents the current flowing through them from rising to a sufficient value to shunt out KAR1.

CHECKING REGISTER TUBES AFTER EACH CONNECTION

The register circuit may be modified by the addition of three relays TTR1 and 2 and RCOR as shown in Fig. 6*y*, to do the following when the register is released at the end of every partial or completed connection:

*a.* Check both tube circuits for premature operation on maximum non-firing potential.

*b.* Check both tube circuits for failure to operate on minimum firing potential.

*c.* In case either tube circuit fails in (*a*) or (*b*), to signal the fault by lighting a guard lamp and to hold the register busy by preventing the reclosure of the register test circuit to the register R-links.

The register is held busy during a normal connection by slow release relay R1R which energizes R2R and TTR1. When the register is released, R1R breaks its front contact and releases R2R which energizes TTR2, circuit from ground, back R2R, front TTR1, winding TTR2 to battery. R2R releases all the locked up relays in the register circuit. TTR2 locks up to ground over the back contacts of TVR1 and TVR2 in series with back RCOR and release key RLK, and places high tension battery on the tube circuits.

TTR1 is slow releasing so that when TTR2 makes its front contacts, potential PN1 is applied to the grids of V2 and V4 and potential PN2 to the grids of V1 and V3, thus placing the highest non-firing potentials on the two tube circuits. If the tube circuits are in order then neither GV1 nor GV2 will fire.

When TTR1 breaks its front contacts and makes its back contacts potential PN19 is applied to the grids of all four tubes. This being the lowest firing potential, if the tube circuits are in good order, both GV1 and GV2 will fire and TVR1 and TVR2 will operate to release TTR2 which frees the register circuit and restores it to normal.

Should either GV1 or GV2 fire on the maximum non-firing test, TVR1 or TVR2 will operate and energize RCOR, circuit from ground, RLK, back RCOR, front TTR2, front TVR1 or 2, front TTR2, front TTR1, winding RCOR to battery. RCOR locks up to ground, opens the register test wire and lights guard lamp GL. When TTR1 breaks its front contact, TTR2 is released and restores the tube circuits to normal. As long as RCOR is energized, the register can not be picked up for a second call.

Should one or both of the tube circuits fail to fire on the minimum firing test, TVR1 or TVR2 or both will fail to break their back contact and thus TTR2 will not release. When TTR1 makes its back contacts, it closes back contacts *n* before it makes back contact *m*. Thus in normal operation, TTR2 is released when contact *m* is made and RCOR will not operate. However, when TTR2 is not released, RCOR will operate over a circuit from ground, front TTR2, back TTR1, winding RCOR to battery. RCOR locks up and releases TTR2 by removing ground from the armatures of TVR1 and TVR2.

SPECIAL SERVICE CALLS

The special service numbers keyed by the subscribers may have one, two or three digits. Any digits may be used but for the purpose of this description it is assumed that the digit 0 is keyed as a single-digit number to obtain an operator for aid or information. For other special services, ten two-digit numbers from 10 to 19 are used.

The special service calls may be completed in one to five suitable selections but to illustrate the operation of the register, the following arbitrary disposition has been assumed:

| Number Keyed | To Get— | Routing, PN-Potentials Used (Fig. 13c) | |
|---|---|---|---|
| | | Unrestricted | Restricted |
| 0 | Operator | 0.1.1 | 0.1.X. |
| 11 | Toll | 0.2.1 | 0.2.X. |
| 12 | Repair Service | 0.3.1 | 0.3.1 |
| 13 | Commercial Department | 0.3.2 | 0.3.2 |
| 14 | Wire Chief | 0.3.3 | 0.3.3 |
| 15 | Police | 0.3.4 | 0.3.4 |
| 16 | Fire | 0.3.5 | 0.3.5 |
| 17 | Spare | | |
| 18 | Spare | | |
| 19 | Telegraph | 0.2.2 | 0.2.2 |
| 10 | Reverting | 0.7 | 0.7 |

When an unrestricted subscriber keys or dials the digit 0, the call is routed to trunk group 1 from a third group selector. When a restricted subscriber keys or dials 0, the call is routed through the same third group selector but to another group of trunks (group X) having potential PNX (Fig. 6X). PNX is a potential which cannot be keyed or dialed by a station. Thus an unrestricted station cannot come in on a restricted trunk. The same distinction is made between calls from restricted and unrestricted stations to toll. The actual assignment of the special service numbers and the distinction between restricted and unrestricted lines for a specific exchange is, of course, made to meet local requirements. More or fewer numbers may be used and the number of selections used to complete any call may be from one to five.

CALLS AUTOMATICALLY SENT TO THE INTERCEPTING OPERATOR OR WIRE CHIEF

All unsuccessful calls are automatically sent to an intercepting operator who may be located in the same or distant office. This applies to trunked calls as well as to local calls. On trunked calls, the connection of the distant office is broken down so that all intercepted calls are established anew automatically by the register from the first group selectors. Calls may be extended in one, two, three, four or five selections, but for the purpose of illustration we will assume that such calls will be extended to number O13 (columns 15, 44, 50, 57 and 65, finder C, Fig. 13*c*). To take care of disconnected lines or party line stations, it is merely necessary to change potentials at the line circuit. The intercepted calls are:

*a.* Call to lines out of service.

*b.* Call to non-connected party line station.

*c.* Call to non-existing office prefixes.

*d.* Call to non-existing numbers in the F-selector banks.

*e.* Call to all busy trunk groups and non-existing thousands or hundreds (continuous hunting).

*f.* Slow keying or dialing.

False calls, i. e. calls due to grounded or short-circuited lines or failure to key or dial, are automatically sent to the wire chief over a special group of trunks from the first group selector having potential PNY (column 56, finder C, Fig. 13*c*). These trunks cannot be reached by keying.

OPERATION OF CIRCUITS

*Unrestricted subscriber keys the digit 0*

When an unrestricted subscriber keys the digit 0, the register operates as when the first digit of an office prefix is dialed. A translator link is connected and the translator finder D (Fig. 13*b*) advances to position 1 in the translator bank (Fig. 13*d*), in which position terminal T1 is cross-connected to potential PN0 corresponding to the digit keyed. Translator finder C (Fig. 13*b*) follows to position 1 and when it comes to rest the following takes place:

*a*. Brush F of finder C is grounded through a resistor and energizes DR2 but not marginal relay DR1. Selection starts as soon as CR5 (Fig. 13*a*) makes its front contact.

*b*. The first, second and third group selectors advance under the control of the translator and select the translated prefix O11.

*c*. Brush G of finders C and B is grounded. TTOR (Fig. 6*v*) is energized when TTAR operates over a series circuit through the odd counting relays (Fig. 6*o*) CR1 to CR9 as soon as selection is complete.

*d*. TTOR (Fig. 6*v*) opens the *c* wire circuit of the register link, thereby releasing the register link which in turn releases the register. The calling subscriber is now connected straight through to the trunk to the O-operator.

*Restricted subscriber keys the digit 0*

When a restricted subscriber keys the digit 0, RSR (Fig. 6*g*) operates and locks up to disconnect PN0, normally on the front contact of XR1 of the first group of digit storing relays (Fig. 6*e*), and connects instead PNX. This will advance the translator finder D, column 2 (Fig. 13*d*), in which PNX appears on terminal T1 instead of PN0. Wipers A, B and C of finder C (Fig. 13*c*) are connected in column 2 to potentials PN0, PN1 and PNX respectively. The call will be routed to a trunk in the PNX group of the third selector instead of the PN1 group as an unrestricted call.

*Subscriber keys two-digit special service number*

Such calls are established in substantially the same manner as single-digit calls, the only difference being that the translator link does not start selection until the second digit is keyed. This is accomplished by the direct grounding of the F-terminal of finder C (Fig. 13*c*), which energizes DR1 (Fig. 13*b*), thus energizing DR and ER (Fig. 13) after the selection of the second digit by finder C when CR3 (Fig. 13*a*) makes its front contact. The grounding of terminal G of finder B operates TTOR (Fig. 6*v*) which releases the register link and the register after completion of selection.

*Subscriber keys three-digit special service number*

The selection is the same as when a three-digit office prefix is keyed but the grounding of terminal G of finder B (Fig. 13) operates TTOR (Fig. 6*v*) and the register link and register release after completion of selection.

*Operation of local trunk*

A local trunk may be of many varieties with a low resistance *c* wire to remove the bridge from the line finder-group selector link or a high resistance *c* wire to leave the bridge in the link. A typical circuit of the latter type is shown in Fig. 14. The register makes the usual tests, first over the *t* wire and then over the *b* wire, after which battery is momentarily placed on the *a* wire in the usual way, to energize BR which locks up to the *c* wire, disconnects the PN-potential from the *b* and *t* wires and connects the *a* and *b* wires through to the jack at the operator's position. Over a front contact, BR lights calling lamp CL. When the operator answers, AJR disconnects the calling lamp and locks up over a front contact of BR until both the operator and calling subscriber release.

By making the *c* wire winding of the BR-relay low, the control of the call would be placed under the answering operator and the talking bridge would be removed from the line finder-group selector B link. The calling subscriber could not release until the operator removed the plug from the jack.

*Call to main, P. B. X or party lines out of service*

When a main line or P. B. X is disconnected or placed out of service, potential PS12 is disconnected from the B-terminal (Figs. 2 and 2*a*). When a partly line is disconnected or placed out of service, the PS-potentials are removed from both the A and B-terminals (Fig. 2*b*). The PN-potential of a main or party line is always connected to the T-terminal of the final (Figs. 2 and 2*b*) and to the T-terminal of all free P. B. X trunks and always to the T-terminal of the last P. B. X trunk (Fig. 2*a*). Thus the final selector always comes to rest on some called line terminal.

When the second test is made, the register finds no PS-potential. The cascade relays (Fig. 6*j*) CCR1 to CCR9 run through and neither GV1 nor GV2 fire, but a circuit is established from ground, back CCR3, front TFR (Fig. 6*g*), back CCR9 (Fig. 6*j*), back CCR6, winding NR (Fig. 6*g*) to battery.

NR places battery on the E-terminal of the register link (Fig. 4) and energizes ER (Fig. 5) of the line finder-group selector link through rectifier S1. ER opens the *c*2 wire circuit and thereby releases the first group selector and the connection beyond. NR (Fig. 6*g*) energizes OR which locks up to ground over front R2R.

OR disconnects terminals A and B of finder A of the translator link (Fig. 13) from connection with the locked up first and second groups of digit counting relays respectively and connects them to potential PN16. At the same time, NR releases counting relays CR1 to CR18 (Fig. 6*o*). CR18 releases TFR (Fig. 6*g*) and CR14 releases ER (Fig. 6*i*). The odd counting relays CR1 to CR9 release TTAR (Fig. 6*v*). TFR (Fig 6*g*) releases NR.

When TTAR (Fig. 6*v*) makes its back contact, the register hunts for a translator link a second time, whereupon finder D of the translator link selects the first row of terminals having both the T1 and T2 terminals connected to potential PN16, i. e. column 15 (Fig. 13*d*). This column is cross-connected for a two-digit office prefix and the call is automatically extended to a trunk number O13 as translated by terminals A, B and C, row 15, of finder C (Fig. 13*c*). After selection is complete, the translator link, register link and register release in the usual manner and the calling subscriber is connected straight through to the intercepting operator.

*Call to non-connected party line station*

When a call is made to a party line which is in service but to a station on that line which is not connected, the register makes the second test of the party line in the usual way and one or more of cascade relays (Fig. 6*j*) CCR4 to CCR9 operate and lock up. Let us assume that the disconnected station G is keyed.

HTBR (Fig. 6*g*) operates when TFR, CCR6 and CCR9 are energized. OR locks up to ground over front R2R. When the calling subscriber keys station G, which is the equivalent of digit 4, KCR1—, 2, 3 and 4 (Fig. 6*b*) lock up and when keying ceases, a circuit is established from ground, back KBR (Fig. 6*a*), front KDR, front KCR1— (Fig. 6*b*), back DER, front KCR2, front KCR3, front KCR4, back KCR5, back DFR, front XAR8 (Fig. 6*n*), winding RGR (Fig. 6*m*), back CCR5 (Fig. 6*j*), back HTBR (Fig. 6*g*), front OR1, winding high resistance OR to battery. RGR does not operate in series with OR, and ringing current is not applied to the line. Instead, OR locks up and extends the call to an intercepting operator in the same manner as it handled a call to a disconnected line.

The method of operation is the same whether the ringing digit is keyed first or whether the party line is selected first. In the case we have just considered, the party line was already selected when the ringing digit was keyed. When the ringing digit is keyed first, the circuit of RGR and OR1 will be open at a front contact of OR1 or back HTBR. Thus the register remains in this partially operated condition until the selection of the party line is complete.

*Station keys a non-existent first digit*

Whenever a station keys a non-existent office prefix, the call is automatically routed to an intercepting operator by the translator link. As there are only ten first digits, all ten appear on the translation charts (Figs. 13*c* and *d*), which take care of the first five digits, all of which are used and no special provision need be made for the keying of a non-used first digit. However, if, for example, the first digit 5 is not used, then it would be treated as the single digit 0 is now treated in column 1. The cross-connections of brushes A, B and C of finder C would be such as to route the call to the intercepting operator, O13.

*Station keys a non-existent second digit*

Since the ten second digits are not all used in any one series, potential PN16 is placed on the terminal T2 after each series. Columns 44, 50, 57 and 65 are reserved for this purpose. Should a subscriber key any non-existent second digit, for example 29, brush T2 of finder D will hunt over columns 16 and 43 and come to rest on column 44. PN16 is cross-connected to terminal T2 in this column and causes GV2 (Fig. 13*a*) to fire. The circuit may be traced from terminal T2, (Figs. 13*d* and *b*), brush T2, front CR4 (Fig. 13*a*), back NR1 to V3 of tube circuit No. 2. As previously stated, the grid of V4 is permanently connected to PN16. GV2 fires and finder D comes to rest. As soon as finder C (Fig. 13*b*) lines up with finder D, DR1 operates, after which DR and ER (Fig. 13) operate and the call is extended to an intercepting operator over a trunk number O13, for which position 44 is cross-connected.

*Station keys non-existent third digit*

Potential PN16 is placed on terminal T1 (Fig. 13*d*) in the columns assigned to the last third digit of each series of second digits. Where there is only one prefix having the same first digit, the succeeding column is reserved for PN16. All of the other columns are used for office prefixes.

When a subscriber keys a number with a non-existent third digit, for example 229, brushes T1 and T2 hunt over columns 16 to 20 but when column 21 is reached GV2 (Fig. 13*a*) fires. The test circuit may be traced from PN16, terminal T1, row 21, brush T1 (Fig. 13*b*), front NR1 (Fig. 13*a*) to the grid of V3. It should be noted that NR1 is energized in series with P4 (Fig. 13*b*) over the ground normally found by brush F of finder A (Fig. 13). NR1 is slightly slow releasing so that it does not break its front contacts before GVR2 (Fig. 13*a*) operates NR2, which locks up and releases counting relays CR1 to CR4. In due course HTBR and GVR2 return to normal, as does also NR1.

When CR3 and GVR2 make their back contacts, P4 (Fig. 13*b*) and AR1 (Fig. 13*a*) are reenergized and finder D searches for the first column having PN16 on terminal T2, which in this case is column 44 (Fig. 13*d*). When this column is reached, the test circuit is closed from PN16, brush T2, front CR4 (Fig. 13*a*), back NR1 to the grid of V3. GV2 fires, energizes GVR2 and finder D (Fig. 13*b*) comes to rest. As soon as finder C lines up with finder D, DR1 operates and energizes DR which energizes ER (Fig. 13), whereupon the call is extended to an intercepting operator over a trunk O13.

Since column 21 (Figs. 13*c* and *d*) is normally assigned to prefix 228, calls made to this number, although in the same column, are not extended to the intercepting operator since potential PN8 on terminal T3 causes GV1 (Fig. 13*a*) to fire and energize GVR1 which opens the armature circuit of GVR2 before the latter has time to operate NR2. The translated office prefix is thus obtained. In this manner, one column (Figs. 13*c* and *d*) is made to serve two purposes—first, an office prefix and second, a trap for a non-existent office prefix. Columns like 46 could be used for an office prefix commencing with the digits 33, such as 335.

*Calls to non-existent numbers in the final selector*

In final selector banks used exclusively for main or party lines, all "tens" and units digits are used. However, when a bank is used for P. B. X, certain of the units and "tens" digits are suppressed to make room for a group of lines having the same PN number. When a non-existent "tens" or units digit is keyed, the final continues to the PN17 NE-position (Fig. 10). The T-terminals of this NE-position are connected to PN17 as is the marked side of tube circuit No. 2 of the register (Fig. 6*d*). As above explained tube circuits Nos. 1 and 2 are connected in multiple when testing in the "tens" and units positions. Tube circuit No. 1 tests for the numerical PN-potential and tube circuit No. 2 for potential PN16 or PN17. PN17 is normally connected but when CR16 operates, PN17 is disconnected and PN16 connected.

When an NE-position is reached, GV2 fires and energizes LR1 (Fig. 6*g*) over a front contact of LR which is energized during hunting in the units and "tens" positions. LR1 energizes NR over front TFR and CCR3 (Fig. 6*j*) which sends the call to an intercepting operator just as in case of a call to a disconnected line.

*Calls to all-busy trunk groups or non-existent thousands or hundreds (continuous hunting)*

These two possibilities are combined. An examination of the operation of a local call will show that a group selector will continue to hunt until a T-terminal agreeing in potential with the marked side of tube circuit No. 1 is found. When the thousands or hundreds digit called is not assigned or when all trunks of the wanted group are busy, the selector continues to hunt. The register circuit is so arranged that hunting may continue, say four to eight seconds, after which the call is sent to an intercepting operator in the following manner:

When TBR (Fig. 6c) operates, as it does at the commencement of each selection, it grounds one side of the winding of timed alarm relay KR1. When the battery segment of interrupter INT1 places battery on the back contact of KR1, this relay locks up to battery. Since the ground may be placed on the winding of KR1 at any instant, depending upon the position of the battery segment of the interrupter disc, KR1 operates and four seconds later the grounded segment of the other disc of interrupter INT1 closes a circuit from ground over another front contact of KR1 to operate NR (Fig. 6g) which sends the call to an intercepting operator in the same manner as though the call had been made to a line out of service.

*False call*

When a register is picked up, ground is placed on one side of the winding of timed alarm relay KR2 (Fig. 6e), circuit from ground, front R2R (Fig. 6), back KDR (Fig. 6a) to KR2 (Fig. 6e). When the battery segment of interrupter INT2 places battery on the back contact of KR2, this relay locks up to battery. The ground may be placed on the winding of KR2 at any instant and relay KR2 may operate immediately or at any time up to twenty seconds later, depending on the position of the interrupter disc. Twenty seconds after KTR2 operates, the grounded segment of the other disc of INT2 closes a circuit from ground over another front contact of KR2, back XBR1, winding KR3 to battery.

On a normal call, each time the subscriber commences to key or dial, KDR (Fig. 6a) operates and opens the circuit of KR2 (Fig. 6e).

KR3 operates CSR1 (Fig. 6v) and a translator link (Fig. 13) is selected in the usual way. Over a changeover contact, KR3 disconnects potential PN5, which would normally be applied to the A-terminal of the A-finder of the translator link, and in place thereof connects PNY. The translator hunts for the row of terminals with PNY on terminal T1 which, as shown in Fig. 13d is row 56. The A-terminal of finder C in row 56 (Fig. 13c) is connected to potential PNY. The first group selector hunts for this potential which is assigned to local trunks leading to the wire chief's desk. When selection is complete, the translator link releases the register link, register and itself as on a single-digit call to 0.

*False call trunk*

A false call trunk (Fig. 15) to the wire chief is selected in the same manner as a local trunk (Fig. 14). The calling lamp CL burns until the wire chief answers. The wire chief answers with a cord circuit having a low resistance sleeve to battery. CR operates in multiple with the high resistance holding winding of BR. This reduction in the resistance of the *c* wire energizes CR (Fig. 5) which removes the transmission bridge from the line finder-group selector link and gives a clear pair of wires through to the wire chief for testing. CR (Fig. 15) energizes AJR which extinguishes the calling lamp and locks up over a front contact of BR so that CL will not be lit again during the subsequent handling of the trunk.

It is the usual practice for a wire chief, when he receives no response after answering, to allow the false call to remain ten or fifteen minutes, during which time most false calls clear. When the plug is removed from the jack, AJR remains energized but CR falls away and lights the waiting lamp WL so that the wire chief knows that the call has been answered. At the same time, the opening of the low resistance path of the *c* wire causes CR (Fig. 5) of the line finder-group selector link to release and again bring in the local transmission bridge which holds the connection busy.

When the wire chief decides to take action toward the clearing of the fault, he determines the number of the calling line by momentarily depressing the identification key IK associated with each false call trunk. Three or four seconds later, the number of the faulty line appears on the indicator on the wire chief's desk. The wire chief may now order the faulty line plugged out at the main distributing frame or he may take such other action as the local maintenance routine calls for.

*Slow keying or dialing*

Should a subscriber fail to key or dial each succeeding digit within, say twenty or forty seconds, the call is automatically transferred to an intercepting operator. The false call circuit is used for this purpose but when KR2 (Fig. 6e) locks up and the ground circuit of interrupter INT2 is closed over its front contact and front XBR1, it operates relay NR (Fig. 6g) instead of KR3 (Fig. 6e) and thereby sends the call to the intercepting operator.

TRUNKING BETWEEN UNIVERSAL OFFICES (RECTIFIER PULSING)

*General plan*

When the group selector at the originating office (A-office—see Fig. 1) tests an out-trunk to another universal office (B-office), the A-register is automatically converted to send high speed rectifier pulses to the B-office, where the trunk selects a TR-link and then a pulse repeater, which converts the high speed rectifier pulses into the proper PN-potentials for the selection of the wanted line. The selection proceeds in the same manner as that of a local line.

Rectifier pulsing proceeds at the rate of forty pulses per second so that the average pulsing time is short. Pulsing is over a total loop adjusted, while pulsing, to 3000 ohms, including one or more intermediate offices if such are involved. The loop is full metallic and no earth currents are used for pulsing or signalling.

Should the call be tandemed through one or more offices, the TR-link and pulse repeater are dropped at the intermediate office (T-office) as soon as an out-trunk to the next office is selected. The A-register pulses directly to the next office in the same manner as it pulsed to the first. There is no repetition at the T-office.

A call may be tandem-trunked through four intermediate offices and the final connection between the A-office and the terminating or B-office will be alway over a clear pair of wires for through pulsing and signalling. The only connection remaining at the T-offices is one electrode of a gas tube which does not receive sufficient potential during pulsing, signalling or talking to fire and therefore offers a path of almost infinite impedance. To release tandem connections, a momentary positive firing potential is placed by the A-office on one wire of the trunk with the other wire open. Offices B and T release instantly.

Trunk calls may be metered once, twice or three times depending upon the cross-connection of the translator bank (see Figs. 13*c* and *d*). A given trunk on a terminating call may be arranged to meter the call once, on a short tandem call twice, and on a long tandem call three times. In other words, the trunk itself has nothing to do with the metering which is always controlled by the translator.

Calls to busy lines are automatically broken down to the A-office and the trunk or trunks released. The busy tone is supplied from the R-link in the A-office. In this manner, the trunk or trunks are held only when the called line is free.

Calls to disconnected lines or disconnected party line stations on connected lines are also automatically broken down to the A-office and the trunk or trunks released, after which the call is automatically routed by the A-office to an intercepting operator who may be in any office.

Out-trunking may be done from the first, second, third, fourth or fifth group selector as the trunking plan for the area requires. The A-register operates on a multi-potential basis until a trunk is selected. No prearranged trunking plan need be foreseen in the A-register circuit or in the B-pulsing circuits. A mere change of potential on the B-terminal of the trunk in the bank of the group selector converts the A-register and in the case of a tandem call releases the register link in the B office and pulse repeater at the T-office.

The trunk at the B-office terminates in a group of relays known as a trunk line (sometimes referred to as a T-link), which may be cross-connected to any second, third, fourth or fifth group selector, as required. It is thus possible to plan an entire group of selectors for the total traffic regardless how the traffic is divided between local and incoming.

Overflow or alternative trunking may be easily arranged since an office cross-connection in the translator banks is common for all translator links (see Figs. 13*c* and *d*). It is not necessary to cross-connect the translator links individually or make any change in the A-register circuits. Each out-trunk of the prime group may be wired so as to operate a relay when all trunks are busy. The relay may change the cross-connection of the translator bank so as to route the overflow call over a different path. If desirable, this may be carried further so that when the first alternative route is busy, overflow calls will be automatically directed to a second alternative route.

The register link in the B-office is the counterpart of the register link in the A-office. It provides for main and party line ringing and gives the ringing tone to the distant calling subscriber but, as previously stated, it is released on busy calls. The busy tone is always given from the register link in the A-office.

OUT-TRUNKING TO A 10,000-LINE UNIT

We will assume that the calling subscriber keys number 345–3800, 345 being the prefix of the distant B or terminating office, that the office prefix 345 is translated into the prefix 72, and that the call shall be metered once (see column 48, Figs. 13*c* and *d*). The connection will, therefore, include a first and a second group selector in the originating office, and a thousands, hundreds, and final selector in the terminating office.

When the calling subscriber removes the handset, the calling line is connected with a register and, after hearing the keying tone, the subscriber keys the wanted number into the register. A translator link picks up the register and translates the office prefix as in the case of a local call. The last four digits of the called subscriber's number are the same as those chosen for a local call but as the office prefix is different, the operation of the first three groups of digit storing relays is appropriately modified.

*Out-trunk selected*

The first group selector chooses an idle second selector in the seventh (7) group and the second selector an idle trunk in the second (2) group (see Figs. 13*c* and *d*, column 48) under the control of the register and the translator link, after which the translator link reelases. However, since potential PS12 is on the B-terminal of the out-trunk (see Figs. 6X and 16) instead of potential PN2 as on a local call, GV2 (Fig. 6*d*) does not fire until CCR1 (Fig. 6*j*) makes its back contact, whereupon potential PS12 is placed on the marked side of the circuit No. 2, circuit from PS12, back BR (Fig. 6*g*), front CCR2 (Fig. 6*j*), back CCR1, back LR (Fig. 6*g*), back BR1 (Fig. 6*d*) to the grid of V3. GV2 operates TVR2 which energizes TDR (Fig. 6*f*) and holds CCR2 (Fig. 6*j*) energized. As will be clear from the tracing of a local call, TDR (Fig. 6*f*) energizes JR (Fig. 6), circuit from ground, front R2R (Fig. 6, front TDR (Fig. 6*f*), back CCR1 (Fig. 6*j*), front CCR2, front DR (Fig. 6*i*), back ER, winding JR (Fig. 6) to battery. JR locks up to ground over front R2R.

The potential PN2 is on the T-terminal of the out-trunk over the back contact of JR and BR (Fig. 16). Potential PS12 is on the B-terminal over another back contact of BR. BR operates at the end of the second test just as BR of a group selector, and locks up over the C-brush of the second group selector (Fig. 9), disconnects JR and in place thereof connects the A and B-terminals through to the *a* and *b* wires of the trunk line or trunk link (Fig. 17) to the B-office. JR is normally bridged across the trunk in series with rectifier S, so polarized as to prevent a flow of current when the trunk link is in its normal condition, i. e. with battery on the *b* wire. The maintenance man at the B-exchange may operate JR (Fig. 16) by reversing the polarity of the trunk loop. When JR operates, the PN-potential is removed from the T-terminal and the trunk tests busy at the outgoing end while it is being tested at the B end.

*A-register converted to rectifier pulsing*

As previously stated, JR (Fig. 6) cuts in the pulse sender (Figs. 6*cc* and *dd*). A rectifier S2 (Fig. 6*cc*) is bridged across the trunk line to the distant office. Tube circuit No. 1 (Fig. 6*d*) of the register is connected to the pulse sender but tube circuit No. 2 is disabled owing to the removal of ground by JR (Fig. 6) from certain front contacts of the cascade relays (Fig. 6*j*) CCR1, CCR4 and counting relay CR18 (Fig. 6*o*).

*Register link in B-office and pulse repeater selected*

The out-trunk (Fig. 16) terminates in the distant office in a trunk link (Fig. 17) and when the pulse sender (Fig. 6cc) is cut in, the trunk fundamental circuit becomes as shown in Fig. 18. S1R (Fig. 17) operates. This circuit may be traced from ground, winding, back DE, back ER, *a* wire, and then through the out-trunk circuit (Fig. 16) and the group selectors (Figs. 8 and 9), terminal F of the register (Fig. 6), front JR, back TCR (Fig. 6cc) of pulse sender, back TAR1, back TJR, rectifier S2, back TAR, back TFR, back TAR1, back TCR, front JR (Fig. 6), terminal G, *b* wire, back ER (Fig. 17), back DR, other winding of S1R to battery.

S1R places over CR back battery on the T-terminals of the register links in the B-office through resistor R1 and energizes common starting relay CSR. CSR energizes P1 (Fig. 19) of all idle register links in the B office which now hunt for the calling trunk line. T1R of the first register link in the B office to test the calling trunk link operates, de-energizes P1 and makes the trunk link busy to the other hunting register links in the B office. T2R opens the circuit of the common starting lead and locks up itself and T1R to ground over a front contact which is made before the starting lead is opened. T2R energizes P2 and places ground on the high resistance winding of T3R. P2 operates the brushes of the lower finder in which the register link in the B office terminates in search for an idle pulse repeater (Fig. 20) and when one is found, a circuit is established from ground, front T2R (Fig. 19), high resistance winding of T3R, brush T, terminal T (Fig. 20), winding TR, back AR to battery. T3R (Fig. 19) operates, opens the circuit of P2 and makes the pulse repeater busy over its low resistance winding in series with one winding of CR.

*Pulse sender (Fig. 6cc) connected to pulse repeater (Fig. 20)*

CR (Fig. 19) and TR (Fig. 20) operate. The latter energizes MR over relatively high resistance resistor R. CR and TR close the *a* and *b* wire circuits and MR locks up over its front contact. The trunk fundamental circuit is prepared to be gradually changed to what is shown in Fig. 18*a*. The circuit may be traced from ground at the pulse repeater (Fig. 20*a*), back SCR, back CR (Fig. 20), front TR, terminal B, front CR (Fig. 19), brush B, compensating resistor RC (Fig. 17), *b* wire to pulse sender (Fig. 6*cc*), back TCR, back TAR1, back TFR, back TAR, winding polarized relay TPR2, back TAR1, back TCR, *a* wire to trunk link (Fig. 17), front CR (Fig. 19), front TR of pulse repeater (Fig. 20), back SAR (Fig. 20*a*), back SBR, back SCR, back SDR, in multiple through windings of polarized relays PR1 and PR2 (Fig. 20), back CR, front MR, winding MR to battery. Since the current flow in the trunk circuit is reversed, polarized relay TPR2 in the pulse sender (Fig. 6*cc*) and polarized relay PR2 in the pulse repeater circuit (Fig. 20) operate. The latter energizes slightly slow releasing relay DR which in turn energizes AR, circuit from ground, winding DR, front PR2, back KR1 (Fig. 20*a*), back PCR1 (Fig. 20*b*), resistor to battery.

AR (Fig. 20) does the following:

*a*. Removes battery from the winding of TR.

*b*. Grounds the C-terminal which energizes CR and DR of the trunk link (Fig. 17) in series with the second winding of CR of the register link in the B office (Fig. 19). DR (Fig. 17) disconnects S1R from the trunk but holds the trunk busy over resistor R. CR locks up over a front contact of S1R, removes battery from terminal T of the register link in the B office and from CSR, and places ground on the *c* wire to the trunk selector, thus energizing BR (Fig. 9). T1R (Fig. 19), T2R and T3R release.

*c*. Keeps closed the *a* and *b* wires of the trunk fundamental circuit through from the pulse sender to the pulse repeater.

*d*. Places ground on the common holding lead.

TPR2 of the pulse sender (Fig. 6*cc*) energizes TJR over a back contact of TDR. TJR locks up, disconnects the rectifier S2 shunt from the trunk, connects the second winding of TSR to rectifier S2 and connects polarized relay TPR1 in parallel with TPR2. TPR2 also places battery on one side of the winding of TAR, indicating that the pulse sender in the B-office is ready to receive pulses from the A-office.

The trunk fundamental circuit is now as shown in Fig. 18*a*.

*Compensating resistance*

In order that the polarized relays may always operate under the same condition, compensating resistance RC in the trunk link (Fig. 17) is adjusted to give a total outside loop resistance of 3000 ohms.

*Operation of relays in fundamental circuit*

The four polarized relays TPR1, TPR2 (Fig. 6*cc*), PR1 and PR2 (Fig. 20) operate only when the proper polarized direct current is applied to the trunk. They do not operate on the relatively high frequency (400 cycles) A. C. Relay TSR (Fig. 6*cc*) in the pulse sender circuit operates only on A. C. which is rectified by rectifiers S2 and S3. The two windings of the relay aid each other. Condenser C prevents this relay from operating when D. C. is applied to the trunk.

*Pulsing to B-office*

The wanted number in the B-office is 3800. When the calling subscriber keys the first digit—3—it is stored in the fourth group of digit storing relays (Fig. 6*p*) in the usual way. XBR4 operates and grounds wire TVR1 to the pulse repeater circuit (Fig. 6*cc*). The circuit may be traced from ground, front XBR4 (Fig. 6*p*) of the fourth group of digit storing relays, back CR12 (Fig. 6*o*), front even-numbered counting relays CR10 to CR2, back PDR (Fig. 6*a*), back BR1 (Fig. 6*d*), back TVR1, winding TAR (Fig. 6*c*), back TFR (Fig. 6*f*), front AR (Fig. 6), front JR, wire TVR1 (Fig. 6*cc*), winding TAR, back TDR, front TPR2 to battery. Tar operates only when the pulse repeater is connected, whereupon it locks up to the lead TVR1 and operates TAR1.

PN3 is placed on the grid of V1 (Fig. 6*d*) from front XR3 (Fig. 6*p*) of the fourth group of digit storing relays.

TAR and TAR1 (Fig. 6*cc*) do the following:

*a*. Disconnect TPR1, TPR2 and TSR from the trunk line.

*b*. Energize TFR through resistor R.

*c*. Connect rectifier S1 (Fig. 6*dd*) to the trunk line to produce the circuit condition shown in Fig. 18*b*. The first (positive) pulse is thus transmitted to the trunk line.

*d*. Connect the grid of V2 (Fig. 6*d*) to potential PN1 (Fig. 6*dd*).

*e*. Connect interrupter INT1 (Fig. 6*cc*) to the counting relays (Fig. 6*dd*).

*f*. Momentarily open the trunk circuit.

Interrupter INT1, which rotates at a speed of twenty revolutions per second, alternately places ground on the leads to the odd and even counting relays. To assure that the first positive pulse shall be of full duration, CR1 is always operated first and does nothing but connect CR2 which is energized a fortieth of a second, or one-half a revolution of INT1, later changes the connection of V2 from PN1 to PN2 and energizes TGR over back CR3. TGR reverses the connections of rectifier S1 to the trunk, thereby sending the first negative pulse.

CR3 operates a fortieth of a second later, releases TGR which restores the original rectifier connection and sends the second positive pulse. At the same time, potential PN3 is placed on V2, thus causing GV1 (Fig. 6*d*) to fire and operate TVR1 which opens the circuit of TAR (Fig. 6*cc*). TAR1 is slightly slow releasing so that it will hold up long enough after the de-energization of TAR to insure that the final pulse be of ample duration.

When the digit 8 is pulsed, counting relays (Fig. 6*dd*) CR1 to CR5 operate to send the first five pulses. When INT1 (Fig. 6*cc*) grounds the lead to the even counting relays for the third time, TKR operates over the front contacts of the counting relays and locks up. At the same time, TGR is operated for the third time and sends a third negative pulse. During the sending of this pulse, TKR unlocks the counting relays CR2 to CR5 and reverses the odd and even leads from the interrupter so that CR2 is not immediately re-energized. TGR remains, therefore, energized over back CR2 and front TKR. CR5 is slightly slow releasing so that CR2 makes its back contact before CR5 breaks its front contact.

A fortieth of a second later, CR2 is energized for the second time and releases TGR which sends a fourth positive pulse, and a fortieth of a second later CR3 operates and places PN8 on V2 over front TKR, whereupon GV1 (Fig. 6*d*) fires.

In a similar manner, six pulses are set for the "tens" and units digit 0. The following table shows the relays normally energized when pulsing any digit 1 to 0:

NORMAL

*Relays energized (Fig. 6dd)*

| Digit | Pulse | CR | Potential |
|---|---|---|---|
| 1 | + | 1 | PN1 |
| 2 | − | 1+2 | PN2 |
| 3 | + | 1 to 3 | PN3 |
| 4 | − | 1 to 4 | PN4 |
| 5 | + | 1 to 5 | PN5 |
| 6 | − | 1+TKR | PN6 |
| 7 | + | 1+2+TKR | PN7 |
| 8 | − | 1 to 3+TKR | PN8 |
| 9 | + | 1 to 4+TKR | PN9 |
| 0 | − | 1 to 5+TKR | PN0 |

"TENS" ONLY

*Relays energized (Fig. 6dd)*

| Digit | Pulse | CR | Potential |
|---|---|---|---|
| 1 | + | 1+THR (TLR)[1] | PN11 |
| 2 | − | 1+2+THR (TLR) | PN12 |
| 3 | + | 1 to 3+THR (TLR) | PN13 |
| 4 | − | 1 to 4+THR (TLR) | PN14 |
| 5 | + | 1 to 5+THR (TLR) | PN15 |
| 0 | − | 1 to 5+TKR+THR | PN11 |
| 9 | + | 1 to 4+TKR+THR | PN12 |
| 8 | − | 1 to 3+TKR+THR | PN13 |
| 7 | + | 1+2+TKR+THR | PN14 |
| 6 | − | 1+TKR+THR | PN15 |

[1] TLR operated during the first five pulses only when any digit 6 to 0 is keyed.

On a local call, the "tens" digit is selected with a maximum of five potentials. The PN-potentials used are PN11 to PN15. When the "tens" digits are pulsed to the B-office, THR (Fig. 6*dd*) is energized over front CR14 (Fig. 6*o*) and back CR16. In order to distinguish between digits 1 to 5 and 6 to 0, relay TLR (Fig. 6*dd*) is operated by MR (Fig. 6*i*) when any one of the digits 6 to 0 is keyed. TLR (Fig. 6*dd*) opens the lead to the grid of V2 so that the first five pulses are transmitted to the B-office with the PN-potential disconnected. However, when the sixth pulse is sent, TKR operates as previously explained and opens the circuit of TLR which releases, thereby connecting V2 to the counting relays for the second series of five pulses. In the case we are considering, GV2 (Fig. 6*d*) would fire when TLR (Fig. 6*dd*) releases with TKR operated which places potential PN11 on the grid of V2 (Fig. 6*d*) corresponding to the potential placed on the grid of V1 over back XR4 (Fig. 6*u*) of the sixth group of digit storing relays.

At the end of the pulsing of each digit, when TAR (Fig. 6*c*) releases, the bridged relays (Fig. 6*cc*) are momentarily held disconnected until slightly slow releasing TFR makes its back contact. This gives time for the changeover in the pulse repeater circuit (Fig. 20), as explained later.

*Pulses received at B-office*

When TAR (Fig. 6*cc*) is operated, the trunk circuit is momentarily opened at a back contact of TAR before TAR1 operates and recloses the circuit. During this interval, MR (Fig. 20) in the pulse repeater falls off and connects alternating current to the trunk and the trunk fundamental circuit becomes as shown in Fig. 18*b*. Since TGR (Fig. 6*j*) is not energized, the first pulse is positive and, therefore, PR1 (Fig. 20) operates and PR2 falls away. PR1 energizes the first pulse counting relay PCR1 (Fig. 20*b*), circuit from ground, winding DR (Fig. 20), front PR1, back CR, back KR1 (Fig. 20*a*), back PCR1 (Fig. 20*b*), winding PCR1 to battery. PCR1 locks up over a circuit via back CR1 (Fig. 20*d*) and front AR (Fig. 20). DR remains energized and holds AR.

A fortieth of a second later, PR1 falls away and PR2 operates on the first negative pulse and energizes PCR2 (Fig. 20*b*) which locks up in parallel with PCR1. PCR3 operates and locks up on the second positive pulse which follows.

We now have the digit 3 of number 3800 stored in the pulse repeater and potential PN3 placed on the grid of V1 via back KR, back LR, back PCR4, from PCR3, 2 and 1, back CCR3, 2 and 1 (Fig. 20*o*) to the grid of V1 (Fig. 20*b*).

*Thousands selector selects hundreds selector (first test)*

TFR (Fig. 6*cc*) holds the trunk loop open long enough to allow DR (Fig. 20) to make its back contact to operate CR without releasing the slow acting AR. CR locks up in parallel with the pulse counting relays (Fig. 20*b*) and closes the *a* wire of the thousands selector, circuit from ground, back FR (Fig. 20*b*), back TVR1, winding ER (Fig. 20*a*), back GR1, front CR (Fig. 20), *a* wire, AR and P of the thousands selector (Fig. 9) to battery.

ER (Fig. 20*a*) energizes HR (Fig. 20*b*) which locks up over back FR and TVR2. HR places high tension battery on the tube circuits.

The thousands selector (Fig. 9) commences to hunt for an idle hundreds selector in the usual way. ER (Fig. 20*a*) energizes CCR4 (Fig. 20*c*) which energizes CCR5. CCR4 connects the grid of V3 (Fig. 20b) to the grid of V1 over back CR4 (Fig. 20d).

When the thousands selector finds a free hundreds selector with potential PN3, GV1 (Fig. 20b) fires and energizes TVR1 which opens the *a* wire circuit and causes the thousands selector to come to rest.

*Pulse sender held during selection*

CR (Fig. 20) remains locked up during selection and places negative battery on the B-terminal and thence the *b* wire of the trunk fundamental circuit whose main elements are shown in Fig. 18c. PR1 (Fig. 20) operates and energizes DR over front CR. DR holds AR energized. CR energizes MR.

At the pulse sender end of the circuit, TPR1 (Fig. 6cc) is energized but as its armature circuit is opened at TDR, no action takes place. The pulse sender circuit remains in this condition until selection (first and second tests) is complete, at which time CR (Fig. 20) is released along with the pulse counting relays (Fig. 20b) and the fundamental circuit reverts to the condition illustrated in Fig. 18a. MR (Fig. 20) is connected by CR to the trunk before the operating ground is removed.

*Second test of hundreds selector*

When TVR1 (Fig. 20b) opens the *a* wire circuit and stops the thousands selector, ER (Fig. 20a) falls away and connects the grid of V4 (Fig. 20b) of the second tube circuit to the *b* wire over back FR, back ER (Fig. 20a) and front CR (Fig. 20). Since the grid of V3 (Fig. 20b) is already connected to PN3 over front CCR4 (Fig. 20c), GV2 (Fig. 20b) fires and energizes TVR2 which releases HR and thus removes high tension battery from the tube circuits to restore them to normal but not before TVR2 energizes IR (Fig. 20c) with the following results:

*a.* IR momentarily grounds the *a* wire and energizes BR of the selected hundreds-selector (Fig. 9), circuit from ground, front IR (Fig. 20c), back GR2, front CCR4, back CR4 (Fig. 20d) to the *a* wire.

*b.* IR energizes selection counting relay CR1, circuit from ground, front IR, back CR2 (Fig. 20d), winding CR1 to battery. CR1 releases the locked up pulse counting relays (Fig. 20b) PCR1, 2 and 3 and CR. When TVR2 (Fig. 20b) breaks its front contact, IR (Fig. 20c) falls away and removes short circuit from CR2 (Fig. 20d) which now locks up in series with CR1 and recloses the locking circuit for the next selection.

*Hundreds selector operated*

The eight pulses corresponding to the digit 8 are received and stored in the pulse counting relays (Fig. 20b). The sixth pulse operates KR which locks up and changes potentials PN1/PN5 to potentials PN6/PN0, respectively. KR releases counting relays PCR2 to PCR5 and energizes KR1 (Fig. 20a) which reverses the leads to the pulse counting relays. PR2 (Fig. 20) does not, therefore, energize a counting relay on this pulse. The seventh pulse operates PR1 which causes the energization of PCR2 (Fig. 20b). The eighth pulse operates PCR3 which places potential PN8 on the grid of V1.

The hundreds selector chooses a final selector with potential PN8 in the same manner as the thousands selector chose the hundreds selector. During selection the trunk fundamental circuit is as shown in Fig. 18c, and at the end of selection the fundamental circuit again returns to the condition of Fig. 18a and CR3 (Fig. 20d) locks up in series with CR4.

*Pulse repeater makes simultaneous test over b wire*

The pulse repeater, the same as the A-register, must be able to test the wanted "tens" terminal or, in case it has been suppressed, the following "non-existent number" terminal (see Fig. 10a). The pulse repeater is arranged for this test when CR4 (Fig. 20d) operates and energizes FR, circuit from ground, back CR7, front CR4, winding FR (Fig. 20b) to battery. FR places the armatures of TVR1 and TVR2 in series and energizes CCR4 (Fig. 20c) which energizes CCR5. The grid of V1 (Fig. 20b) remains connected to the pulse counting relays while the grid of V3 is disconnected from the grid of V1 and instead connected to potential PN16 over front CCR4, front CR4 (Fig. 20d) and back CR7.

*Final selector operated—"Tens" digit selected*

As previously explained, six pulses are sent to select the digit 0. When CR3 (Fig. 20d) and CR4 operate at the end of the hundreds selection, LR (Fig. 20b) operates and connects the pulse counting relays to potentials PN11/PN15. Thus at the end of six pulses PN11 is connected to the grid of V1 and as KR is also energized, a momentary ground is placed on the *b* wire, circuit from ground, back CR5 (Fig. 20d), front CR3 front KR (Fig. 20b), back HR, terminal G, thence over the *b* wire to the final selector (Fig. 10), front BR, ONC1, winding TR to battery. TR locks up and connects the even set of brushes.

The final selector now chooses the zero "tens" position (Fig. 10a) and when it is reached, comes to rest.

TVR1 (Fig. 20b) energizes CR5 (Fig. 20d) over front FR. CR5 releases LR (Fig. 20b) and the locked up pulse counting relay PCR1 and KR and KR1. LR restores the normal PN-potentials to the pulse counting relays. It also removes ground from the *b* wire circuit. When TVR1 (Fig. 20b) breaks its front contact, CR6 (Fig. 20d) locks up in series with CR5.

*Final selector operated—Units selection (first test)*

The first test of the units selection is made in the same manner as the "tens" selection and when the wanted line is reached, TVR1 operates and the F-selector comes to rest on the terminals of the called line, whether it be free or busy. TVR1 (Fig. 20b) energizes CR7 (Fig. 20d) over front FR (Fig. 20b) which releases the pulse counting relays, FR, CR (Fig. 20) and HR (Fig. 20c). The latter deionizes GV1 which in turn releases TVR1, whereupon CR7 (Fig. 20d) locks up in series with CR8. CR7 disconnects PN16 from the grid of V3 (Fig. 20b) and in place thereof connects PN12.

At the end of this first test the trunk fundamental circuit will be as shown in Fig. 18a. It is restored to this condition so that, in the case of a call to a party line, an additional digit may be pulsed to select the proper ringing current.

*Pulse repeater arranged to make second test on both* a *and* b *wires*

The pulse repeater is arranged to test main and party lines in the same manner as the A-register. The conversion of the pulse repeater circuit to do this occurs when CR8 (Fig. 20d) makes its front contacts and energizes GR1 (Fig. 20a) and GR2 (Fig. 20c). GR1 (Fig. 20a) disconnects the a wire from ER and connects it instead to the grid of V2 (Fig. 20b). The b wire is connected to the grid of V4 over front CR (Fig. 20), back ER (Fig. 20a) and back FR (Fig. 20b). GR1 (Fig. 20a) re-energizes HR (Fig. 20b) so that high tension battery is again placed on both tube circuits. FR, which is slow releasing, opens the circuit of CCR4 (Fig. 20c) which had energized CCR5. However, CCR4, which is also slow releasing, does not break its front contacts before cascade relays CCR1, 2 and 3 and CCR6, 7 and 8 are energized by GR2. Thus when the second test commences, all CCR-relays are energized.

*Called main line or P. B. X free (second test)*

When the final finds the called line free, it will find potential PS12 on the B-terminal (see Figs. 2 and 2a). Potential PN12 (of the same value as PS12) is already on the grid of V3 (Fig. 20b) over front CCR4 (Fig. 20c). GV2 (Fig. 20b) fires and energizes TVR2. TVR2 energizes IR (Fig. 20c) in series with CCR4 (Fig. 20b). IR energizes RAR (Fig. 20a), circuit from ground, front GR2 (Fig. 20c), front CCR4, winding RAR (Fig. 20a) to battery. RAR locks up over front AR (Fig. 20). HR (Fig. 20b) remains energized over front GR1 (Fig. 20a) until the pulse repeater is released.

*A-register and register link released*

RAR (Fig. 20a) energizes SAR. SAR places A. C. on the a wire and ground on the b wire and the fundamental circuit becomes as shown in full lines in Fig. 18d. SAR (Fig. 20a) energizes slow releasing SAR1 which holds AR (Fig. 20) energized.

At the originating end, TSR (Fig. 6cc) operates and energizes TDR which locks up to ground. SAR (Fig. 20a) closes the circuit of SCR, circuit from ground, front RAR, front SAR, winding SCR to battery. SCR opens the circuit of SAR which is slightly slow releasing, so as to give ample time for the first pulse. When it makes its back contacts, negative battery is placed on the b wire and ground on the a wire and the trunk fundamental circuit becomes as shown in dotted lines in Fig. 18d. TSR (Fig. 20cc) releases and TPR1 operates. TPR1 energizes TTOR (Fig. 6v) of the register circuit, circuit from ground, front TPR1 (Fig. 6cc), front TDR, back TER, winding TTOR (Fig. 6v) to battery. TTOR opens the c wire circuit of the register which releases the register, pulse sender (Fig. 6c) and the register link (Fig. 4). The line finder group selector link (Fig. 5) at the originating exchange is now connected to the trunk and, as explained later, the pulse repeater at the B-office is released.

*Called line cut-off relay operated*

The called line cut-off relay is operated upon the completion of the second test by the grounding of the t wire to the final selector which, in the case of a trunk call. is connected through the d wire of the register link of the B office (Fig. 19) to the D-terminal of the pulse repeater and to which RAR (Fig. 20a) applies ground.

*Called line rung*

SAR1 (Fig. 20a) is slow releasing and does not make its back contact when SAR releases until after SCR or SDR, as the case may be, has sent in the last pulse. When SAR1 makes its back contact in the case we are considering, a circuit is established from ground, front SCR, back SAR1, E-terminal (Fig. 20), front CR (Fig. 19), winding ER to battery.

ER operates and does the following:

a. Energizes FR which bridges BR and the ringing tone transformer TT across the trunk. The calling subscriber hears the ringing tone. GR (Fig. 5) does not operate.

b. Closes the circuit of AR (Fig. 19) from ground, front RAR (Fig. 20a), resistor R, terminal G (Fig. 20), front CR (Fig. 19), front ER, back KR, back AR, winding AR to battery. AR locks up but not KR which is marginal.

c. FR short-circuits the holding winding of CR which releases and disconnects the pulse repeater and releases ER which is slightly slow releasing so that the called line receives the usual immediate ring.

*Pulse repeater released*

In due course, SAR1 (Fig. 20a) releases AR (Fig. 20) which unlocks all locked up relays in the pulse repeater circuit and restores it to normal ready for the next call. The trunk fundamental circuit is now as shown in Fig. 18g.

*Called subscriber answers the call metered*

When the called subscriber answers, the ringing trip relay RRR (Fig. 19) breaks its back contact and releases AR and FR. FR disconnects BR and removes ground from the C-terminal, thereby releasing DR (Fig. 17) of the trunk link which cuts the trunk circuit through to the calling subscriber. As the called line is now closed, the supervisory relay S2R operates and energizes ER which reverses current in the trunk loop and operates GR (Fig. 5) in the line finder-group selector link and the fundamental circuit becomes as shown in Fig. 18h. GR (Fig. 5) energizes S2R which operates the calling subscriber's meter as on a local connection.

*Release*

When the calling subscriber hangs up, S1R (Fig. 5) of the line finder-group selector link falls away and releases RR. RR releases the line finder and the calling subscriber's line but not the first group selector or FR which remain held over a circuit from ground, timed alarm TAI, back RR, front S2R, back ER to wire c2.

Should the called subscriber fail to hang up within ten seconds, TAI opens its circuit to ground and releases FR and the first and second group selectors. When the c wire of the out-trunk circuit (Fig. 16) is opened, BR releases and bridges high resistance winding of JR across the trunk to the distant office. The direction of current flow is such as to energize JR which removes test potential from the T-terminal, thus holding the out-trunk busy. Due to the high resistance of JR, S1R (Fig. 17) in the trunk link falls away and releases CR. The in-trunk selector, however, remains held over a circuit from ground, timed alarm interrupter, back S1R, front S2R.

Should the called subscriber fail to hang up within ten seconds after the line finder-group selector link is released, TAI (Fig. 17) opens the holding circuit to ground and releases the trunk selector. The called subscriber now originates a call and if he does not hang up within the predetermined time, he comes in on the wire chief as a false call. When S2R breaks its front contact, it releases ER which restores the normal polarity of the trunk, thereby causing JR (Fig. 16) in the out-trunk to release and close the test circuit. The trunk is now ready to receive another call.

Should the calling subscriber fail to hang up after the called subscriber has hung up, GR (Fig. 5) of the line finder-group selector link falls away when S2R (Fig. 17) of the trunk link releases ER which restores the normal polarity of the trunk. GR (Fig. 5) releases S2R and the calling line is momentarily held over a circuit from ground, TAI, front RR, back S2R, front RR to wire c1 and c2. If the calling subscriber does not hang up within ten seconds, TAI opens its holding circuit to ground and releases the line finder and the subscriber originates a new call. If he does not hang up within the predetermined time, a false call will be routed to the wire chief.

*Called line busy*

Should the called line, whether main, P. B. X. or party line, be busy, the final selector stops on the busy line but does not connect with it as the *t* wire to the final selector is not grounded by the pulse repeater. Potential PN13 is placed on the *b* wire by the final selector and when cascade relay CCR4 (Fig. 20*c*), whose circuit is opened when FR releases, makes its back contact, potential PN13 is placed on the grid of V3 (Fig. 20*b*) over front GR2 (Fig. 20*c*), front CCR5 and back CCR4. GV2 (Fig. 20*b*) fires and energizes TVR2 which energizes IR (Fig. 20*c*) and holds CCR5. This energizes BR, circuit from ground, front IR (Fig. 20*c*), front GR2, back CCR4, front CCR5, winding BR (Fig. 20*a*) to battery. BR locks up.

BR energizes SAR and the trunk fundamental circuit becomes as shown in full lines in Fig. 18*c*. SAR closes the circuit of SBR which operates and opens the circuit of SAR. When SAR makes its back contact, negative battery is applied to the *a* wire and the fundamental circuit goes into the second stage (dotted lines) of Fig. 18*e*.

When SAR applies A. C. to the trunk, TSR (Fig. 6*cc*) of the pulse sender circuit operates and energizes TDR which locks up. When negative battery is applied to the trunk by SBR (Fig. 20*a*), TPR2 (Fig. 6*cc*) operates and energizes slow releasing relay TER. When SAR (Fig. 20*a*) makes its back contact, operates and releases SBR.

When SBR makes its back contacts, A. C. is again placed on the trunk and the trunk fundamental circuit goes into the third and final stage shown in Fig. 18*e*. TSR (Fig. 6*cc*) operates for the second time and closes a circuit from battery, front TSR, winding TCR (Fig. 6*i*) of the register circuit. TCR sends the register link (Fig. 4) into the busy position and releases the first group selector and consequently the trunk circuit, and the trunk fundamental circuit becomes as shown in Fig. 18*i*.

The calling subscriber receives the busy tone from the register link and from there on the release of the connection in the originating office is the same as on a local call. The first group selector releases the second group selector which releases the out-trunk. In due course, SAR1 (Fig. 20*a*) falls away and releases the pulse repeater, the register link in the B office and the trunk which in turn releases the connection in the B-office.

*Call to party line with wanted station connected*

The pulse repeater duplicates the tests of the A-register when testing a party line. We will assume that stations A, D and K are connected but not station G, and, therefore, potential PS5 is on the A-terminal and PS7 on the B-terminal (Fig. 2*b*). When FR (Fig. 20*b*) releases after the completion of the first test, the cascade relays (Fig. 20*c*) commence to release. PN5 is on the grid of V1 (Fig. 20*b*) via front CCR1 (Fig. 20*c*) and as the same potential is immediately placed on the grid of V2 (Fig. 20*b*) over front GR1 (Fig. 20*a*) from the *a* wire, GV1 (Fig. 20*b*) fires instantly and energizes TVR1. TVR1 operates IR2 and holds CCR1.

When the other string of cascade relays (Fig. 20*c*) CCR4, 5, 6 and 7 fall off in due course and place potential PN7 on the grid of V3 (Fig. 20*b*) with the same potential on the grid of V4 over back FR, back ER (Fig. 20*a*), front CR (Fig. 20) to the *b* wire, GV2 (Fig. 20*b*) fires and energizes TVR2 which holds CCR8 (Fig. 20*c*) in series with IR. As both IR and IR2 are energized, ground is placed on the D-terminal, circuit from ground, front IR (Fig. 20*c*), front GR2, front IR2 (Fig. 20*b*) to the D-terminal. This operates the called line cut-off relay.

The circuit remains in this condition until the calling party keys the eighth digit to select the ringing current. In the case we are considering, both GV1 (Fig. 20*b*) and GV2 fire. However, should, for example, both stations G and K be disconnected, then no potential would appear on the B-terminal (Fig. 2*b*). GV2 (Fig. 20*b*) would not fire and the string of counting relays (Fig. 20*c*) CCR4 to CCR8 would run through. IR would operate over a circuit from ground, left-inner, back CCR5, front GR2, back CCR8, winding IR, through backs CCR4, 5, 6, 7 and 8 to battery.

Similarly, should both stations A and D be disconnected and one or both stations G or K connected, IR2 (Fig. 20*b*) would be operated over a circuit from ground, back CCR4 (Fig. 20*c*), front GR2, back CCR3, winding IR2, backs CCR1, 2 and 3 to battery.

*Calling subscriber keys party line ringing digit*

The trunk fundamental circuit, after the units selection by the final selector, becomes as shown in Fig. 18*a*. When the subscriber keys any one of the four ringing digits, two to five pulses are transmitted by the pulse sender to the pulse repeater in the usual way. We will assume that the subscriber keys the digit K. The sender will operate counting relays (Fig. 20*b*) PCR1 to PCR5 inclusive. At the end of pulsing, DR (Fig. 20) falls off in the usual way but since GR1 (Fig. 20*a*) is energized, JR (Fig. 20) operates in place of CR. JR locks up in multiple with the counting relays.

A circuit is now established from ground, front IR (Fig. 20*c*), front IR2 (Fig. 20*b*), front JR (Fig. 20), front PCR1 (Fig. 20*b*) through to PCR5, front CCR8 (Fig. 20*c*), winding RKR (Fig. 20*a*) to battery. RKR locks up.

RKR energizes SAR and SCR, the same as when RAR is energized on a call to a free main line. The fundamental circuit becomes as shown in Fig. 18*d*. The register and pulse sender and the register link in the A-office are released and the line finder-group selector link cut through to the trunk, and the fundamental circuit becomes as shown in Fig. 18*g*.

*Called station K rung*

The called station K is rung in the same manner as a main line or station A is called, but in the case we are considering, RKR (Fig. 20*a*) places a full ground on the *b* wire and energizes KR (Fig. 19) of the register link in the B office which locks up and applies 66 cycle ringing current to the line to ring station K. The pulse repeater is released as above described.

*Called station answers and connection released*

From now on the operation of the circuits is the same as when a main line is called.

*Call to disconnected line*

As previously explained, no PS-potential will be found on the A or B-terminals when the second test is made. Thus neither GV1 nor GV2 (Fig. 20*b*) will fire and all cascade relays (Fig. 20*c*) will release. When the last cascade relay makes its back contact, a circuit is established from ground, back CCR4, front GR2, back CCR3, back CCR8, winding IOR (Fig. 20*b*) to battery. IOR locks up and energizes SAR (Fig. 20*a*) and the fundamental circuit becomes as shown in the first stage of Fig. 18*f*. SAR operates first, then SBR which releases SAR and when SAR makes its back contacts, negative battery is applied to the *a* wire and the second stage of the trunk fundamental circuit (Fig. 18*f*) is reached. TSR (Fig. 6*cc*) and TCR are energized.

When SAR makes its back contact with SBR operated, SCR is energized and applies ground to the *a* wire and the trunk fundamental circuit goes into the third stage of Fig. 18*f*. TPR1 (Fig. 6*cc*) operates and closes a circuit from ground, front TPR1, front TDR, front TER, winding NR (Fig. 6*g*) of the register to battery. NR operates, releases the trunk connection and connects the calling subscriber with an intercepting operator. The connection at the B-exchange is released as on a busy call.

*Call to a disconnected station on a connected part line*

The second test is made in the same manner as the second test on a call to a connected station, but when the calling subscriber keys the ringing digit of the disconnected station, which we have assumed to be G, counting relays PCR1 (Fig. 20*b*) to PCR4 inclusive lock up. Since CCR7 is de-energized, a circuit is established from ground, front IR, front IR2 (Fig. 20*b*), front JR (Fig. 20), front PCR1 (Fig. 20*b*) to PCR4 inclusive, back PCR5, back CCR7 (Fig. 20*c*), winding IOR (Fig. 20*b*) to battery. IOR operates and the calling subscriber is connected with an intercepting operator.

TRUNKING FROM A UNIVERSAL OFFICE TO A STEP-BY-STEP OFFICE

When a call is trunked from a universal office to a step-by-step office, the pulse sender associated with the A-register is arranged to send standard dial pulses at standard speed. Since step-by-step offices are not arranged to signal back to the A-office except to indicate the answering of the called subscriber by reversal of current flow in the trunk, the special features met with in universal-to-universal trunking, such as the release of the trunk on a busy connection and the automatic transfer of non-connected lines or stations to an intercepting operator, must be omitted. Instead, both ringing and busy tones will be supplied from the step-by-step office and calls to disconnected lines or stations will be completed by jumpering the disconnected line or station in the step-by-step office to an intercepting operator.

The out-trunk leading to a step-by-step office may be the same as to a universal office (Fig. 16). At the step-by-step office, the positive wire of the in-trunk selector is connected to the *a* wire of the out-trunk.

*Out-trunk selected and pulse sender connected*

An out-trunk (Fig. 16) is selected as previously described and since it is assigned to a step-by-step office, potential PS13 is placed on the *b* wire instead of PS12 which is placed on the *b* wire of a trunk to a universal office (Fig. 6X). GV2 (Fig. 6*d*) does not fire until CCR2 (Fig. 6*j*) makes its back contact when PS13 is placed on the grid of V3. GV2 fires and energizes TVR2 which energizes TCR (Fig. 6*cc*) in the pulse sender, circuit from ground, front TDR (Fig. 6*f*), back CCR1 (Fig. 6*j*), back CCR2, front CCR3, front DR (Fig. 6*i*), back ER, winding TCR (Fig. 6*cc*) to battery. TCR locks up and places a short circuit across the *a* and *b* wires of the trunk, circuit from the *a* wire, front TCR, back TBR to the *b* wire. This short circuit energizes the bridged relay in the in-trunk selector and prepares it for pulsing.

*In-trunk selector pulsed*

We will assume that the wanted number in the B-office is 3800. As soon as the register has completed the second test of the out-trunk, ground is placed on the lead TVR1 (Fig. 6*cc*) by XBR4 (Fig. 6*p*) of the register. When INT2 (Fig. 6*cc*) closes its circuit to battery, TAR2 operates, circuit from the ground on TVR1, winding TAR2, front TCR, back TFR, INT2 to battery. TAR2 locks up.

The relationship between interrupters INT2 and INT3 which are driven by a common shaft at a normal dial speed of ten revolutions per second, is as follows:

*a.* INT2 closes a circuit to battery just as INT3 opens a similar circuit so that TBR is not energized immediately after TAR2 operates. Thus the short circuit of the *a* and *b* wires of the trunk remains long enough to allow the bridged relay in the in-trunk to operate properly.

*b.* INT3 closes its circuit to battery during 60% of a revolution and opens its circuit during the other 40%. This ratio may be varied to meet the requirements of the step-by-step area.

Since the first digit to be pulsed to the step-by-step office is 3, TBR must open the trunk circuit three times. When INT3 closes its circuit to battery, it energizes TBR which opens the trunk circuit. After an interval representing approximately 60% of the time of one revolution, INT3 releases TBR which recloses the trunk circuit and in this manner sends one pulse to the step-by-step office just as though it had been dialed. This is repeated three times to pulse digit 3.

When TBR operates for the first time, it energizes DCR1 and the latter operates CR1 (Fig. 6*dd*) which locks up just as on a first pulse to a universal office. When TBR (Fig. 6*cc*) is released, it removes the short circuit from DCR2 which now locks up and releases DCR1. When TBR is energized for the second time, it energizes DCR3 over front DCR2. DCR3 energizes CR2 (Fig. 6*dd*) and when TBR (Fig. 6*cc*) releases for the second time, it removes the short circuit from DCR4 which now locks up in series with DCR3 and back DCR1. DCR4 releases DCR2 so that when TBR is energized for the third time, DCR1 is energized for the second time, releasing DCR3 and 4 and energizing CR3 (Fig. 6*dd*) just as though the digit 3 had been pulsed to a universal office.

When CR3 makes its front contact, it places potential PN3 on the grid of V2 (Fig. 6*d*) which fires and energizes TVR2 opening the circuit of TAR2 (Fig. 6cc) which releases.

The trunk circuit remains closed long enough for the usual changeover to take place in the step-by-step office. To insure ample time for this slow releasing relay TFR (Fig. 6cc), which is energized when TAR2 operates, holds open the initial operating circuit of TAR2 long enough to accomplish the desired result. Thus the second digit cannot be pulsed before TFR makes its back contact.

The remaining three digits (800) are pulsed in the same manner and the counting relays operate just as though the call were being pulsed to a universal office.

*Register and register link of the B office released*

When the last digit of the called number is pulsed, counting relay CR18 (Fig. 6o) of the register circuit operates and closes a circuit from ground, front CR18, front TCR (Fig. 6cc), winding TTOR (Fig. 6v) to battery. TTOR opens the *c* wire circuit of the register which causes the release of the register and the register link of the B office, thus connecting the line finder-group selector link (Fig. 5) straight through to the step-by-step final.

*Called line free*

When the called line tests free, the step-by-step final applies ringing current to it and ringing tone to the calling subscriber. The direction of current flow in the trunk remains such as not to operate GR (Fig. 5) in the line finder-group selector link.

When the called subscriber answers, the direction of current flow in the trunk is reversed, GR in the line finder-group selector link operates and meters the call as on a call to a universal office.

*Line busy*

Should the called line be busy, the step-by-step final applies the busy tone to the trunk.

*Release*

When the called subscriber hangs up, the connection is released in the same manner as a connection to a universal office.

TANDEM TRUNKING

*A-Office tandems through T-office to B-office*

In this case the out-trunk at the A-office is as shown in Fig. 16a and at the trunk-office as shown in Fig. 16b. The T-link at the T-office is shown in Fig. 17a and at the B-office in Fig. 17. The pulse sender at the T-office is as in Figs. 20—20d with an additional pair of counting relays placed as indicated by Note 2 to accommodate the extra selection. We are assuming in this case that the T-office is a normal office also handling terminating calls. The pulse repeater at the B-office is as in Figs. 20—20d without change.

We further assume that the translated office prefix is 267 (see column 17, Figs. 13c and d), a first and a second selector being operated in the A-office and a third selector in the T-office. In the B-office, thousands, hundreds and final selectors are operated.

The call to the tandem office is established in the same way as a call to a terminating office. However, when the third group selector in the T-office picks up the out-trunk (Fig. 16b) which has potential PNY on the T-terminal, the low resistance of the second winding of BR1 energizes DR of the trunk link (Fig. 17a). DR cuts the trunk through from the A-office of the B-office and at the same time disconnects the register link in the B-office and the pulse repeater at the T-office. DR does not operate on a terminating call on the T-office on account of the high resistance of BR in the trunk selector (Fig. 9).

The out-trunk (Fig. 16b) may be used to originate calls from the T-office or to establish tandem calls from a distant A-office. When used to originate a call, it functions in the same manner as Fig. 16. When picked up on a tandem call, BR1 (Fig. 16b) bridges rectifier S1 and relay ER across the trunk to the B-office to operate the trunk link (Fig. 17) in the B-office (see Fig. 18).

When the B-office pulse repeater is connected, the direction of current flow in the trunk is reversed (see Fig. 18a), whereupon ER (Fig. 16b) operates and energizes DR which connects the B-office pulse repeater, now ready to receive pulses, straight through to the pulse sender in the A-office. DR locks up over a front contact of BR1 and disconnects ER and S1. Incidentally, BR1 energizes BR so that the high resistance relay JR is disconnected from the trunk and PN from the T-terminal.

The thousands, hundreds and final selectors in the B-office are now pulsed direct from the A-office just as though the T-office were not involved in the connection (see Figs. 18b and c). However, the total trunk loop resistance between the A and B-offices must not exceed 3000 ohms.

*Metering*

When the called subscriber answers, GR (Fig. 5) in the B-link at the A-office operates and meters the call as on a non-tandem trunk call.

*Release*

When the calling subscriber hangs up, the line finder is released but the register link (Fig. 4) in the A-office and the trunk connection are held busy until the called party hangs up. The out-trunk (Fig. 16a) is released at the A-office. TRR is slow releasing and high tension battery is momentarily placed on the *a* wire while the *b* and *t* wires are held open. HTB ionizes GV in the out-trunk (Fig. 16b) from the tandem office to the B-office which energizes GVR. The holding circuit of BR1 and DR (Fig. 17a) is opened and GV (Fig. 16b) deionizes, thereby releasing the out-trunk to the B-office and the trunk link (Fig. 17a) in the tandem office.

*Translator controlled multiple metering*

Figure 16C:
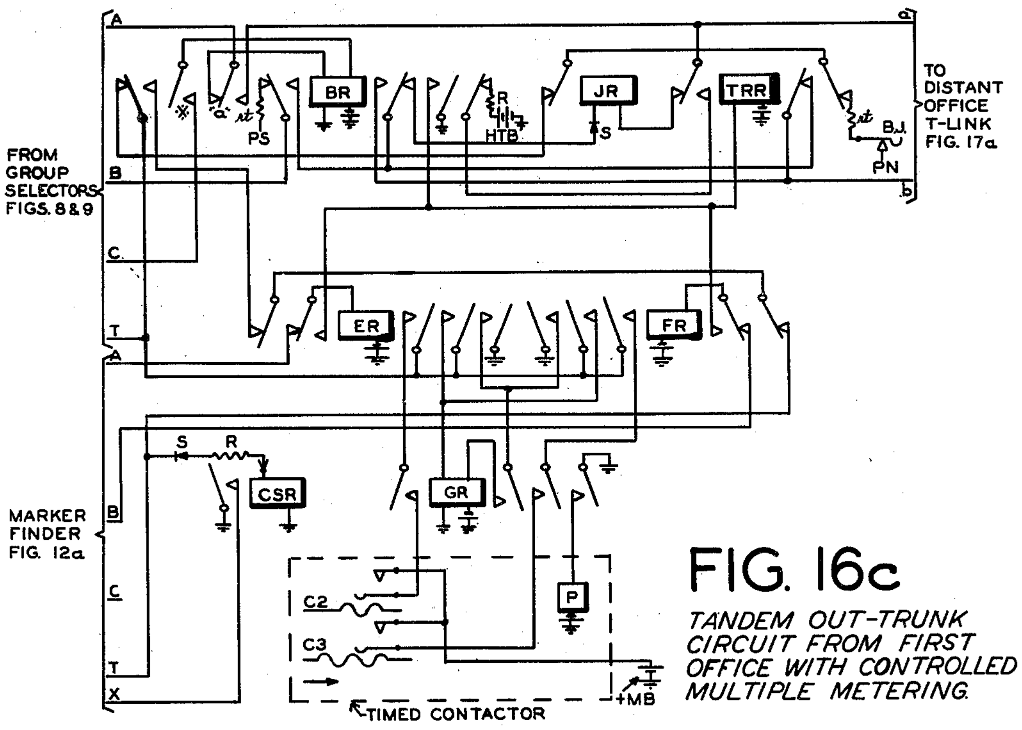

In this case the out-trunk at the A-office is as in Fig. 16c. The marker finder circuit is Fig. 12a. The other circuits involved are the same as in the previous case.

We will assume that the translated office prefix is 1438 with calls arranged to be metered twice at the beginning of each timed conversation period (see column 16, Figs. 13c and d). We will further assume that the first, second and third selectors are in the A-office and the fourth selector in the T-office. The B-office would have the thousands, hundreds and final selectors. The call to the B-office is established in the same way as in the previous case, the multiple metering being provided in the A-office. The release at the end of the connection is the same as in the previous case or for that matter, as far as the calling or called subscribers are concerned, the same as for a straight terminating trunk call.

When a call is to be metered twice on a timed interval basis, the D-terminal of finder D of the translator (Fig. 13*b*) is grounded (see column 16, Figs. 13*c* and *d*). The translator controls the group selection in the usual way and when the last of the group selectors has completed the second test, the translator is released, all in the usual way. A circuit is closed over terminal D of the translator finder D, front ER, brush D, finder B (Fig. 6*v*), front TTAR back and winding MMR2 (Fig. 6*r*) to battery. This relay operates on a full ground, cuts off MMR3 and locks up to ground.

The trunk circuit is arranged for multiple metering during the interval between the release of the translator and the completion of selection of the last four digits of the called number by the thousands, hundreds and final selectors or, in other words, the release of the register. When MMR2 makes its front contact, it places potential PN12 on the *t* wire of the out-trunk. Potential PN12, as may be seen from Fig. 6X, is −28 volts, which is sufficient to energize common starting relay CSR (Fig. 16*c*). This relay is connected to the *t* wire over a circuit from ground, winding CSR, resistor R, rectifier S, back FR and ER, front BR to the *t* wire.

Each out-trunk arranged for translator-controlled multiple metering is wired to terminals in the bank of a single marker finder (Fig. 12*a*) which, due to the extreme shortness of the holding time, will serve 100 trunks. When CSR (Fig. 16*c*) makes its front contact, it energizes HTBR (Fig. 12*a*) and magnet P of the marker finder. HTBR places high tension battery on the two tube circuits, one of which is connected to potential PN12 and the other to potential PN13. The finder now searches for the calling out-trunk and when it is reached, potential PN12 on the *t* wire through MMR2 (Fig. 6*r*) of the register causes GV1 (Fig. 12*a*) to fire and energize GVR1 which releases, whereupon a momentary circuit is established from ground, front CSR (Fig. 16*c*) winding low resistance HTBR (Fig. 12*a*), back GVR2, front GVR1, brush A, back and winding ER (Fig. 16*c*) to battery. ER locks up, disconnects the *t* wire and releases HTBR and CSR which, in turn, releases the marker finder circuit. HTBR de-ionizes GV1 and releases GVR1.

It will be seen that the marker finder circuit is held only long enough to energize a relay in the out-trunk so that, should there be three or four trunks calling for the marker finder at the same time, CSR will not release when it energizes the relay in the first trunk but will pass on immediately to the next trunk. GV1 (Fig. 12*a*) is not fired a second time on the same trunk since ER (Fig. 16*c*) removes the firing potential from the T-terminal of the marker finder.

*Metering*

When the called subscriber answers, GR in the line finder-group selector link (Fig. 5) in the A-office operates and the first metering pulse is applied to the *t* wire in the usual way. This metering pulse operates the service meter once. At the same time, it energizes GR (Fig. 16*c*) in the out-trunk circuit which closes the magnet circuit of a timed contactor and, since ER is energized, contacts C2 are connected to the *t* wire.

The first metering pulse is supplied from the line finder-group selector link, as just stated. The second metering pulse is supplied by the timed contactor which in its normal position sends only one pulse in the first cycle. After a timed interval of three to five minutes, as the case may be, C2 twice closes and opens its contacts and sends two metering pulses to the meter magnet. This continues until the calling subscriber hangs up and releases the first line finder.

As previously explained, the out-trunk may not be immediately released so that metering pulses may be applied to the *t* wire after the calling subscriber has hung up, but as the *t* wire is opened at the line finder, the subscriber's meter is not operated. In other words, metering ceases the instant the calling subscriber hangs up.

Should the translator bank have been cross-connected for triple instead of double metering, the D-brush of finder D (Fig. 13*d*) would be grounded through a resistor (see column 20), in which case MMR2 would not operate and MMR3 would place potential PN13 on the *t* wire. GV2 (Fig. 12*a*) of the marker finder would fire and energize FR (Fig. 16*c*) instead of ER. This will connect contacts C3 to the *t* wire. As in the previous case, the first metering pulse is supplied by the register link, but the next two by contacts C3. In the second cycle, C3 sends three metering pulses.

*Fixed multiple metering*

In this case, the out-trunk at the A-office is the one shown in Fig. 16*d*. The other circuits involved are the same as those in the first case. No marker finder is required since the metering is fixed; i. e. the timed contactor always applies two or three metering pulses, as the case may be. With fixed multiple metering, all calls sent over the trunk are metered twice or three times, whereas with controlled multiple metering the trunk may be used as a starting point for calls to a number of offices. To certain offices there might be no multiple metering while to other offices there would be double or triple multiple metering. Controlled multiple metering thus gives greater flexibility in the use of the out-trunk.

We will assume that the trunking route is the same as that mentioned in the second case but that no ground is applied to the D-terminal of translator finder D (Fig. 13*b*). Thus the multiple metering relays in the register circuit (Fig. 6*r*) are not involved.

*Metering*

When the called subscriber answers, the line finder-group selector link (Fig. 5) applies the first metering pulse in the usual way. At the same time, GR (Fig. 16*d*) is operated and locks up. The timed contactor sends the complement of pulses, less one, to complete the first metering and in the second cycle applies the full complement of pulses. This continues until the calling subscriber hangs up.

*A-office tandems through four tandem offices T1, T2, T3 and T4 to B-office*

This extreme case of tandem trunking may be applied to each of the three previously described methods. In this case, the first group selector would be in the A-office, the second in T1, the third in T2, the fourth in T3 and the fifth in T4. The thousands, hundreds and final selectors would be in the B-office.

The translated office prefix would of course, have to provide for five selections. This is done in column 20 of translator finder C (Fig. 13*c*). It is assumed that this call would be metered twice. Thus terminal D of finder D (Fig. 13*d*) is grounded through a resistor. As five selections are involved, terminal C of finder D is grounded and the translator is released only after all five selections are complete.

Metering and release take place as described in the other cases. The high tension release pulse sent by the out-trunk at the A-office fires the four gas tubes in the out-trunks from the four T-offices simultaneously. Relay BR1 (Fig. 16*b*) is made slightly slow releasing so as to make it impossible for the trunk to be cut before all gas tubes have had time properly to ionize.

*Non-repeated double or triple metering*

The out-trunk circuits (Figs. 16*a*, *c* and *d*) may be provided with multiple metering contactors which do not repeat. In other words, when GR is energized, the contactor would supply the complement of pulses to complete the double or triple metering but would not repeat at timed intervals. The call would be metered two or three times, once per connection, regardless of the length of conversation.

What I claim is:

1. In a telephone exchange system, a plurality of lines each having a set of terminals including a test terminal, a central office register, means including a line finder for connecting the terminals of a calling line with the register, said line finder having a set of brushes cooperating with the sets of terminals and a magnet for controlling the movement of the brushes, a first relay in the register controlling the circuit of said magnet, a second relay in the register controlled by the first relay, a pair of triodes in the register, a gas discharge valve operable when the same potentials are applied to the grids of the two triodes and also when the potentials applied to the cathode and grid of the first triode bear a predetermined relationship to one another, a circuit for the first relay controlled by said valve, sources of different potentials, variably operable means in the register for applying different potentials from said sources to the grid of the first triode, connections for applying a characteristic potential to the test terminals of each line, a connection from the cathode of the second triode to the grid of the first triode, a connection from the test brush of the line finder to the cathode of the first triode, to the grid of the second triode, and extended to the cathode of said valve by the second relay, another circuit for the cathode of said valve, and means for completing said other circuit when said last-mentioned connection is not extended to said cathode.

2. In a telephone exchange system, a plurality of lines, means including selector switches for connecting a calling with a called line, each of said switches having a bank of test and talking terminals and wipers cooperating therewith and a magnet for controlling the wipers, sources of different potentials, connections for applying characteristic potentials from certain of said sources to the test terminals in said switches, relays in each of said switches for establishing a first test for said potentials over a test wiper and a second test over a talking wiper of the switch, a register having a first and a second tube circuit, a first relay for connecting the first tube circuit to the contacts of one of said first-mentioned relays during the first test and the second tube circuit to said contacts during the second test, a second relay in the register for interconnecting the two tube circuits, and means for operating the second relay upon the completion of the first test.

3. In a telephone exchange system, a plurality of lines, means including line finder and selector switches for connecting a calling with a called line, each of said switches having a bank of test and talking terminals and wipers cooperating therewith and a magnet for controlling the wipers, sources of different D. C. potentials, connections for applying characteristic potentials from said sources to the test terminals in said switches indicating the condition, characteristics and designation of the lines terminating therein, relays in each of said switches for establishing a first test circuit for said potentials over a test wiper and a second test circuit over a talking wiper of the switch, a register having a first and a second tube circuit each comprising a first and a second triode, a gas valve and a relay, a first relay having a front contact for connecting the grid of the first triode in the first tube circuit with a contact of one of said first-mentioned relays during the first test and a back contact for connecting the grid of the first triode in the second tube circuit with said contact of said first-mentioned relay during the seond test, a second relay in the register for interconnecting the grids of the first triodes in the two tube circuits, and means under control of the relay in either of said tube circuits for operating the second relay upon the completion of the first test.

4. In a telephone exchange system, a plurality of lines, a first type of controller associated with some and a second type associated with other of said lines, said controllers being operable in accordance with the designations of called lines, a variably operable register at the central exchange, selectors at the exchange controlled by the register for establishing connections between calling and called lines, a first means in the register responsive to the first type controller, a second means in the register variably operable by the second type controller, means for adjusting the setting of the register under the control of the first or the second means, and means responsive to the connection of a calling line with the register for connecting the first or the second means therewith depending on the type of controller provided at the calling line.

5. In a telephone exchange system, a plurality of numerically designated lines, means including selector switches for establishing connections between said lines, a register for controlling the operation of said selector switches, calling devices of one kind associated with some of said lines arranged to send a certain number of pulses representing the various members, calling devices of another kind associated with certain lines arranged to send a different number of pulses representing the same numbers, first and second numerical means in the register responsive, respectively, to the calling devices of the first and second kind, and common digit counting and storing means in the register controlled by both said numerical means for counting and storing the pulses received by said numerical means.

6. In a telephone exchange system, a plurality of numerically designated lines, different types of calling devices associated with the various lines, means including a plurality of selector switches for interconnecting the lines, a register for controlling said selectors, a line finder for connecting a calling line with said register and selectors, means in the register variably operable depending on the type of calling device associated with the called line, a plurality of terminals for each line in the line finder, a vacuum tube in the register, a circuit for said vacuum tube including one terminal of the calling line, a source of different potentials, means for applying a predetermined potential to the terminal depending on the type of calling device associated with the line, and means controlled by said vacuum tube for controlling the variable operation of the register.

7. In a telephone system, a plurality of lines, means including selectors for interconnecting the lines, a register for controlling the selectors, a translator, a link for connecting the translator with the register, at each end of said link a pair of switches each having a bank of terminals and a set of wipers cooperating therewith, a connection from one terminal of one switch to the corresponding terminal in the paired switch, a magnet for the first switch in each pair for controlling the operation of the wipers thereof, a relay for each first switch controlling the circuit of the associated magnet, a source of alternating current, a rectifier bridge in each first switch connected across said source for applying a direct current potential across the winding of the associated relay to energize it, means in the second switch of each pair for connecting said source to said bridge, and a circuit for shunting out said relay extending over the wiper of the associated first switch and the wiper of the paired switch which engage with said connected terminals.

8. In a telephone exchange system, a plurality of lines, means including selector switches for establishing connections between calling and called lines, a plurality of normally inactive registers each operable in response to pulses in accordance with the designation of called lines for controlling said selector switches, a source of potentials, means controlled by a calling line for applying characteristic potentials from said source to said registers and to said selectors, a plurality of multi-electrode electrical discharge tubes in each of said registers responsive to said potentials to control the operation of said register and selectors, means operable upon the initiation of a call on a calling line for connecting an idle one of said registers therewith, means for releasing the register upon the completion of its operation, means operable thereupon for checking the operativeness of the discharge tubes in the released register, and a signal controlled by said checking means, whereby the ability of the register to respond to another call is indicated.

9. The system according to claim 8, and in which said tubes are arranged normally to operate when predetermined potentials are applied thereto, means in the checking means for applying a lesser and also said predetermined potential to the tubes, said signal being actuated whenever a tube responds to a lesser potential, and means for actuating said signal whenever a tube does not respond to said predetermined potential applied in the checking means.

10. In a telephone exchange system, a plurality of lines, means including final selector switches for connecting calling with called lines, said switches having talking and test terminals and cooperating sets of wipers, a register controlled by a calling subscriber and arranged to control the operation of said switches, a source of potentials, means for applying to the test and talking terminals potentials from said source representing predetermined conditions and the designation of the line terminating therein, two testing means in the register, means for making each testing means responsive to a different one of said potentials, and means in the register for simultaneously connecting both testing means to the test wiper of the final selector which is under control, whereby the testing means to operate when said final selector reaches the desired terminal will indicate the condition of the line connected to that terminal.

11. In a telephone exchange system, a plurality of lines, means including group and final selector switches for connecting a calling with a called line, said selector switches having talking and test terminals and cooperating sets of wipers, a register controlled by a calling subscriber and arranged to control the operation of said selector switches, a source of potentials, means for applying to the test and talking terminals potentials from said source representing predetermined conditions and the designation of the line terminating therein, two testing means in the register, means for making each testing means responsive to predetermined of said potentials, means in the register operable whenever a group selector is under its control for connecting first one testing means to the test wiper and upon the completion of the first test then the other testing means to a talking wiper of the group selector, whereby a double test of the position of the group selector may be made, and means in the register operable when the final selector is under its control for simultaneously connecting both testing means to the test wiper of the final selector, whereby the testing means responding will be an indication of the condition of the line upon which the final selector has stopped.

12. The system according to claim 11, and in which a second exchange is provided having a plurality of lines, means including group and final selector switches at the second exchange for connecting a calling line at the first exchange with a called line, said selector switches having talking and test terminals and cooperating sets of wipers, a pulse repeater controlled by said register and arranged to control the operation of the selector switches at the second exchange, a source of potentials, means for applying to the test and talking terminals at the second exchange potentials from said source representing predetermined conditions and the designation of the line terminating therein, two testing means in the pulse repeater, means for making each testing means responsive to different ones of the last-mentioned potentials, and means in the pulse repeater operable when the final selector is under control for simultaneously connecting both testing means to the test wiper of the final selector, whereby the testing means responding when the final selector stops on a line will be an indication of the condition of the line.

13. In a telephone exchange system, a plurality of numerically designated lines, means including a final selector for establishing connections between calling and called lines, a register for controlling said selector, means associated with the lines for operating said register in accordance with the called number, a source of potentials, brushes and a bank of terminals for the final selector divided into groups of ten, means for applying a different units potential from said source to each terminal of a group, two terminals separating said groups of ten, of which to the one first encountered by the brushes a characteristic non-existent digit potential is applied and to the second one of which a characteristic "tens" potential is applied, means in the register responsive to the units and tens potentials to control the final selector to select the called line, and means in the register responsive to the selection of the characteristic potential by the final selector for preventing the selection of any called line by the final selector.

14. In a telephone exchange system, a plurality of numerically designated lines, means including a final selector for establishing connections between calling and called lines, a register for controlling said selector, means associated with the lines for operating said register in accordance with the called number, a source of potentials, a bank of terminals for the final selector divided into groups of ten, means for applying a different units potential to each terminal of a group, two terminals separating said groups of ten, means for applying a characteristic "tens" potential to one of said terminals and a characteristic potential to the other, means in the register responsive to the units and tens potentials to control the final selector, and means in the register responsive to the selection of the characteristic potential by the final selector for releasing the connection.

15. In a telephone exchange system, a plurality of lines, means including selectors for interconnecting calling and called lines, a calling device associated with each line, an intercepting operator's position, a register, means controlled by a calling subscriber for operating said register in accordance with the designation of the called line, means responsive to the calling of a certain non-existent digit in any number for routing the connection to the intercepting operator under the control of a selector, and means responsive to the calling of another non-existent digit in any number for routing the call to the intercepting operator under the control of the register.

16. In a telephone exchange system, a plurality of lines, means including group and final selectors for interconnecting calling and called lines, a calling device associated with each line, an intercepting operator's position, a register, a translator associated with the register, means controlled by a calling subscriber for operating said translator and register in accordance with the designation of the called line, means responsive to the operation of a calling device in accordance with a non-existent "tens" digit for routing the connection to the intercepting operator's position under the control of the final selector, and means responsive to the calling of another non-existent digit for routing the call to the intercepting operator's position under the control of the translator.

17. In a telephone exchange system, a plurality of numerically designated lines, means including a final selector for establishing connections between calling and called lines, a register for controlling said selector, means associated with the lines for operating said register in accordance with the called number, a source of potentials, a bank of terminals for the final selector divided into groups of ten, means for applying a different units potential to the individual terminals of the groups, two terminals separating the groups of ten, means for applying a characteristic "tens" potential to one of said terminals and means for applying a characteristic non-existent line potential to said other terminal, means in the register responsive to the units and tens potentials to control through the register the final selector to select the called line, and means in the register responsive to the selection of the non-existent line potential by the final selector for releasing the connection and connecting the calling line with a predetermined line.

18. In a telephone exchange system, a plurality of numerically designated subscribers' and trunk lines each having talking and test terminals, some of the subscribers' lines being entitled to restricted and others to unrestricted service, and said subscribers' lines being equipped with different types of calling devices, means for applying a potential to each test terminal of a line indicative of the class of service and a potential to each talking terminal indicative of the type of calling device, means including line finder and selector switches having talking and test wipers cooperating with said terminals for establishing a connection between calling and called lines, a register for controlling the operation of said switches, means in the register including a circuit extending over the test wiper of a switch and responsive to the potential on the test terminal for determining the designation of the calling line and its class-of-service and the designation of the selected trunk, and means in the register operable when a switch stops and controlled over a talking wiper and responsive to the potential on the talking terminal for determining the type of calling device on the selected calling line and the number of the selected trunk.

19. In a telephone exchange system, a plurality of lines, entitled to different classes of service and each having a set of terminals, means including a line finder for establishing a connection between a calling and a called line, a set of wipers for the line finder cooperating with said terminals, a controlling magnet for said wipers, a plurality of sources of different D. C. potentials, means for connecting one source of potential with the terminals of restricted lines and a seocnd source of potential with the terminals of unrestricted lines, a register, two pairs of multi-electrode discharge tubes in the register, means for connecting in multiple one electrode of the first tube in each pair with a wiper of the line finder which cooperates with the terminals to which the potentials are connected, means in the register for connecting the first source of potentials with one electrode of the second tube in one pair and the second source with one electrode of the second tube in the second pair, a means connected with each pair of tubes and operated when the same potentials are applied to said one electrode of the associated tubes of a pair, and a circuit for the line finder magnet controlled by the last-mentioned means of both pairs of tubes.

20. In a multi-office telephone system, a plurality of telephone lines, interoffice and intraoffice trunks, selector switches at said office to connect a calling with a called line, said selectors having banks of terminals and wipers cooperating therewith, a source of potentials, means for applying characteristic potentials from said source to terminals of the selectors depending on the designation of the trunk terminating therein and also on the idle or busy condition thereof, a register variably operable by a calling subscriber in response to the pulses sent in accordance with the designation of a called line, test means in the register responsive to said potentials to control the routing of calls, means for connecting the test means twice with each selector, and means operable upon the second connection of the test means with one of the selectors to control the routing of a call over an interoffice trunk.

21. In a multi-office telephone system, a plurality of lines including subscriber's lines and inter-office trunk lines, means including selector switches for interconnecting said lines, a register at one office operable by the calling line in accordance with the called number for controlling the selectors, sources of different potentials at the first office, circuits for connecting to the register certain potentials depending on the number called and over the selectors depending on the lines selected, a pulse sender at a second office, and means operable by said potentials when a line to a second office is selected for connecting said pulse sender with the register.

22. In a multi-office telephone system, a plurality of subscribers' and trunk lines, means including selector switches for interconnecting said lines, each switch having talking and test wipers cooperating with sets of terminals, a register at one office operable by the calling line in accordance with the called number for controlling the establishment of intra-office and interoffice connections over said selectors, sources of different potentials at the first office, circuits for connecting to the register certain potentials from said sources depending on the number called, means for connecting with the register first a potential over the test wiper of an interoffice trunk and if said potential bears a predetermined relation to a potential connected to the register over said circuits, then a potential over a talking wiper of said interoffice trunk selector, and means operable by the relation of the second potential connected over said talking wiper to a potential connected over said circuits for controlling the adjustment of the register.

23. The telephone system according to claim 22, and a normally inactive pulse sender at the called office, and means operable when the second potential bears a predetermined relation to a potential connected to the register over said circuits for connecting said pulse sender with the register for operation.

24. In a telephone system, a plurality of telephone lines, a plurality of offices, interoffice and intra-office trunks, means including automatic selector switches for establishing connections between calling and called subscribers over intra-office and interoffice trunks, said selectors having talking and test terminals in which said trunks terminate, a source of potentials, means for applying characteristic potentials from said sources to a talking and the test terminal of each trunk to indicate the designation and condition of said trunk, a register operable by a calling subscriber in accordance with the designation of the called line, test means in the register responsive to said potentials to control the operation of the register to control the establishment of an intra-office connection over certain selectors, normally inactive means in the register for sending impulses representing the digits of a called number, and means controlled by the test means for actuating the last-mentioned means to control other selectors to establish an interoffice connection.

25. The system according to claim 24, further comprising a translator associated with the register and cooperating therewith to control the establishment of interoffice connections, and means controlled by the translator for cooperating with the test means in said register to render the impulse sending means active for controlling the establishment of certain interoffice connections.

26. In an automatic telephone exchange system, a plurality of lines, means including finder and selector switches for interconnecting calling and called lines, each of said switches having sets of line terminals and wipers cooperating therewith and connections leading to said wipers, means in each switch for performing a plurality of operations including driving the wipers over the terminals, stopping the wipers, and changing the connections to the wipers to select and test sets of terminals, a register for controlling said switches, a potential comparing means comprising a single electric discharge tube unit at said register, means for simultaneously applying to said unit a potential from a switch under control and another potential locally at the register, and means operated by said unit when the potentials simultaneously applied thereto bear a predetermined relationship to one another for stopping the wipers of said switch under control and changing the connections of the wipers preparatory to making a second test.

27. The telephone system according to claim 26, and in which one of the selectors is a final selector, some of the lines are party lines having a plurality of stations and a corresponding number of terminal sets in the final selector, one talking and a control wire for each party line cross-connected in the finder and final selector switch terminals, a cut-off relay for each party line, and a second talking wire for each party line connected only via front contacts of its cut-off relay.

28. The telephone system according to claim 27, further comprising back contacts for each cut-off relay to connect different potentials to the final selector terminals of the second talking wire, said potentials being characteristic of the ringing current to which the stations associated with the line respond.

29. The telephone system according to claim 26, and in which one of the selectors is a final selector, some of the lines are party lines having a single set of terminals in the final selector, a cut-off relay for each party line, and a circuit including the terminal of a first talking wire of a party line and back contacts of the cut-off relay of the line for applying a characteristic potential for each station associated with the line.

30. In an automatic telephone exchange system, a plurality of party lines, each line having two talking wires and a test wire, a line and a cut-off relay, means including finder, group and final selector switches for connecting calling and called lines, each of said switches having sets of terminals for the line and test wires and wipers cooperating therewith, a circuit for indicating the existence of one or more stations on a party line by applying a characteristic potential via a back contact of the cut-off relay to one of the talking wires, a register having a potential comparing means comprising a single electric discharge tube unit, means in the register for applying to said unit any desired potential, means in the final selector switch for applying to said unit potential via the wiper cooperating with the test wire terminal, and means operated by said unit when two potentials applied thereto bear a predetermined relationship to one another for applying the said unit via the wiper cooperating with the terminal of said one of the talking wires for further controlling the operation of said final selector.

31. The telephone system according to claim 30, and a circuit for indicating the existence of certain other stations on a party line by applying a characteristic potential to the other talking wire thereof via back contacts of the line and cut-off relays in series.

32. The telephone system according to claim 30, and a circuit including a front contact of the line relay for applying a potential to the test wire terminal of the line.

33. The telephone system according to claim 30, and a circuit for the cut-off relay of each line including a fourth line wire having a terminal in the final selector.

34. In an automatic telephone exchange system, a plurality of lines of different classes, means including a line finder switch for interconnecting calling and called lines, said switch having sets of line terminals and wipers cooperating therewith and connections leading to said wipers, means in said switch for performing a plurality of operations including driving the wipers over the terminals, stopping the wipers, and changing the connections to the wipers to select and test sets of terminals, a register for controlling said switch, a potential comparing means comprising two electric discharge tube units at said register, means for applying to the first unit a potential via one wiper representing the class-of-service of the line and simultaneously a potential locally at the register, means for applying to the second unit a potential via another wiper representing the calling condition of a line and simultaneously a potential locally at the register, and means operated by said units when the potentials simultaneously applied thereto bear a predetermined relationship to one another for stopping the wipers on the terminals and thus causing the seizure of the calling line terminals by the line finder and indicating the calling condition of the line.

35. The telephone system according to claim 34, and means controlled by the first tube unit responsive to the class-of-service potential for preventing the establishment of certain connections from the restricted calling lines.

GERALD DEAKIN.

REFERENCES CITED

The following references are of record in the file of this patent:

UNITED STATES PATENTS

| Number | Name | Date |
|---|---|---|
| 1,533,079 | Richardson | Apr. 7, 1925 |
| 1,578,420 | Gardner | Mar. 30, 1926 |
| 1,729,980 | Bellamy | Oct. 1, 1929 |
| 1,799,532 | Ray | Apr. 7, 1931 |
| 2,023,011 | Dunham | Dec. 3, 1935 |
| 2,115,320 | Saunders | Apr. 26, 1938 |
| 2,123,228 | Carpenter | July 12, 1938 |
| 2,140,931 | Wright | Dec. 20, 1938 |
| 2,235,890 | King et al. | Mar. 25, 1941 |
| 2,354,668 | Deakin et al. | Aug. 1, 1944 |
| 2,355,207 | Dehn | Aug. 8, 1944 |
| 2,367,635 | Balzer | Jan. 16, 1945 |